US011051152B2

(12) United States Patent
Park et al.

(10) Patent No.: US 11,051,152 B2
(45) Date of Patent: *Jun. 29, 2021

(54) METHOD AND DEVICE FOR SELECTIVE COMMUNICATION SERVICE IN COMMUNICATION SYSTEM

(71) Applicant: Samsung Electronics Co., Ltd., Suwon-si (KR)

(72) Inventors: Jong-Han Park, Bucheon-si (KR); Duckey Lee, Seoul (KR); Sang-Soo Lee, Yongin-si (KR); Sung-Ho Choi, Suwon-si (KR); Sang-Bum Kim, Suwon-si (KR); Soeng-Hun Kim, Suwon-si (KR); Woo-Seong Kim, Gwacheon-si (KR); Ju-Ho Lee, Suwon-si (KR); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,112

(22) Filed: Jun. 5, 2020

(65) Prior Publication Data

US 2020/0304975 A1 Sep. 24, 2020

Related U.S. Application Data

(63) Continuation of application No. 16/056,267, filed on Aug. 6, 2018, now Pat. No. 10,681,514, which is a
(Continued)

(30) Foreign Application Priority Data

Jun. 13, 2014 (KR) .................. 10-2014-0072089
Sep. 25, 2014 (KR) .................. 10-2014-0128539

(51) Int. Cl.
*H04M 3/00* (2006.01)
*H04W 4/70* (2018.01)
(Continued)

(52) U.S. Cl.
CPC ............... *H04W 4/70* (2018.02); *H04W 4/12* (2013.01); *H04W 4/24* (2013.01); *H04W 4/50* (2018.02);
(Continued)

(58) Field of Classification Search
CPC ..... H04W 4/005; H04W 4/12; H04W 76/048; H04W 8/18; H04W 4/24; H04W 88/08;
(Continued)

(56) References Cited

U.S. PATENT DOCUMENTS 9,037,193 B2   5/2015   Vergnes et al.
9,363,568 B2   6/2016   Wheatley et al.
(Continued)

FOREIGN PATENT DOCUMENTS

CN   101554070 A   10/2009
CN   101610450 A   12/2009
(Continued)

OTHER PUBLICATIONS

International Search Report dated Sep. 23, 2015 in connection with International Application No. PCT/KR2015/006002; 5 pages.
(Continued)

*Primary Examiner* — Danh C Le

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.
(Continued)

A user equipment in a communication system, according to various embodiments of the present disclosure, includes: a controller that determines at least one communication service to deactivate among communication services that are able to be provided and a transmitter that transmits, to a server, a message for identifying the at least one communication service to deactivate.

16 Claims, 40 Drawing Sheets

Related U.S. Application Data continuation of application No. 14/739,781, filed on Jun. 15, 2015, now Pat. No. 10,045,177.

(51) Int. Cl.

| | |
|---|---|
| *H04W 4/50* | (2018.01) |
| *H04W 4/60* | (2018.01) |
| *H04W 76/28* | (2018.01) |
| *H04W 12/02* | (2009.01) |
| *H04W 8/20* | (2009.01) |
| *H04W 12/30* | (2021.01) |
| *H04W 4/12* | (2009.01) |
| *H04W 4/24* | (2018.01) |
| *H04W 8/18* | (2009.01) |
| *H04W 88/08* | (2009.01) |

(52) U.S. Cl.
CPC ............... *H04W 4/60* (2018.02); *H04W 8/18* (2013.01); *H04W 8/20* (2013.01); *H04W 12/02* (2013.01); *H04W 12/35* (2021.01); *H04W 76/28* (2018.02); *H04W 88/08* (2013.01)

(58) Field of Classification Search
CPC . H04W 8/245; H04W 12/06; H04M 1/72519; H04B 7/2606; G06Q 30/0641
USPC .......... 455/418, 550.1, 414.1, 11.1; 705/27.1
See application file for complete search history.

(56) References Cited

U.S. PATENT DOCUMENTS

| | | | |
|---|---|---|---|
| 2002/0161627 A1* | 10/2002 | Gailey ................ G06F 16/9535 | |
| | | | 186/35 |
| 2007/0093250 A1 | 4/2007 | Italia et al. | |
| 2008/0124117 A1* | 5/2008 | Muraishi ............. G03G 15/0225 | |
| | | | 399/100 |
| 2008/0125116 A1* | 5/2008 | Jiang ..................... H04W 60/00 | |
| | | | 455/433 |
| 2008/0219217 A1 | 9/2008 | Kim et al. | |
| 2009/0092139 A1 | 4/2009 | Coley | |
| 2009/0150551 A1 | 6/2009 | Pagan | |
| 2010/0013436 A1 | 1/2010 | Lowenthal et al. | |
| 2010/0234002 A1 | 9/2010 | Scheller et al. | |
| 2010/0309822 A1* | 12/2010 | Witzel ................ H04L 65/1096 | |
| | | | 370/259 |
| 2010/0324977 A1 | 12/2010 | Dragt | |
| 2011/0029344 A1 | 2/2011 | Weiler et al. | |
| 2011/0130140 A1 | 6/2011 | Fadell | |
| 2011/0154035 A1 | 6/2011 | Yao et al. | |
| 2011/0306318 A1 | 12/2011 | Rodgers et al. | |
| 2012/0158991 A1 | 6/2012 | Ajjaguttu et al. | |
| 2012/0239417 A1 | 9/2012 | Pourfallah et al. | |
| 2013/0078951 A1 | 3/2013 | Mun et al. | |
| 2013/0185150 A1 | 7/2013 | Crum | |
| 2013/0191213 A1 | 7/2013 | Beck et al. | |
| 2013/0231053 A1 | 9/2013 | Lee et al. | |
| 2013/0262198 A1 | 10/2013 | Chung | |
| 2013/0304609 A1 | 11/2013 | Keonorasak | |
| 2013/0325726 A1 | 12/2013 | Tuchman et al. | |
| 2014/0024361 A1 | 1/2014 | Poon et al. | |
| 2014/0058866 A1* | 2/2014 | Okadome ............ G06Q 20/027 | |
| | | | 705/21 |
| 2014/0089134 A1 | 3/2014 | Linh et al. | |
| 2014/0089496 A1 | 3/2014 | Kim et al. | |
| 2014/0099916 A1 | 4/2014 | Mallikarjunan et al. | |
| 2014/0120886 A1* | 5/2014 | Xu ........................ H04W 12/06 | |
| | | | 455/414.1 |
| 2014/0140507 A1 | 5/2014 | Park et al. | |
| 2014/0141763 A1* | 5/2014 | Suh ..................... H04L 41/0806 | |
| | | | 455/418 |
| 2014/0156735 A1* | 6/2014 | Yamasaki ............. G06F 9/5027 | |
| | | | 709/203 |
| 2014/0165173 A1 | 6/2014 | Hjelm et al. | |
| 2014/0214596 A1 | 7/2014 | Acker, Jr. et al. | |
| 2014/0219447 A1 | 8/2014 | Park et al. | |
| 2014/0222956 A1* | 8/2014 | Courtney, III ...... H04L 67/2823 | |
| | | | 709/217 |
| 2014/0287725 A1 | 9/2014 | Lee | |
| 2014/0297425 A1* | 10/2014 | Kim ........................ G06Q 50/01 | |
| | | | 705/14.66 |
| 2014/0304297 A1* | 10/2014 | Lian ........................ G06F 16/40 | |
| | | | 707/769 |
| 2015/0012388 A1 | 1/2015 | Kim et al. | |
| 2015/0025969 A1 | 1/2015 | Schroll et al. | |
| 2015/0038119 A1 | 2/2015 | Azuma et al. | |
| 2015/0052046 A1 | 2/2015 | Cameron et al. | |
| 2015/0105075 A1* | 4/2015 | Yu ........................ H04L 61/6054 | |
| | | | 455/435.2 |
| 2015/0121495 A1 | 4/2015 | Gao et al. | |
| 2015/0134458 A1 | 5/2015 | Pellegrini et al. | |
| 2015/0142463 A1 | 5/2015 | Vinals | |
| 2015/0254677 A1 | 9/2015 | Huxham et al. | |
| 2015/0269601 A1 | 9/2015 | Crum | |
| 2015/0289203 A1* | 10/2015 | Zhang ................. H04L 12/1407 | |
| | | | 455/436 |
| 2015/0294301 A1* | 10/2015 | Lindfeldt ........... G06Q 20/3825 | |
| | | | 705/72 |
| 2015/0302374 A1 | 10/2015 | Sartor | |
| 2015/0302391 A1 | 10/2015 | Lindfeldt et al. | |
| 2015/0312717 A1 | 10/2015 | Shih et al. | |
| 2015/0319133 A1* | 11/2015 | Seo ........................ H04W 8/20 | |
| | | | 709/223 |
| 2015/0332370 A1 | 11/2015 | Kumar et al. | |
| 2015/0349826 A1 | 12/2015 | Li et al. | |
| 2015/0382178 A1 | 12/2015 | Park et al. | |
| 2016/0056607 A1* | 2/2016 | Eckert ................. H01S 5/02272 | |
| | | | 372/44.01 |
| 2016/0088507 A1* | 3/2016 | Gao ..................... H04W 72/0453 | |
| | | | 370/252 |
| 2016/0156782 A1 | 6/2016 | Mumick et al. | |
| 2016/0165451 A1 | 6/2016 | Legris | |
| 2016/0212617 A1 | 7/2016 | Koshimizu et al. | |
| 2016/0316311 A1* | 10/2016 | Holtmanns ........ H04M 1/72525 | |
| 2016/0373556 A1* | 12/2016 | Xu ........................ G06K 7/1447 | |
| 2017/0077975 A1* | 3/2017 | Wang .................. H04B 1/3816 | |
| 2017/0156051 A1 | 6/2017 | Park et al. | |
| 2017/0195483 A1 | 7/2017 | Gault | |
| 2017/0316515 A1 | 11/2017 | Varma et al. | |
| 2017/0331820 A1* | 11/2017 | Kirschbaum ....... G06Q 30/0207 | |
| 2018/0158163 A1 | 6/2018 | Zhang et al. | |

FOREIGN PATENT DOCUMENTS

| | | |
|---|---|---|
| CN | 102404302 A | 4/2012 |
| CN | 102870443 A | 1/2013 |
| KR | 10-2010-0057733 A | 6/2010 |
| KR | 10-2013-0009659 A | 1/2013 |
| KR | 10-2013-0026351 A | 3/2013 |
| KR | 10-2013-0033474 A | 4/2013 |
| KR | 10-2013-0049726 A | 5/2013 |
| WO | 2012076437 A2 | 6/2012 |

(56) References Cited

OTHER PUBLICATIONS

Written Opinion of the International Search Authority dated Sep. 23, 2015 in connection with International Application No. PCT/KR2015/006002; 7 pages.
Extended European Search Report and European Search Opinion in connection with European Patent Application No. 15807294.2 dated Jan. 18, 2018; 8 pages.
Summons to attend oral proceedings pursuant to Rule 115(1) EPC in connection with European Application No. 15807294.2 dated Mar. 27, 2020, 6 pages.
The First Office Action in connection with Chinese Application No. CN 201580031606.4 dated Jul. 3, 2019, 19 pages.
Communication pursuant to Article 94(3) EPC in connection with European Application No. EP15807294.2 dated Jun. 5, 2019, 5 pages.
"Reprogrammable SIMs: Technology, Evolution and Implications", CSMG, Sep. 25, 2012, 95 pages.
Office Action dated Aug. 20, 2020 in connection with Chinese Patent Application No. 201580031606.4, 23 pages.
Office Action dated Aug. 4, 2020 in connection with India Patent Application No. 201737001239, 6 pages.
Result of consultation dated Oct. 28, 2020 in connection with European Application No. 15807294.2, 5 pages.
Notice of Preliminary Rejection dated Nov. 25, 2020 in connection with Korean Application No. 10-2014-0128539, 20 pages.
Notice of Final Rejection dated Apr. 21, 2021 in connection with Korean Application No. 10-2014-0128539, 11 pages.

\* cited by examiner

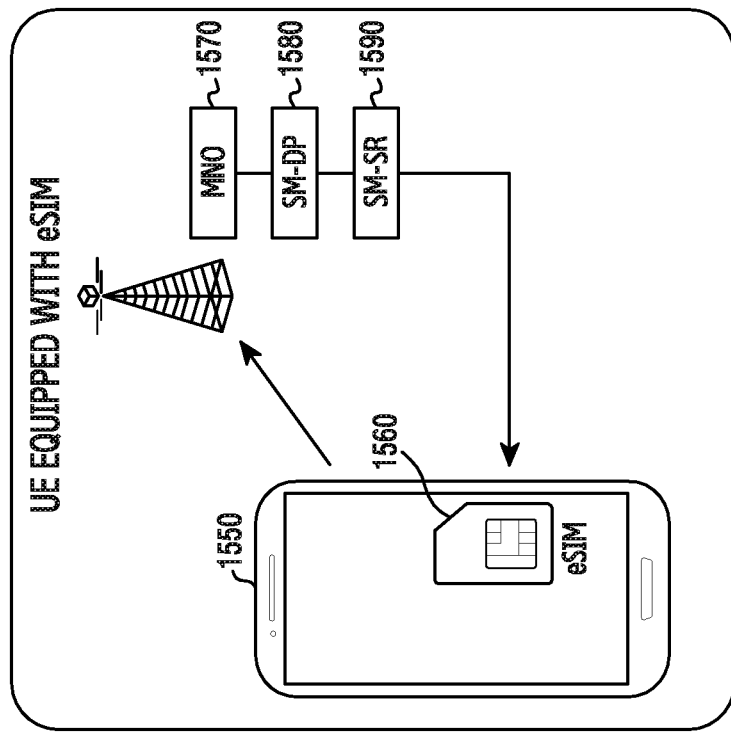
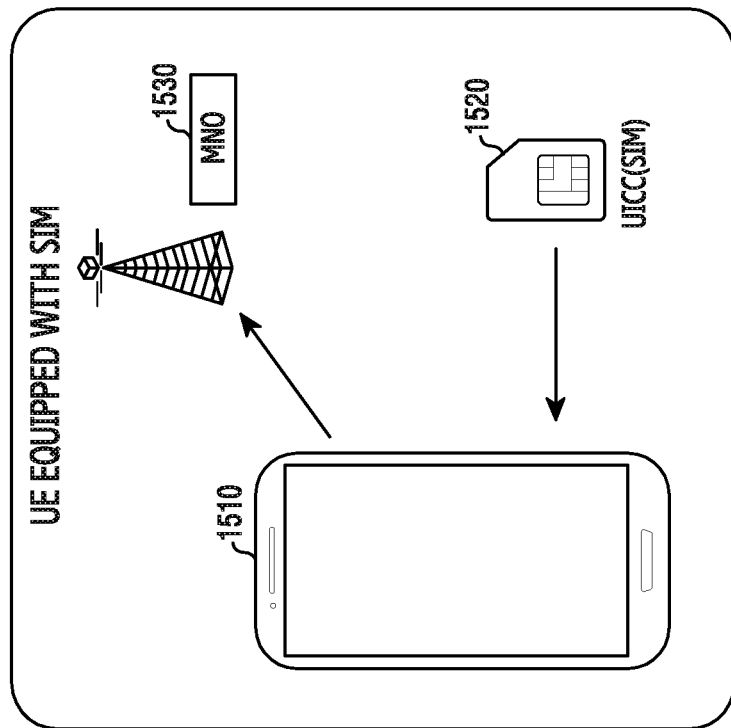
FIG.15B
FIG.15A

METHOD AND DEVICE FOR SELECTIVE COMMUNICATION SERVICE IN COMMUNICATION SYSTEM

CROSS-REFERENCE TO RELATED APPLICATIONS

This application is a continuation of U.S. patent application Ser. No. 16/056,267 filed Aug. 6, 2018, which is a continuation of U.S. patent application Ser. No. 14/739,781 filed Jun. 15, 2015, now U.S. Pat. No. 10,045,177, which claims priority to Korean Application No. 10-2014-0072089 filed Jun. 13, 2014 and Korean Application No. 10-2014-0128539 filed Sep. 25, 2014, the disclosures of which are hereby incorporated by reference.

BACKGROUND

1. Field

The present disclosure relates to a method and device for selecting a communication service to connect communication by user equipment in a communication system.

2. Description of Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

User equipment widely used in mobile communication markets generally has a flight mode implemented therein in order to readily interrupt all communication functions in a space where communication is not allowed, for example, in a space of an airplane while taking off or landing. The flight mode can be set by a user on the screen of a smart phone or through a specific physical button, etc. In the flight mode, the user equipment disables transmission and reception functions of all remote and short-range communication. Examples of the remote communication include commercial mobile communication systems, such as Global System for Mobile communication (GSM), Wideband Code Division Multiple Access (WCDMA), Long Term Evolution (LTE)/Long Term Evolution-Advanced (LTE-A), and the like, and examples of the short-range communication include commercial mobile communication systems, such as Wireless Fidelity (WiFi), BLUETOOTH, and the like. FIG. 1 illustrates an example of a method for setting a flight mode of a smart phone. User equipment 100 has a touch screen 105 on the front surface thereof, and a user inputs desired information by touching the touch screen. The touch screen displays a control screen for starting or stopping several functions, and the control screen includes a flight mode icon 110. The user sets or disables a flight mode by touching the flight mode icon. In addition, the user also displays a screen for setting or disabling the flight mode by clicking a specific physical button implemented in the user equipment. Through various methods in addition to the above-described methods, the existing user equipment interrupts all communication.

In the existing flight mode, the user equipment interrupts all the communication. However, the user may also want to interrupt only some communication rather than all the communication according to situations. For example, there is a case where an incoming call is unacceptable in everyday life. The user is not willing to receive an incoming call in a place that requires silence or when an undesired person makes a call to him or her. In the situation where the user cannot receive the incoming call, a ring tone or vibration for the incoming call is unnecessary. Accordingly, in the situation described above, a communication mode appropriate for the user's situation is required.

A Universal Integrated Circuit Card (UICC) is a smart card inserted into a mobile communication terminal. The UICC stores private information of a mobile communication subscriber, authenticates the subscriber, and creates a traffic security key when the subscriber accesses a mobile communication network, thereby making it possible to stably use the mobile communication.

The UICC is manufactured as a dedicated card for a specific mobile communication service provider according to the corresponding service provider's request and released with previously loaded authentication information, for example a Universal Subscriber Identity module (USIM) application, International Mobile Subscriber Identity (IMSI), a K value, and the like, for the network access of the corresponding service provider. Accordingly, the corresponding mobile communication service provider receives delivery of the manufactured UICC to provide it to the subscriber, and thereafter performs the management, such as installation, modification, deletion, and the like, of an application in the UICC using technologies such as Over The Air (OTA), etc. when necessary. The subscriber inserts the UICC into the mobile communication terminal of his or her own to use the network and application services of the corresponding mobile communication service provider, and when replacing the terminal, the subscriber moves the UICC from the existing terminal to a new terminal to use the authentication information, the mobile communication phone numbers, the personal telephone number list, and the like, which are stored in the UICC, in the new terminal as they are.

The standardization group, called European Telecommunications Standards Institute (ETSI), defines the physical shape and the logical function of the UICC to maintain the international compatibility thereof. In terms of a form factor that defines a physical phenomenon, from the most widely used mini-SIM to a micro-SIM and a recently used nano-SIM, the size thereof becomes smaller. Although it contributes much to the compactness of a mobile communication terminal, it is expected that a UICC smaller in size than a recently established nano-SIM is difficult to standardize because a user is likely to lose it. Since the terminal requires a space for mounting a detachable slot due to a characteristic of the detachable UICC, further compactness is expected to be difficult.

In order to solve such a problem, a demand for replacing the UICC by embedding a security module performing a similar function to the UICC in a mobile communication terminal when manufacturing the terminal is emerging. Accordingly, an embedded Universal Integrated Circuit Card (eUICC) structure, which is a UICC that cannot be detached, is proposed.

SUMMARY

To address the above-discussed deficiencies, it is a primary object to provide a device and method for interrupting only some communication by user equipment in a wireless communication system.

Various embodiments of the present disclosure provide a device and method for connecting only a specific telephone number by a server.

Various embodiments of the present disclosure provide a device and method for transmitting only a specific message by a server.

Various embodiments of the present disclosure provide a device and method for allowing a user of user equipment to receive a service of a mobile communication service provider using a wireless communication network in a wireless communication system.

Various embodiments of the present disclosure provide a device and method for transferring an embedded Universal Integrated Circuit Card (eUICC) value of user equipment to a mobile communication service provider in a wireless communication system.

Various embodiments of the present disclosure provide a device and method for shortening a profile providing operation of a user of user equipment by providing a profile in advance in a wireless communication system.

User equipment in a communication system, according to various embodiments of the present disclosure, includes: a controller that determines at least one communication service to deactivate among communication services that are able to be provided; and a transmitter that transmits, to a server, a message for identifying the at least one communication service to deactivate.

A method of user equipment in a communication system, according to various embodiments of the present disclosure, includes: determining at least one communication service to deactivate among communication services that are able to be provided; and transmitting, to a server, a message for identifying the at least one communication service to deactivate.

A server in a communication system, according to various embodiments of the present disclosure, includes: a receiver that receives a message for identifying at least one communication service to deactivate; and a controller that deactivates at least one communication service among communication services that are able to be provided, according to the message.

A method of a server in a communication system, according to various embodiments of the present disclosure, includes: receiving a message for identifying at least one communication service to deactivate; and deactivating at least one communication service among communication services that are able to be provided, according to the message.

User equipment in a communication system, according to various embodiments of the present disclosure, includes: a transmitter that requests a connection with a counterpart user equipment through a first communication service among communication services supported by the counterpart user equipment; and a controller that makes a control to connect to the counterpart user equipment through a second communication service when the connection through the first communication service fails.

A method of user equipment in a communication system, according to various embodiments of the present disclosure, includes: requesting a connection with a counterpart user equipment through a first communication service among communication services supported by the counterpart user equipment; and making a control to connect to the counterpart user equipment through a second communication service when the connection through the first communication service fails.

A server for relaying a communication product in a wireless communication system, according to various embodiments of the present disclosure, includes: a receiver that receives communication service request information from user equipment that uses an embedded Universal Integrated Circuit Card (eUICC); and a transmitter that transmits a communication product list to the user equipment and transmits product purchase information to a mobile communication service provider in response to the communication service request information received from the user equipment.

User equipment in a wireless communication system, according to various embodiments of the present disclosure, includes: a transmitter that transmits communication service request information to a server for relaying the trade of an embedded Universal Integrated Circuit Card (eUICC) profile; a receiver that receives communication product information from the server; a display unit that displays the communication product information, and a controller that receives a profile based on the requested communication service information to connect to a communication service.

A server for providing a profile in a wireless communication system, according to various embodiments of the present disclosure, includes: a controller that creates a first encryption key through first encryption, encrypts a profile using the created first encryption key, and performs second encryption of the first encryption key using a certificate public key to create a second encryption key; and a transmitter that transmits the encrypted profile and the second encryption key to a server for managing a profile, wherein the profile is created before embedded Universal Integrated Circuit Card (eUICC) information is received.

A server for managing a profile in a wireless communication system, according to various embodiments of the present disclosure, includes: a receiver that receives an encrypted profile from a server for providing a profile; and a transmitter that transmits the encrypted profile and an encryption key encrypted with a certificate public key to user equipment, wherein the encrypted profile is created by the server for providing a profile before embedded Universal Integrated Circuit Card (eUICC) information is received.

A method of a server for relaying a communication product in a wireless communication system, according to various embodiments of the present disclosure, includes: receiving communication service request information from user equipment that uses an embedded Universal Integrated Circuit Card (eUICC); transmitting communication product information to the user equipment; and transmitting product purchase information to a mobile communication service provider in response to the communication service request information received from the user equipment.

A method of user equipment in a wireless communication system, according to various embodiments of the present disclosure, includes: transmitting communication service request information to a server for relaying the trade of an embedded Universal Integrated Circuit Card (eUICC) profile; receiving communication product information from the server; displaying the communication product information; and receiving a profile based on the requested communication service information to connect to a communication service.

A method of a server for providing a profile in a wireless communication system, according to various embodiments of the present disclosure, includes: creating a first encryption key through first encryption; encrypting a profile using the created first encryption key; creating a second encryption key by performing second encryption of the first encryption key using a certificate public key; and transmitting the encrypted profile and the second encryption key to a server for managing a profile, wherein the profile is created before embedded Universal Integrated Circuit Card (eUICC) information is received.

A method of a server for managing a profile in a wireless communication system, according to various embodiments of the present disclosure, includes: receiving an encrypted profile from a server for providing a profile; and transmitting the encrypted profile and an encryption key encrypted with a certificate public key to user equipment, wherein the encrypted profile is created by the server for providing a profile before embedded Universal Integrated Circuit Card (eUICC) information is received.

According to the various embodiments of the present disclosure, a messenger mode can be used for interrupting only some communication according to a pre-defined rule, thereby restricting an incoming call that a user does not want to receive, and receiving an efficient communication service using only specific communication.

Through the present disclosure, in a wireless communication system, when a user identifies a subscribable list supported by user equipment on the screen thereof among network provider lists to which the user can subscribe in the country or area where he or she is located and merely selects a network provider in the list to which the user wants to subscribe, a movement is made to the subscription screen of the network provider, and when the user completely subscribes to the network, a profile through which the user uses a communication service provided by the corresponding network provider can be automatically installed.

Before undertaking the DETAILED DESCRIPTION below, it may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features, and advantages of the present disclosure will be more apparent from the following detailed description taken in conjunction with the accompanying drawings, in which:

FIGS. 15A and 15B illustrate an example of a wireless communication method between a UE and a communication service provider according to various embodiments of the present disclosure;

DETAILED DESCRIPTION

Figure 1:
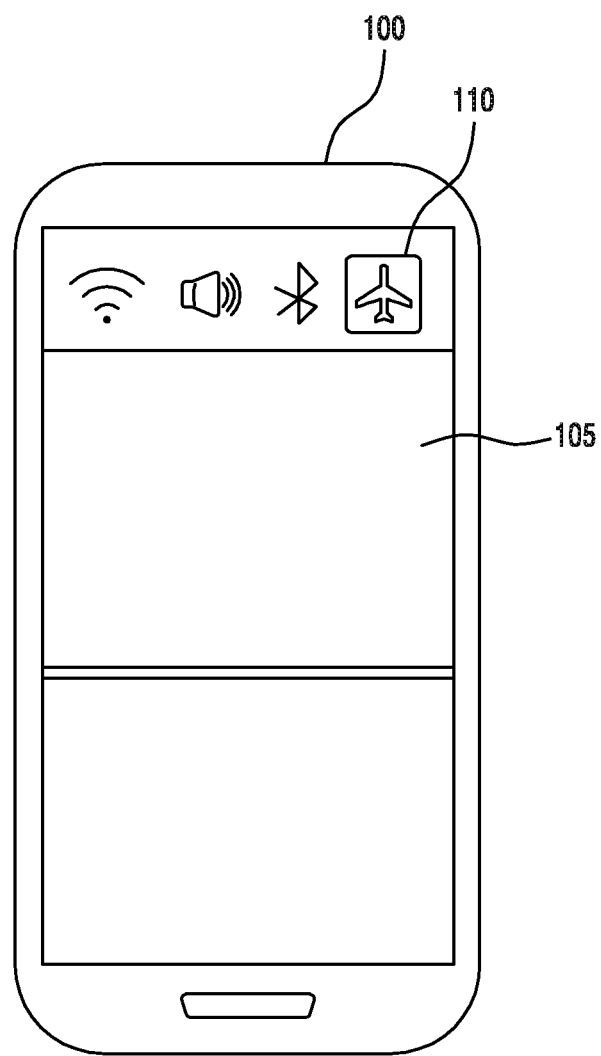
FIG. 1 illustrates an example of a flight mode setting in a UE according to various embodiments of the present disclosure.

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, exemplary embodiments of the present disclosure will be described in detail with reference to the accompanying drawings. Further, in the following description of the present disclosure, a detailed description of known functions and configurations incorporated herein will be omitted when it makes the subject matter of the present disclosure rather unclear.

The present disclosure gives a description of technology for telephone call and message control. User Equipment (UE) includes a mobile communication terminal such as a cellular phone, a smart phone, and the like.

Hereinafter, the present disclosure relates to a device and method for subscribing to a network in a wireless communication system.

A messenger mode in the present disclosure is a mode for permitting only communication relating to a specific communication service. For various reasons, a user wants to interrupt only some communication. One of them is an incoming call. In an environment requiring silence, the user wants to interrupt only the incoming call causing noise and vibration. Or when the user does not want a spam call, the sender of which cannot be identified, noise or vibration is unnecessary for the user. In cases where the battery residual quantity of user equipment is small, a voice call communication service causes the battery to be rapidly discharged. Accordingly, it is necessary to permit only a text message or an application messenger communication service that restrictively uses the battery. Lastly, for a user's special purpose, for example, for communication between doctors in a hospital, a pager is still used, and user equipment also needs to provide a similar function. Accordingly, in consideration of the aforementioned user requirements, various embodiments of the present disclosure propose a technology for selectively interrupting only some functions. For example, user equipment, according to various embodiments of the present disclosure, interrupts a general incoming call communication service and permits only a text communication service, such as an SMS or MMS, and a messenger application messenger communication in a messenger mode.

An existing text message like an SMS or MMS is permitted in a messenger mode. Although an incoming voice call is interrupted according to various embodiments of the present disclosure, an incoming voice call for a telephone number designated by a user is discriminatorily permitted. When the user designates a telephone number in advance, a call for the designated telephone number is permitted rather than being interrupted. Currently used user equipment utilizes a messenger communication service provided in an application form, in addition to an existing SMS or MMS text message. Many messenger communication services are introduced to markets, and a subscriber exchanges text messages with desired counterparts using an IP Internet network. CHATON SQUARE, SKYPE, KAKAOTALK, GTALK, and the like are examples of such messenger communication services. Communication is also permitted for all messenger applications or only for limited applications designated in advance by a user. The reason for permitting the communication only for the limited applications is to prevent a smart phone from consistently performing communication due to an unintended application.

Since an incoming voice call is usually interrupted in a messenger mode, according to various embodiments of the present disclosure, it is possible to more flexibly set a communication system for supporting the messenger mode. For example, an LTE system identifies whether paging is received, at every Discontinuous Reception (DRX) period. As the DRX period is set to be longer, it is advantageous for saving the power consumption of user equipment. However, a voice call connection is delayed due to the DRX period set to be longer. When an incoming voice call is excluded, the power consumption of the user equipment can be significantly saved by setting the DRX period to be very long. In the case of a text message or a messenger communication service, a degree of delay is less sensitive, compared to in the case of a voice call. When a user sets a messenger mode, user equipment reports the messenger mode to a network and receives setting information according to that the messenger mode.

Figure 2:
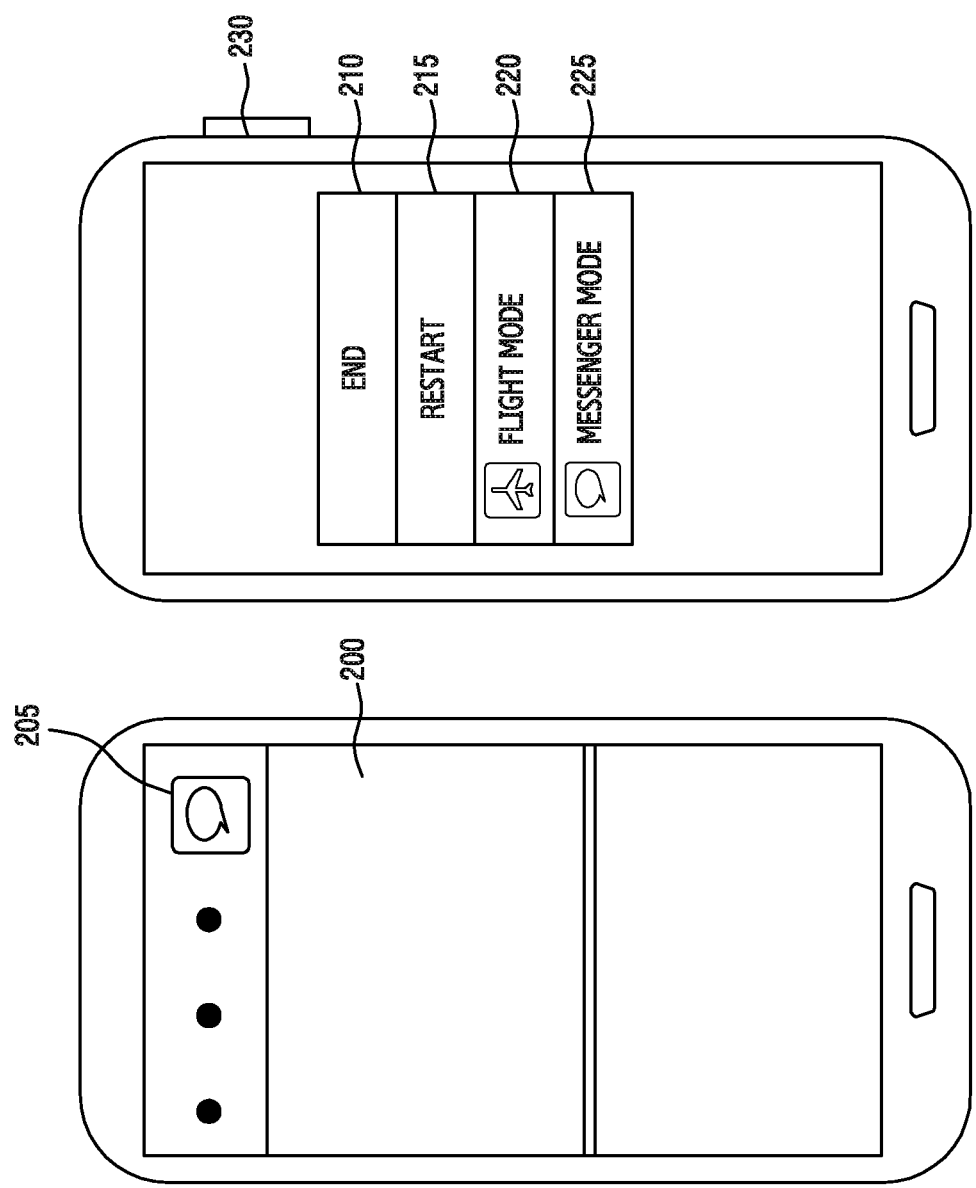
FIG. 2 illustrates an example of displaying a messenger mode in a UE according to various embodiments of the present disclosure.

FIG. 2 illustrates an example of displaying a messenger mode in a UE according to various embodiments of the present disclosure.

A user sets or disables a messenger mode by simply clicking a control icon of the messenger mode in a UE. The user also displays the control icon 205 using a physical button. A UE manufacturer or the user displays the control icon 205 on a screen 200 by performing a series of touch screen or motion operations in advance. The control icon of the messenger mode is also displayed on the screen by pressing the physical button 230 of the UE for a predetermined period of time. The physical button is a multi-purpose button, such as the power button of the UE or a separate physical button. A control icon 225 of the messenger mode is displayed by pressing the physical button and control icons for other purposes, namely, an end icon (210), a restart icon (215), and a flight mode icon (220) are displayed at the same time. The end icon (210) is used to shut off the power of the UE, the restart icon (215) is used to restart the UE, and the flight mode icon (220) is used to interrupt the communication of the UE. In addition, through a separate physical button, the UE is switched to the messenger mode with one-click.

Figure 3:
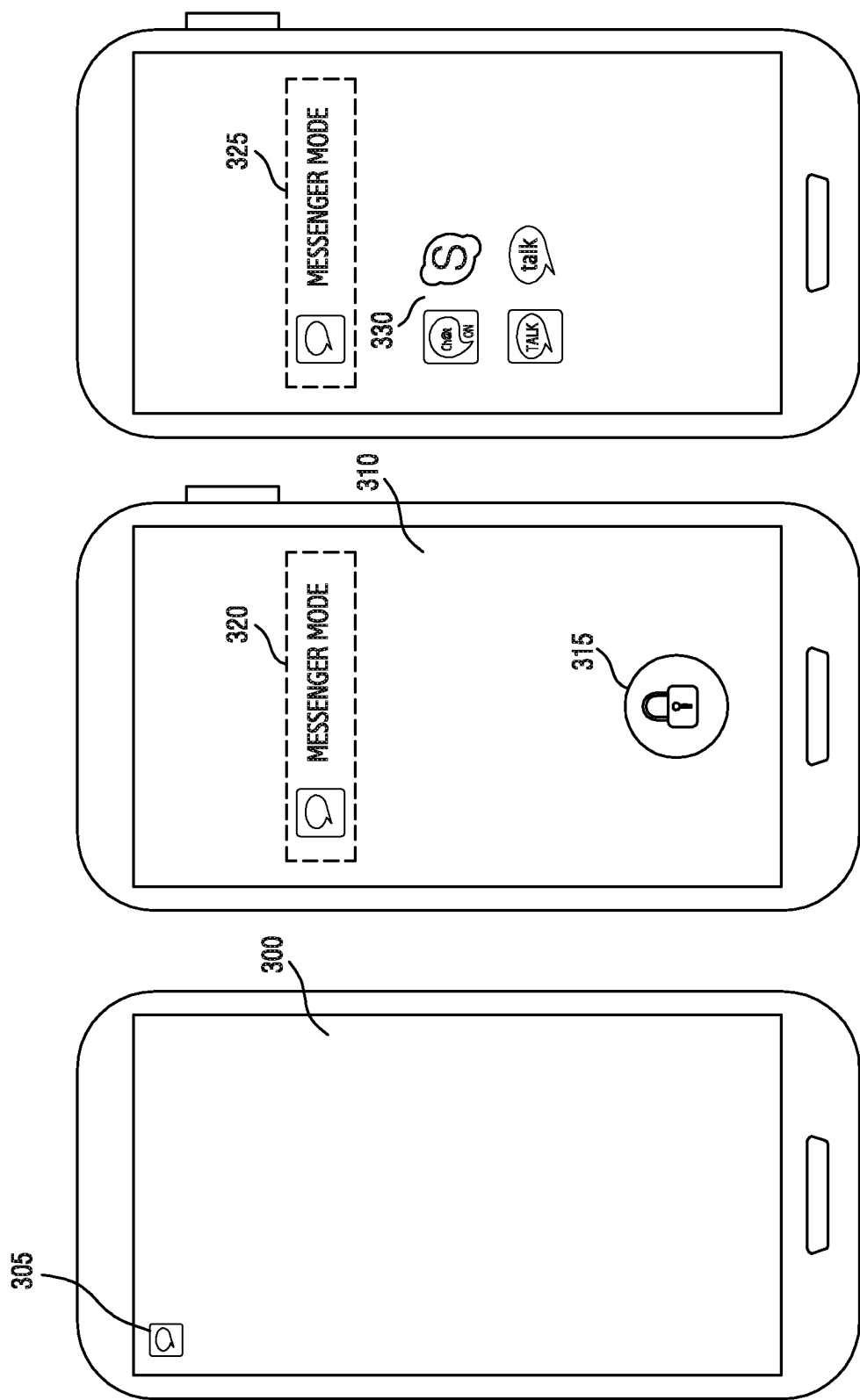
FIG. 3 illustrates an example of a display method in the setting of a messenger mode for a UE according to various embodiments of the present disclosure.

FIG. 3 illustrates an example of a display method in the setting of a messenger mode for a UE according to various embodiments of the present disclosure.

When a user switches the UE from a general communication mode to the messenger mode, it is displayed on the screen of the UE. This is to help the user consistently recognize the mode of the UE, thereby enabling the user to switch the messenger mode to the general communication mode again when it is necessary to receive an incoming voice call. The UE displays the status and a notification bar on the screen thereof. In various embodiments, the notification bar is located on the upper side of the screen 300, and an indication (305) for notifying of the activation of the messenger mode is displayed on the notification bar. The indication is applied to both a general screen and a locked screen of the UE. At a predetermined location on the locked screen 310 of the UE, the activation of the messenger mode is also displayed to be large. When the user does not touch the screen of the UE for a predetermined period of time, the UE switches to the locked screen. The locked screen is for preventing the UE from performing an unintended operation through the user's unnecessary screen touch, and is displayed as a lock icon 315. The UE switches the locked screen to a general screen through a click or motion on the icon. The user identifies a messenger mode indication 320 on the locked screen without having to switch to the general screen to recognize that an incoming voice call is being interrupted. Furthermore, when the user touches the messenger mode indication, a control icon for switching to the messenger mode is immediately displayed, thereby simplifying a mode switching procedure. In addition, a messenger-mode dedicated screen is also introduced. On the messenger mode screen, permitted messenger applications are also highlighted as indicated by reference numeral 330, in addition to the display of the messenger mode activation state 325.

Embodiments of the present disclosure propose network control signaling for supporting the above-described messenger mode. When an incoming voice call, an SMS/MMS text message, and an application messenger are provided to a specific user in the messenger mode, signaling and operations performed by related network entities are different from each other. The present disclosure employs a new signaling message for supporting the messenger mode and a new network server for supporting the messenger mode. In the present disclosure, the new network server is referred to as a 'messenger mode server.' In addition, the messenger mode server decodes collected data and distinguishes between data of a messenger application to transfer only message data of a permitted application messenger to a specific UE.

Figure 4:
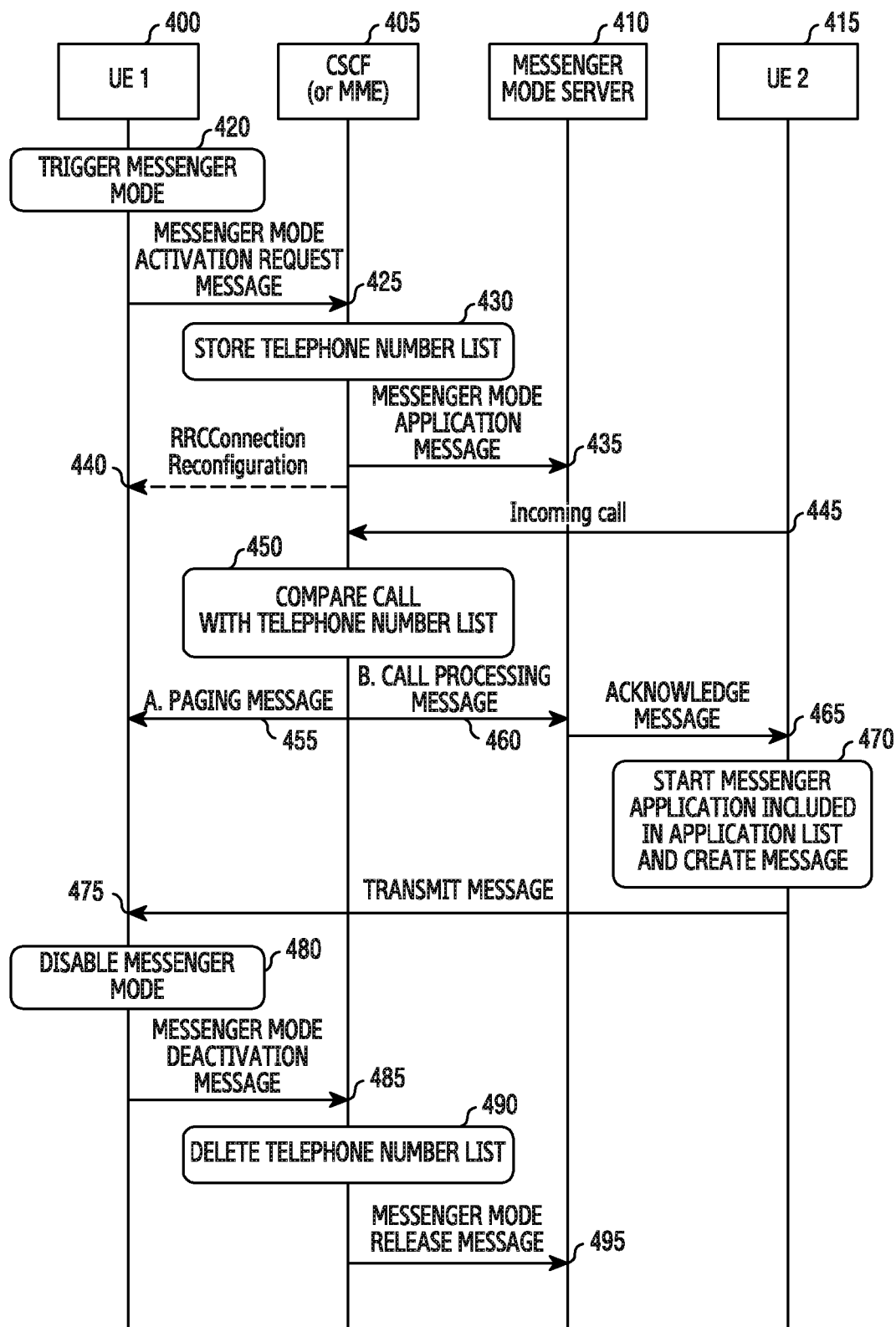
FIG. 4 illustrates an example of a control procedure for an incoming call according to various embodiments of the present disclosure.

FIG. 4 illustrates an example of a control procedure for an incoming call according to various embodiments of the present disclosure. In FIG. 4, it is exemplified that a user of UE 2 415 attempts to make a voice call to a user of UE 1 400 according to various embodiments of the present disclosure.

Referring to FIG. 4, in operation 420, UE 1 400 switches to a messenger mode according to the user's specific intention or setting. The setting includes at least one of a setting for receiving Access Class Barring (ACB) information from a base station and automatically switching to a messenger mode when an access priority is low to reduce the consumption of a battery, and a setting for automatically switching to a messenger mode in the case of a specific place and time.

In operation 425, UE 1 400 transmits a messenger mode activation request message to a call session control server. The call session control server includes a Call Session Control Function (CSCF) 405 or a Mobility Management Entity (MME). The call session control server functions to handle a part relating to call and session processing and serves as a gateway for an incoming call. The request message is for informing the call session control server 405 that the UE switches to the messenger mode. In addition, the message includes a list of messenger applications that the user is using, and a list of uninterrupted telephone numbers. The message includes a list of messenger applications that are not used by the user, and a list of telephone numbers to interrupt. The request message is used for selectively providing a communication service to the UE.

In operation 430, the call session control server 405 stores the telephone number list included in the message. In operation 435, the call session control server 405 transmits a messenger mode application message to a messenger mode server. The message includes the messenger application list. At the same time, in operation 440, the call session control server 405 selectively provides new setting information to UE 1 400. The new setting information includes setting information to which a very long DRX period is applied to maximize power consumption.

When UE 2 415 attempts to make a voice call to UE 1 400 in operation 445, information on the voice call attempt is reported to the call session control server 405, and in operation 450, the call session control server 405 determines whether to transmit a paging message for establishing the voice call to UE 1. To this end, the call session control server compares a pre-stored telephone number list with the originating telephone number. If the originating telephone number exists in the list, the user of UE 1 400 has to be notified of the telephone number despite the messenger mode of UE 1. In operation 455, the call session control server 405 transmits a paging message to UE 1 400. If not, the voice call has to be interrupted.

In operation 460, the call session control server 405 requests the messenger mode server 410 to process the interrupted call. The messenger mode server 410 functions to inform the user of UE 2 415 that the call has been interrupted due to the activation of the messenger mode in UE 1. The messenger mode server 410 additionally provides a method of communicating with the user of UE 1 400. To this end, in operation 465, the messenger mode server 410 transmits, to UE 2 415, an acknowledgement message including the messenger mode activation information of the counterpart and the messenger application list.

In operation 470, UE 2 415 automatically displays the activation or deactivation of the messenger mode of the counterpart and the messenger application list to the user. The user of UE 2 (415) creates a message using an SMS/MMS text message or the messenger application.

In operation 475, UE 2 415 transmits the message to UE 1 400. If the created message is an SMS/MMS text message, the message is transmitted to the call session control server 405 and then provided to UE 1 400.

In cases where the user of UE 1 400 disables the messenger mode in operation 480, UE 1 400 transmits a messenger mode deactivation message to the call session control server 405 in operation 485.

In operation 490, the call session control server 405 deletes the telephone number list. In operation 495, the call session control server 405 transmits the messenger mode deactivation message to the messenger mode server to inform that UE 1 400 has disabled the messenger mode.

Figure 5:
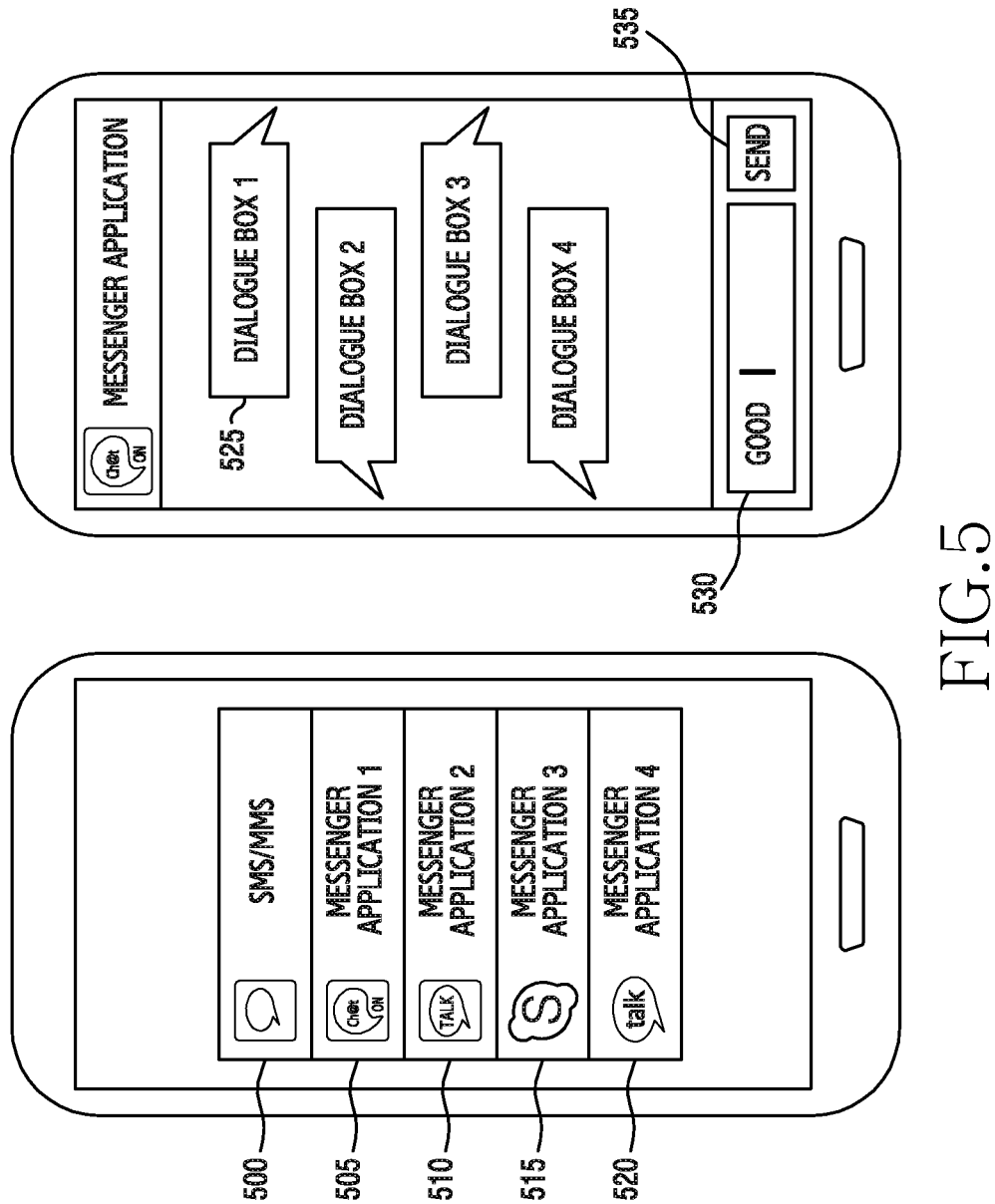
FIG. 5 illustrates an example of a method of displaying a message or a messenger after the interruption of an incoming call according to various embodiments of the present disclosure.

FIG. 5 illustrates an example of a method of displaying a message or a messenger after the interruption of an incoming call according to various embodiments of the present disclosure. When UE 2 415 identifies, in operation 470 of FIG. 4, that UE 1 400 of the user who wants to make a voice call is in the messenger mode, UE 2 415 immediately displays, on the screen thereof, a list of a text message application 500 and messenger applications 505, 510, 515, and 520, through which communication is possible, in order to reduce the operating procedure of the user of UE 2. When the user of UE 2 selects one of the text message application and the messenger applications in the list, UE 2 415 switches to a dialogue window of the selected application and send messages to the user of UE 1 400. In order to further reduce the user's operating procedure, UE 2 415 identifies the messenger mode of UE 1 400 and then immediately displays, on the screen thereof, a text message window or a dialogue window of a messenger application that has been designated in advance by the user. The dialogue window of the messenger application basically includes dialogue boxes 525 for displaying dialogue contents sent by the users of UE 1 400 and UE 2 415, an input window 530 for receiving an input of a dialogue, and a send button 535 for instructing an input dialogue to be sent.

Figure 6:
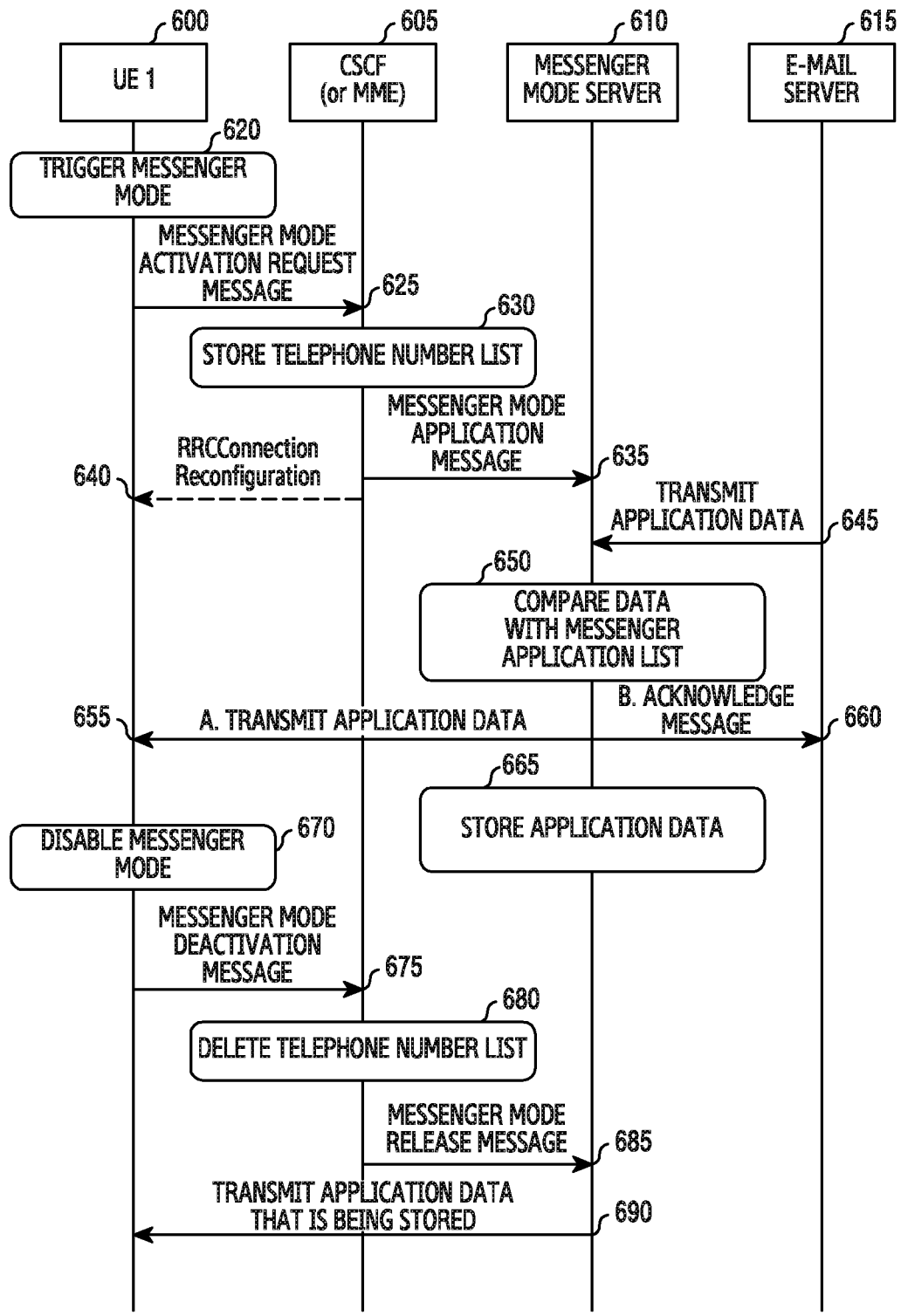
FIG. 6 illustrates an example of a procedure of receiving an application message in a messenger mode according to various embodiments of the present disclosure.

FIG. 6 illustrates an example of a procedure of receiving an application message in a messenger mode according to various embodiments of the present disclosure.

In FIG. 6, a specific communication service provider, for example, a messenger provider or an e-mail provider 615 attempts to provide application data to a user of UE 1 600.

In operation 620, the user of UE 1 600 switches to a messenger mode according to his or her specific intention. In operation 625, UE 1 600 transmits a messenger mode activation request message to a call session control server 605. The call session control server 605 functions to handle a part relating to call and session processing and serves as a gateway for an incoming call. The message is for informing the call session control server 605 that the UE switches to the messenger mode. The message includes a list of messenger applications that the user is using, and a list of uninterrupted telephone numbers. The message information is used for selectively providing a communication service to the UE. In operation 630, the call session control server 605 stores the telephone number list included in the message.

In operation 635, the call session control server 605 transmits a messenger mode application message to a messenger mode server. The message includes the messenger application list. At the same time, in operation 640, the call session control server 605 selectively provides new setting information to UE 1 600. The new setting information includes setting information to which a very long DRX period is applied to maximize power consumption.

In operation 645, the e-mail server 615 attempts to transmit application data to UE 1 600. The data is an e-mail reception notification message, a received mail list, and the like. In operation 650, the messenger mode server 610 having received the data identifies whether the data corresponds to application data included in the messenger application list. When the data corresponds to the data (message) of the messenger application, the messenger mode server 610 transmits the application data to UE 1 600 in operation 655. When the data does not correspond to the messenger application data, the messenger mode server 610 sends an acknowledgement message for informing that the receiver's UE is in the messenger mode, to the e-mail server in operation 660. In operation 665, the messenger mode server stores the application data. This is to immediately transmit data to UE 1 600 when the messenger mode of UE 1 600 is disabled later.

In operation 670, the user of UE 1 600 disables the messenger mode. In operation 675, UE 1 600 transmits a messenger mode deactivation message to the call session control server 605. In operation 680, the call session control server 605 deletes the telephone number list. In operation 685, the call session control server 605 transmits a messenger mode release message to the messenger mode server, and in operation 690, the messenger mode server transmits the application data stored therein to UE 1 600.

Figure 7:
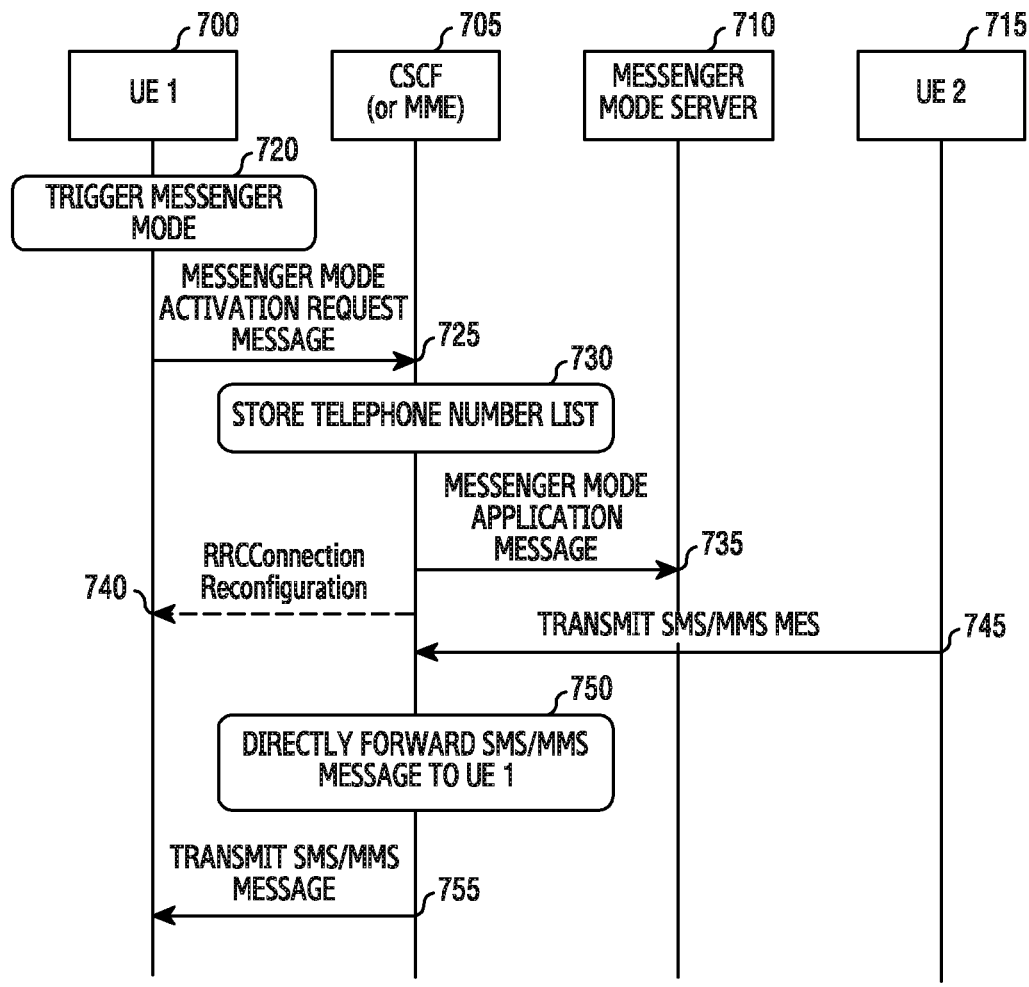
FIG. 7 illustrates an example of a procedure of receiving an SMS/MMS text message in a messenger mode according to various embodiments of the present disclosure.

FIG. 7 illustrates an example of a procedure of receiving an SMS/MMS text message in a messenger mode according to various embodiments of the present disclosure. In FIG. 7, it is exemplified that a user of UE 2 715 attempts to send an SMS/MMS text message to a user of UE 1 700. Since the SMS/MMS text message is a communication service that is allowable in a messenger mode, a signaling process is relatively simple, compared to the procedure for the incoming call control. In operation 720, the user of UE 1 700 switches to a messenger mode according to his or her specific intention. In operation 725, UE 1 700 transmits a messenger mode activation request message to a call session control server 705. In operation 730, the call session control server 705 stores a telephone number list included in the message. In operation 735, the call session control server 705 transmits a messenger mode application message to a messenger mode server. In operation 740, the call session control server selectively provides new DRX setting information to UE 1 700. In operation 745, UE 2 715 attempts to send an SMS/MMS text message to UE 1 700. Since the SMS/MMS text message is a communication service that is allowable in the messenger mode, the call session control server is going to immediately forward the SMS/MMS text message to UE 1 700 without any special determination process in operation 750. In operation 755, the call session control server transmits the SMS/MMS text message to UE 1.

Figure 8:
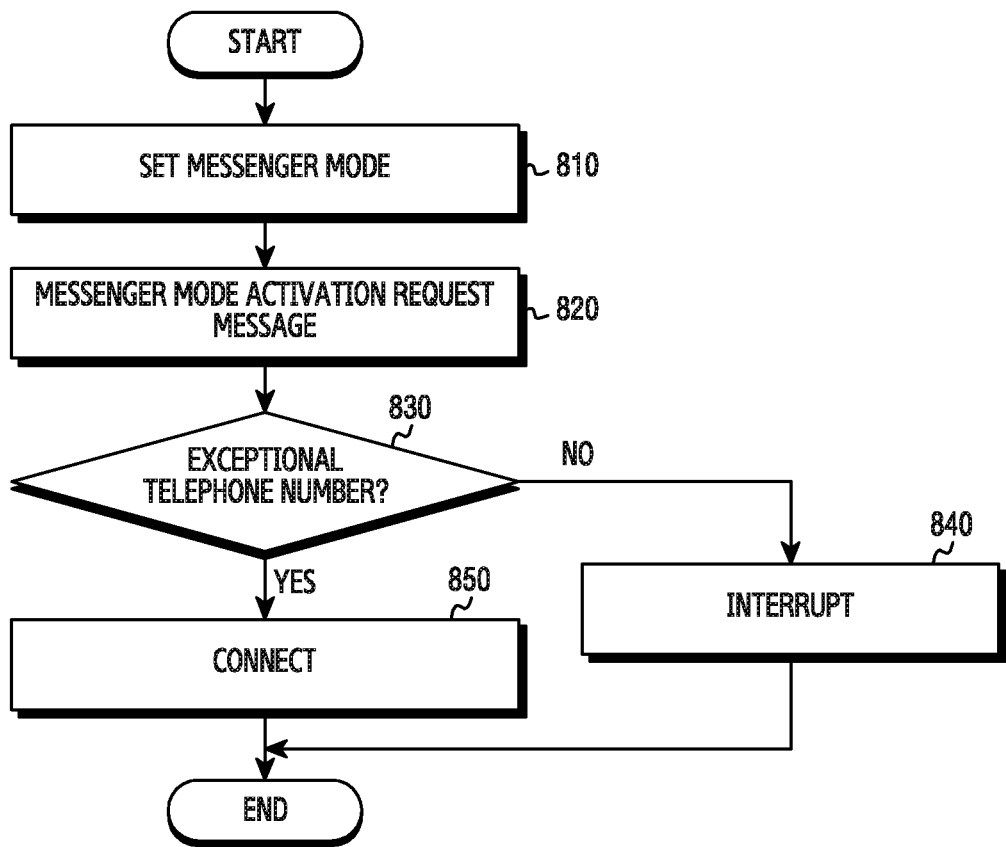
FIG. 8 illustrates an example of a control procedure for an incoming call according to various embodiments of the present disclosure.

FIG. 8 illustrates an example of a control procedure for an incoming call according to various embodiments of the present disclosure.

In operation 810, a UE sets a messenger mode. Switching to the messenger mode is automatically performed in the case of a low access priority depending on a user setting or Access Class Barring (ACB) information received from a base station, in the case of a battery capacity less than a set value, or in the case of a specific place and time.

In operation 820, the UE transmits a messenger mode activation request message. The messenger mode activation request message includes information that an incoming call is interrupted, a non-messenger mode applied telephone number list, and a messenger application list, and the like.

In operation 830, a call session control server controls an incoming call. The call session control server checks the incoming call number and compares the same with the non-messenger mode applied telephone number list included in the messenger mode activation request message received from the UE. If the incoming call is not included in the non-messenger mode applied telephone number list, the call session control server interrupts the incoming call in operation 840, and if the incoming call is included in the non-messenger mode applied telephone number list, the call session control server connects the incoming call in operation 850.

Figure 9:
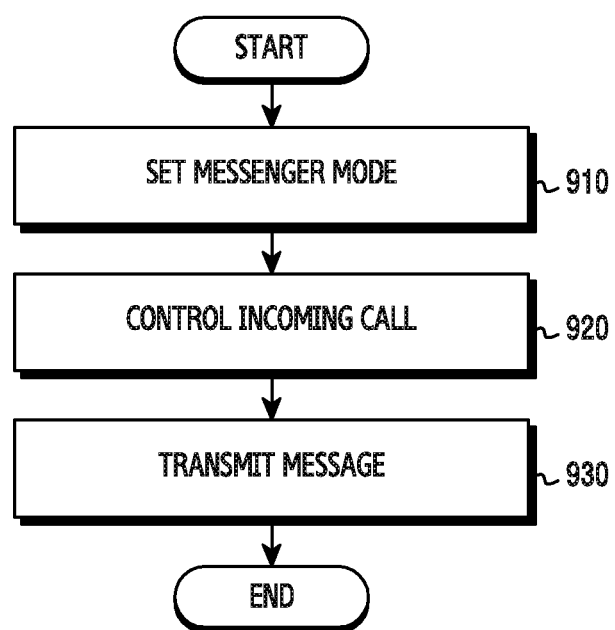
FIG. 9 illustrates an example of a control procedure for a messenger mode according to various embodiments of the present disclosure.

FIG. 9 illustrates an example of a control procedure for a messenger mode according to various embodiments of the present disclosure.

In operation 910, when a messenger mode is set, a UE displays a specific icon on the screen thereof and then transmits a messenger mode activation request message to a call session control server. The messenger mode activation request message includes information that an incoming call is interrupted, a non-messenger mode applied telephone number list, and a messenger application list, and the like.

In operation 920, the call session control server controls an incoming call. The call session control server checks the incoming call number and compares the same with the non-messenger mode applied telephone number list included in the messenger mode activation request message received from the UE. If the incoming call is not included in the non-messenger mode applied telephone number list, the call session control server interrupts the incoming call, and if the incoming call is included in the non-messenger mode applied telephone number list, the call session control server connects the incoming call.

In operation 930, the call session control server transmits a message according to the comparison result in operation 920. The call session control server restricts the incoming call according to the incoming call interruption information, performs paging to the UE for an incoming call included in the non-messenger mode applied telephone number list, and forwards a call processing message to a messenger mode server for an incoming call not included in the non-messenger mode applied telephone number list.

Figure 10:
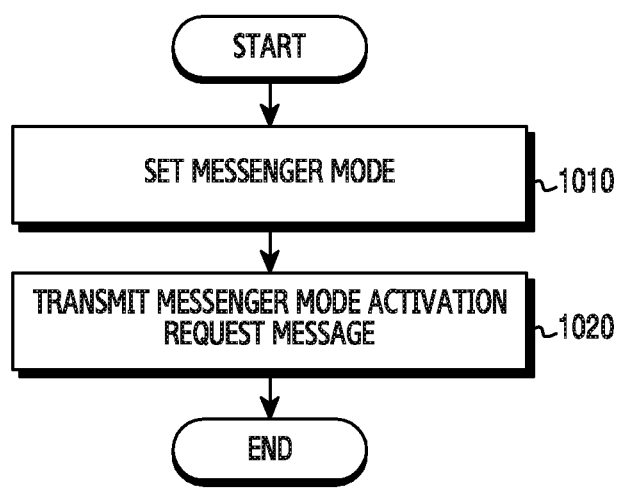
FIG. 10 illustrates an operation flow of a UE for messenger mode control according to various embodiments of the present disclosure.

FIG. 10 illustrates an operation flow of a UE for messenger mode control according to various embodiments of the present disclosure.

In operation 1010, the UE sets a messenger mode. When the messenger mode is set, the UE displays a specific icon on the screen thereof. The setting includes at least one of a setting for receiving Access Class Barring (ACB) information from a base station and automatically switching to a messenger mode when an access priority is low to reduce the consumption of a battery, and a setting for automatically switching to a messenger mode in the case of a specific place and time.

In operation 1020, the UE transmits a messenger mode activation request message to a call session control server. The messenger mode activation request message includes information that an incoming call is interrupted, a non-messenger mode applied telephone number list, and a messenger application list, and the like.

Figure 11:
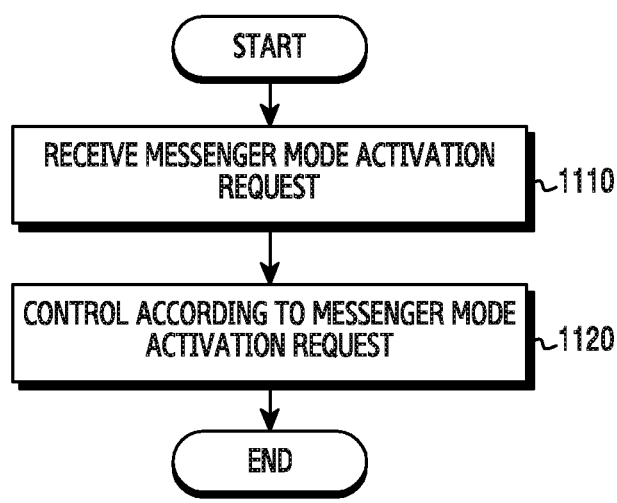
FIG. 11 illustrates an operation flow of a call session control server for messenger mode control according to various embodiments of the present disclosure.

FIG. 11 illustrates an operation flow of a call session control server for messenger mode control according to various embodiments of the present disclosure.

In operation 1110, the call session control server receives a messenger mode activation request message from a UE. The messenger mode activation request message includes information that an incoming call is interrupted, a non-messenger mode applied telephone number list, and a messenger application list, and the like.

In operation 1120, the call session control server performs a control according to the messenger mode activation request message. The call session control server restricts an incoming call according to incoming call interruption information, performs paging to the UE for an incoming call included in the non-messenger mode applied telephone number list, and forwards a call processing message to a messenger mode server for an incoming call not included in the non-messenger mode applied telephone number list.

Figure 12:
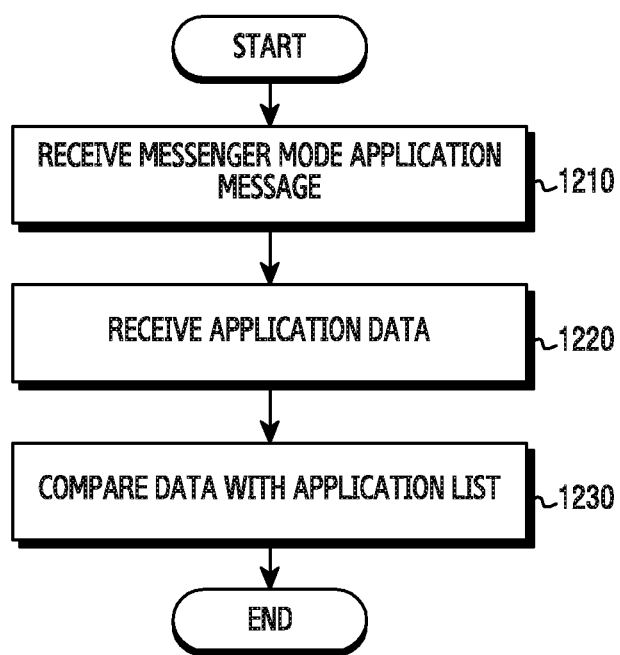
FIG. 12 illustrates an operation flow of a server for messenger mode control according to various embodiments of the present disclosure.

FIG. 12 illustrates an operation flow of a server for messenger mode control according to various embodiments of the present disclosure.

In operation 1210, the server receives a messenger mode application message from a call session control server. The messenger mode application message includes information that a UE has been set to a messenger mode, and messenger application list information.

In operation 1220, the server receives application data from a communication service provider. The application data includes an e-mail reception notification message, a received e-mail list, and the like.

In operation 1230, the server compares the application data with the messenger application list. If the application list includes an application corresponding to the application data, the server transmits a message to the UE, and if the application list does not include an application corresponding to the application data, the server transmits an acknowledgement message to the communication service provider.

Figure 13:
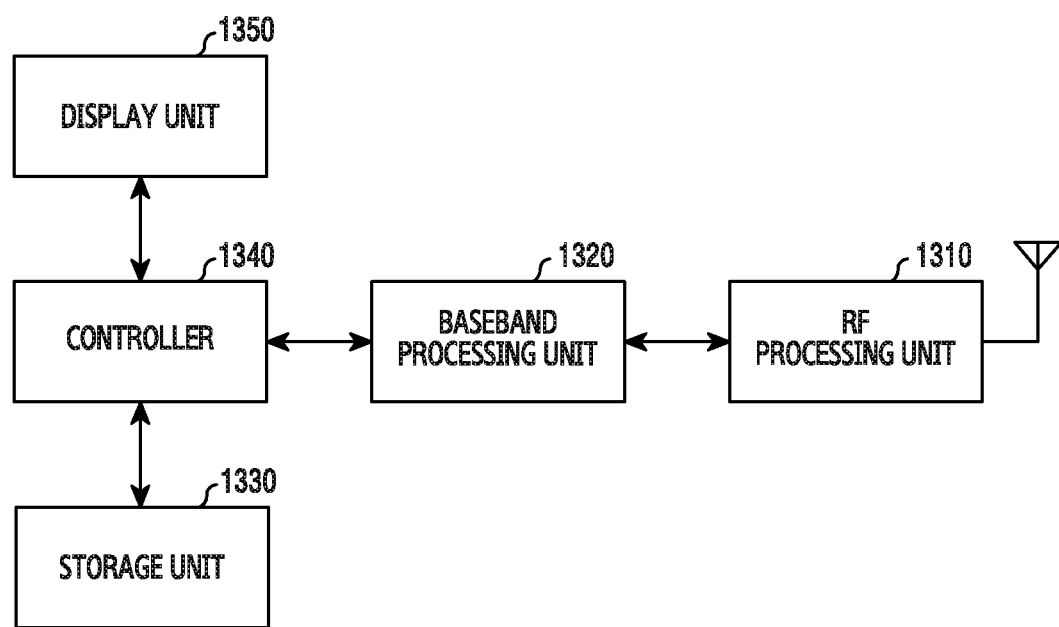
FIG. 13 is a block diagram of a UE according to various embodiments of the present disclosure.

FIG. 13 is a block diagram of a UE according to various embodiments of the present disclosure.

Referring to FIG. 13, the UE includes a Radio Frequency (RF) processing unit 1310, a baseband processing unit 1320, a storage unit 1330, a controller 1340, and a display unit 1350.

The RF processing unit 1310 performs a function for transmitting and receiving a signal through a wireless channel, such as band conversion and amplification of a signal. The RF processing unit 1310 subjects a baseband signal provided from the baseband processing unit 1320 to up-conversion to an RF band signal and then transmits the converted signal through an antenna, and subjects an RF band signal received through the antenna to down-conversion to a baseband signal. For example, the RF processing unit 1310 includes a transmission filter, a reception filter, an amplifier, a mixer, an oscillator, a Digital-to-Analog Converter (DAC), an Analog-to-Digital Converter (ADC), and the like. Although only one antenna is illustrated in FIG. 13, the transmitting end includes a plurality of antennas.

The baseband processing unit 1320 performs a conversion between a baseband signal and a bit string according to a physical layer standard of a system. For example, the baseband processing unit 1320, when transmitting data, generates complex symbols by encoding and modulating a transmission bit string. In addition, the baseband processing unit 1320, when receiving data, recovers a reception bit string through the demodulation and decoding of a baseband signal provided from the RF processing unit 1310. For example, in the case of following the OFDM scheme, the baseband processing unit 1320, when transmitting data, generates complex symbols by encoding and modulating a transmission bit string, maps the complex symbols with sub-carriers, and then configures Orthogonal Frequency Division Multiplexing (OFDM) symbols through an Inverse Fast Fourier Transform (IFFT) operation and Cyclic Prefix (CP) insertion. In addition, the baseband processing unit 1320, when receiving data, divides a baseband signal provided from the RF processing unit 1310 in units of OFDM symbols, recovers signals mapped with sub-carriers through an FFT operation, and then recovers a reception bit string through demodulation and decoding. The baseband processing unit 1320 and the RF processing unit 1310 transmit and receive signals as described above. Accordingly, the baseband processing unit 1320 and the RF processing unit 1310 is referred to as a transmitter, a receiver, a transmitter/receiver, or a communication unit.

The storage unit 1330 stores data such as a basic program, an application program, and setting information for the operation of a device for data transfer rate control. In particular, the storage unit 1330 stores information relating to a non-messenger mode applied telephone number list and a messenger application list. In addition, the storage unit 1330 provides data stored therein according to a request of the controller 1340.

The controller 1340 controls overall operations of a device for managing a messenger mode. For example, the controller 1340 accesses a base station by transmitting a signal through the baseband processing unit 1320 and the RF processing unit 1310. The controller controls the device for managing a messenger mode to perform the procedures illustrated in FIGS. 2 to 9. According to various embodiments of the present disclosure, the operation of the controller 1340 is as follows.

The controller 1340 controls the setting of a messenger mode. The controller receives ACB information from a base station and set the mode of a UE to the messenger mode when an access priority is determined to be low. In addition, the controller identifies the battery capacity of the UE and set the mode of the UE to the messenger mode when the battery residual quantity is less than a preset value. The messenger mode is characterized by receiving only exceptionally set calls and interrupting the remaining calls for voice calls, and receiving only application messages or SMS/MMS messages.

The display unit 1350 receives information from the controller and displays the same on the screen of hardware. For example, the display unit 1350 displays icons and application execution screens on the screen thereof on the basis of communication service information from the controller.

Figure 14:
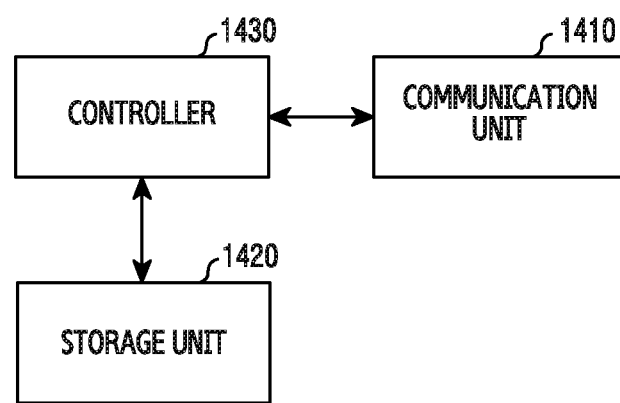
FIG. 14 is a block diagram of a server according to various embodiments of the present disclosure.

FIG. 14 illustrates a server according to various embodiments of the present disclosure.

Referring to FIG. 14, the server includes a communication unit 1410, a storage unit 1420, and a controller 1430.

The communication unit 1410 performs a function for transmitting and receiving a signal through a wireless channel, such as band conversion and amplification of a signal. The communication unit 1410 performs a conversion between a baseband signal and a bit string according to a physical layer standard of a system. Accordingly, the communication unit 1410 is referred to as a transmitter, a receiver, or a transmitter/receiver.

The storage unit 1420 stores data such as a basic program, an application program, and setting information for the operation of a device for controlling a call session control server. In particular, the storage unit 1420 stores information on a messenger mode activation request message including information that an incoming call is interrupted, a non-messenger mode applied telephone number list, a messenger application list, and the like. In addition, the storage unit 1420 provides data stored therein according to a request of the controller 1430.

The controller 1430 controls overall operations of a device for managing a messenger mode. For example, the controller 1430 transmits a signal through the communication unit 1410. The controller controls the device for controlling the call session control server to perform the procedures illustrated in FIGS. 8, 9, and 11.

The controller 1430 performs a control according to a messenger mode activation request message. The controller restricts an incoming call according to incoming call interruption information, performs paging to the UE for an incoming call included in the non-message mode applied telephone number list, and forwards a call processing message to a messenger mode server for an incoming call not included in the non-messenger mode applied telephone number list.

The messenger mode is also used when the UE accesses a mobile communication network using an embedded Universal Integrated Circuit Card (eUICC).

FIG. 15 illustrates an example of a wireless communication method between a UE and a communication service provider according to various embodiments of the present disclosure.

Referring to FIG. 15, FIG. 15 (*a*) illustrates a case in which a user connects to a wireless communication network through a Universal Integrated Circuit Card (UICC). In FIG. 15 (*a*), a UE 1510 communicates with a mobile communication service provider 1530 using a UICC 1520. The UICC 1520 provides a service only for a specific mobile communication service provider since only authentication information for the network access of a one specific mobile communication service provider is included in each UICC. Therefore, the user accesses the network of the specific mobile communication service provider 1530 according to the UICC 1520 by inserting the UICC 1520 into the UE 1510.

FIG. 15B illustrates a case in which a user connects to a wireless communication network through an embedded Universal Integrated Circuit Card (eUICC). In FIG. 15 (*b*), a UE 1550 communicates with a mobile communication service provider 1570 using an eUICC 1560. Unlike the UICC 1520 providing only a service for a predetermined specific mobile communication service provider, the eUICC 1560 allows the user to determine a specific mobile communication service provider among a plurality of mobile communication service providers to use a service that the corresponding communication service provider provides. When the user requests the specific mobile communication service provider 1570 to provide a service, using the UE including the eUICC 1560 embedded therein, the specific mobile communication service provider 1570 requests a profile providing server 1580 to download a profile, and the profile providing server 1580 encrypts the profile of the specific mobile communication service provider 1570 and then transfers the same to a profile managing server 1590. When the profile managing server 1590 transfers the encrypted profile to the eUICC using the Over The Air (OTA) technology, the UE 1550 downloads and installs the received encrypted profile to access the network of the specific mobile communication service provider 1570.

The eUICC 1560 has an eUICC Identifier (eUICCID), a secret key, and an OTA key recorded therein and includes a plurality of storage spaces. The eUICCID is unique identification information of the eUICC 1560 that is transferred to a network provider when the user subscribes to the network provider. The secret key is an encryption key for the eUICC 1560, which is used when a profile is encrypted and transferred to the eUICC 1560. The OTA key is a key for the management of the eUICC 1560, which is used for secondary encrypting of the eUICC profile.

Each of the storage spaces is used for storing a profile, and the profile store information included in the UICC. For example, the profile includes Universal Integrated Circuit Card Identifier (UICCID) information, Universal Subscriber Identity Module (USIM) information, banking information, and the like. A profile generated from a specific network provider is stored and activated in any one of the storage spaces so that the eUICC functions as an eUICC of the network provider.

Through the wireless communication network access using the eUICC, the user selects a specific mobile communication service provider among a plurality of mobile communication service providers to receive a wireless communication network service. In order to select the specific mobile communication service provider, the user accesses an intermediary server that sells a mobile communication network service.

Figure 16:
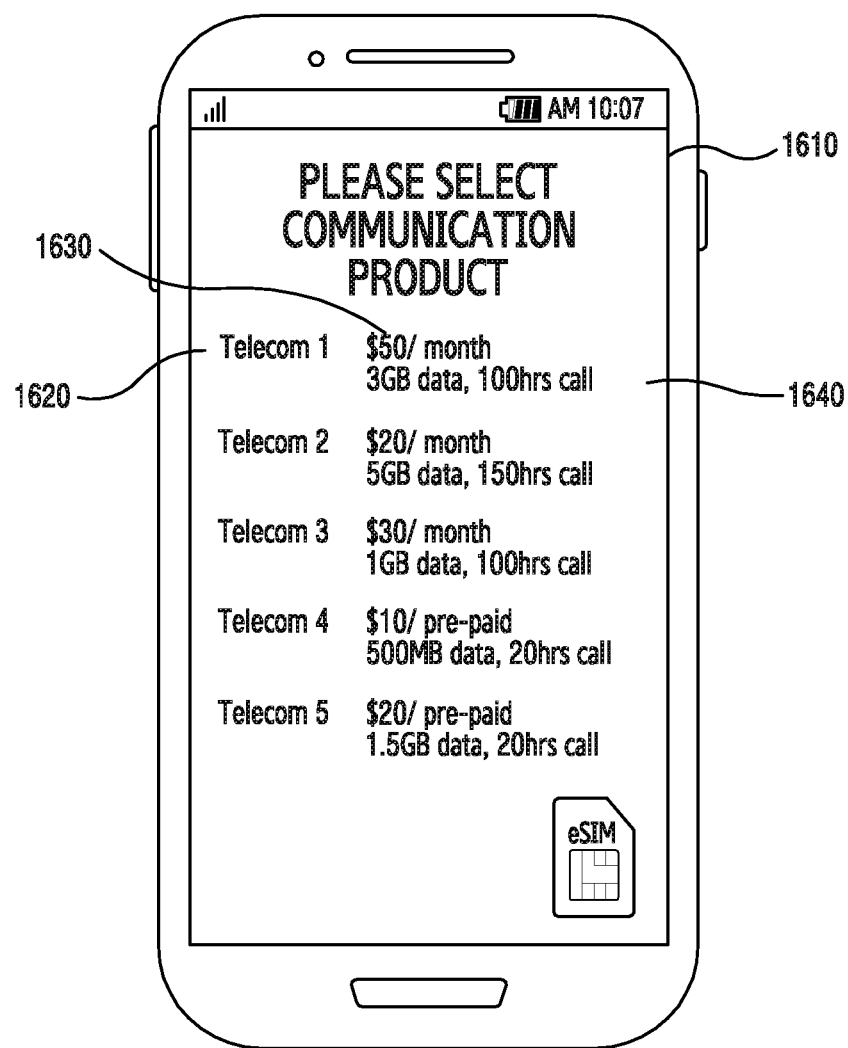
FIG. 16 illustrates an example of providing a service for the selection of a service product that provides a wireless communication network service according to various embodiments of the present disclosure.

FIG. 16 illustrates an example of providing a service for the selection of a service product that provides a wireless communication network service according to various embodiments of the present disclosure.

FIG. 16 illustrates an example 1610 of the screen display in cases where a user accesses an intermediary server that sells a mobile communication network service. The user accesses the intermediary server to identify service contents that a mobile communication service provider provides. The service contents include information on a mobile communication service provider 1620, a payment system 1630, provided service contents 1640, and the like. The information on the payment system 1630 and the provided service contents 1640 includes information on payment in advance or later, information on a monthly service fee, information on a lump sum payment, information on pre-tax or after-tax, information on the amount of calls to be available, information on the amount of data to be available, information on a method of deducting the amount of calls to be available, information on a method of deducting the amount of data to be available, and information on an additional service.

The information is displayed as text or an image. The location and the sequence in which the information is displayed are determined by a service provider of a server that plays an intermediary role in the trade of communication service products.

Figure 17:
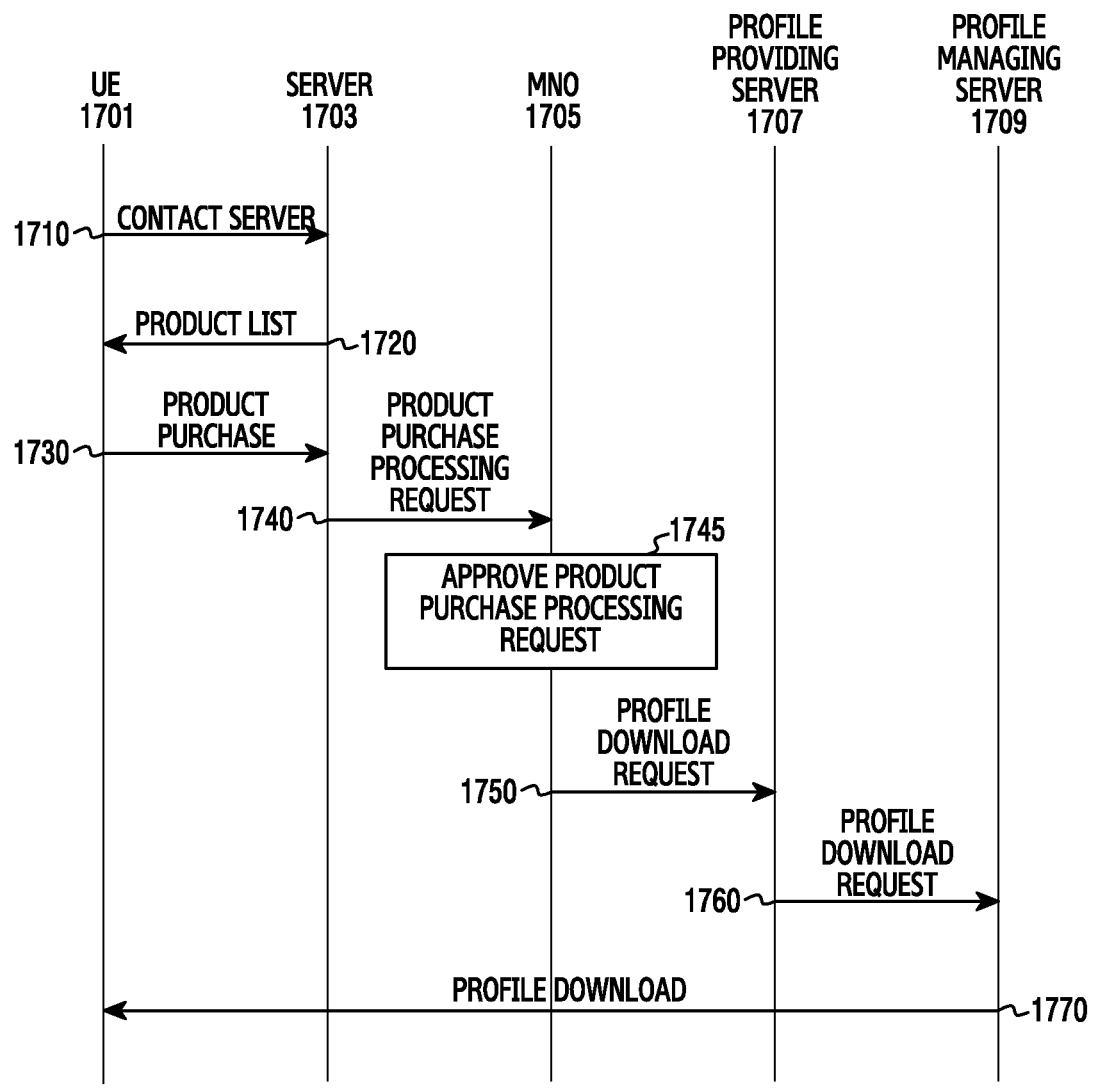
FIG. 17 illustrates an example of a communication service opening process of a UE using an embedded Universal Integrated Circuit Card (eUICC) according to various embodiments of the present disclosure.

FIG. 17 illustrates an example of a communication service opening process of a UE using an eUICC according to various embodiments of the present disclosure.

Referring to FIG. 17, the communication service opening process of a UE using an eUICC is performed through communication among a UE 1701, an intermediary server 1703, a mobile communication service provider 1705, a profile providing server 1707, and a profile managing server 1709.

In operation 1710, the UE 1701 accesses the intermediary server 1703 that plays an intermediary role in the trade of profiles between the mobile communication service provider 1705 and the UE 1701 of a user. Although only one intermediary server 1703 is illustrated in the drawing, a plurality of intermediary servers is provided, in which case the UE 1701 accesses a specific intermediary server among the plurality of intermediary servers. In cases where the plurality of intermediary servers are provided, the UE 1701 accesses an intermediary server set as a default or accesses other intermediary servers according to sites. The access to the intermediary server 1703 is made manually by a user selection or automatically by the UE. The user accesses the intermediary server 1703 by executing a specific application of the UE 1701 or manually accesses the intermediary server 1703 through a selection on a specific screen of a specific application. In addition, the UE 1701 automatically accesses the intermediary server 1703 in cases where a profile through which a communication service is available at present does not exist or in cases where a communication service is available only through roaming and there is no profile of a local network user. The UE 1701 accesses the intermediary server 1703 by providing the user's Identification (ID) and password, or by providing the user's telephone number, and transmits eUICC identifier information for distinguishing the eUICC included in the UE to the intermediary server 1703.

In operation 1720, the intermediary server 1703 provides product information to the UE 1701. When the UE 1701 accesses the intermediary server 1703, the intermediary server 1703 transmits information for subscribing to or purchasing a communication product to the UE 1701. The information is displayed as text or an image. The information include information on the mobile communication service provider 1705, a payment system, provided service contents, and the like, and the location and the sequence in which the information is displayed is determined by a service provider of the intermediary server 1703. The UE 1701 displays the information received from the intermediary server 1703. The UE 1701 displays the information as illustrated in FIG. 2 or displays the symbol or the communication company name of the mobile communication service provider 1705. When the user selects the symbol or the name of the corresponding mobile communication service provider, the UE 1701 also displays available payment systems. In addition, the UE 1701 displays the fact that the network access information of the mobile communication service provider 1705 is downloaded through a network. The UE 1701 displays a screen through which the user determines a selection of a communication product of a specific mobile communication service provider. For example, the UE 1701 displays a screen for selecting a communication product payment method and displays a screen for inputting credit card or bank account information as the payment method. In certain embodiments, the UE 1701 may also omit the payment method selecting process without providing a separate screen.

In operation 1730, the UE 1701 transmits product purchase information to the intermediary server 1703. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server 1703.

In operation 1740, the intermediary server 1703, after receiving the product purchase request information from the UE 1701, transmits product purchase processing request information to the mobile communication service provider 1705 according to the product identifier. For example, when information on a specific mobile communication service provider is included in the product identifier, the intermediary server 1703 transmits the product purchase processing request information to the corresponding specific mobile communication service provider 1705. In addition, the product identifier includes information on a payment system product, profile distinction information, and arbitrary information supported by the mobile communication service provider 1705. When the product identifier includes the profile distinction information, the profile identifier is an Integrated Circuit Card Identifier (ICCID) value. When the intermediary server 1703 transmits the eUICC identifier information, received from the UE 1701, to the mobile communication service provider 1705, the mobile communication service provider 1705 identifies an eUICC where a communication profile is to be installed.

In operation 1745, the mobile communication service provider 1705 performs approval for the product purchase processing request information received from the intermediary server 1703. After receiving the product purchase processing request from the intermediary server 1703, the mobile communication service provider 1705 updates information for providing a communication service to the UE 1701. For example, the mobile communication service provider 1705 updates an activation field corresponding to Integrated Mobile Subscription Identifier (IMSI) information mapped with the profile identifier to an authentication server. In addition, the mobile communication service provider 1705 performs mapping onto the profile identifier using the product identifier received from the intermediary server 1703. When a profile identifier is included in the product identifier, the included profile identifier is also used.

In operation 1750, the mobile communication service provider 1705 transmits a profile download request message to the profile providing server 1707. The profile download request message includes the profile identifier and the eUICC identifier received from the intermediary server 1703.

In operation 1760, the profile providing server 1707 requests the profile managing server 1709 to download a profile. Although the term 'profile providing server' is used in certain embodiments of the present disclosure, the profile providing server 1707 is Subscription Management Data Preparation (SM-DP), a profile provider, a profile provisioner, a profile provisioning credentials holder, or the like. The profile providing server 1707 preserves profile information including subscriber information installed in the eUICC and creates a profile in the form that can be installed in the eUICC. When receiving the profile download request from the mobile communication service provider 1705, the profile providing server 1707 creates a profile to allow the eUICC corresponding to the eUICC identifier to download the profile, using the received eUICC identifier and the profile identifier. The profile providing server 1707 transmits a download request message to the profile managing server 1709 to allow the UE 1701 to download the created profile. The profile is transmitted through the download request message or another form of message. The transmission is performed by transmitting a message once or by exchanging messages several times.

In operation 1770, the profile managing server 1709 transmits the profile to the UE 1701. Although the term 'profile managing server' is used in the embodiment of the present disclosure, the profile managing server 1709 is Subscription Manager Secure Routing (SM-SR), a profile manager, a profile management credentials holder, or the like. The profile managing server 1709 remotely transmits the profile to the UE corresponding to the eUICC, using the eUICC identifier included in the profile download request message received from the profile providing server 1707. The transmission is performed through message transmission/reception using a Short Message Service (SMS), message transmission/reception using IP communication of a mobile communication network, or message transmission/reception using IP communication through short-range communication technology, such as Wireless Fidelity (WiFi), Bluetooth, Near Field Communication (NFC), or the like, or Universal Serial Bus (USB) connection with a UE having a communication function. In the process of transmitting the profile, the profile managing server 1709 transmits the profile or the profile data received from the profile providing server 1707 to the UE 1701, and transmits a processing result received from the UE 1701 to the profile providing server 1707. If the profile managing server 1709 fails to receive the processing result from the UE 1701, the profile managing server 1709 transmits the corresponding profile or profile data again. The profile managing server 1709 stores all or some data of the profile download request message received from the profile providing server 1707 without transmitting the same, and when receiving a download request from the UE 1701, transmits the profile or profile data to the UE 1701.

The UE 1701 downloads the profile from the profile managing server 1709, activate the downloaded profile and accesses the corresponding mobile communication company to use a communication service. The activation of the profile is selected by the user or is automatically selected using information included in a message received from the profile managing server 1709. When the profile is completely downloaded, the UE 1701 accesses the profile managing server 1709 or the intermediary server 1703 to transmit information as to whether the download is completed. The information as to whether the download is completed includes the eUICC identifier and the profile ID.

Figure 18:
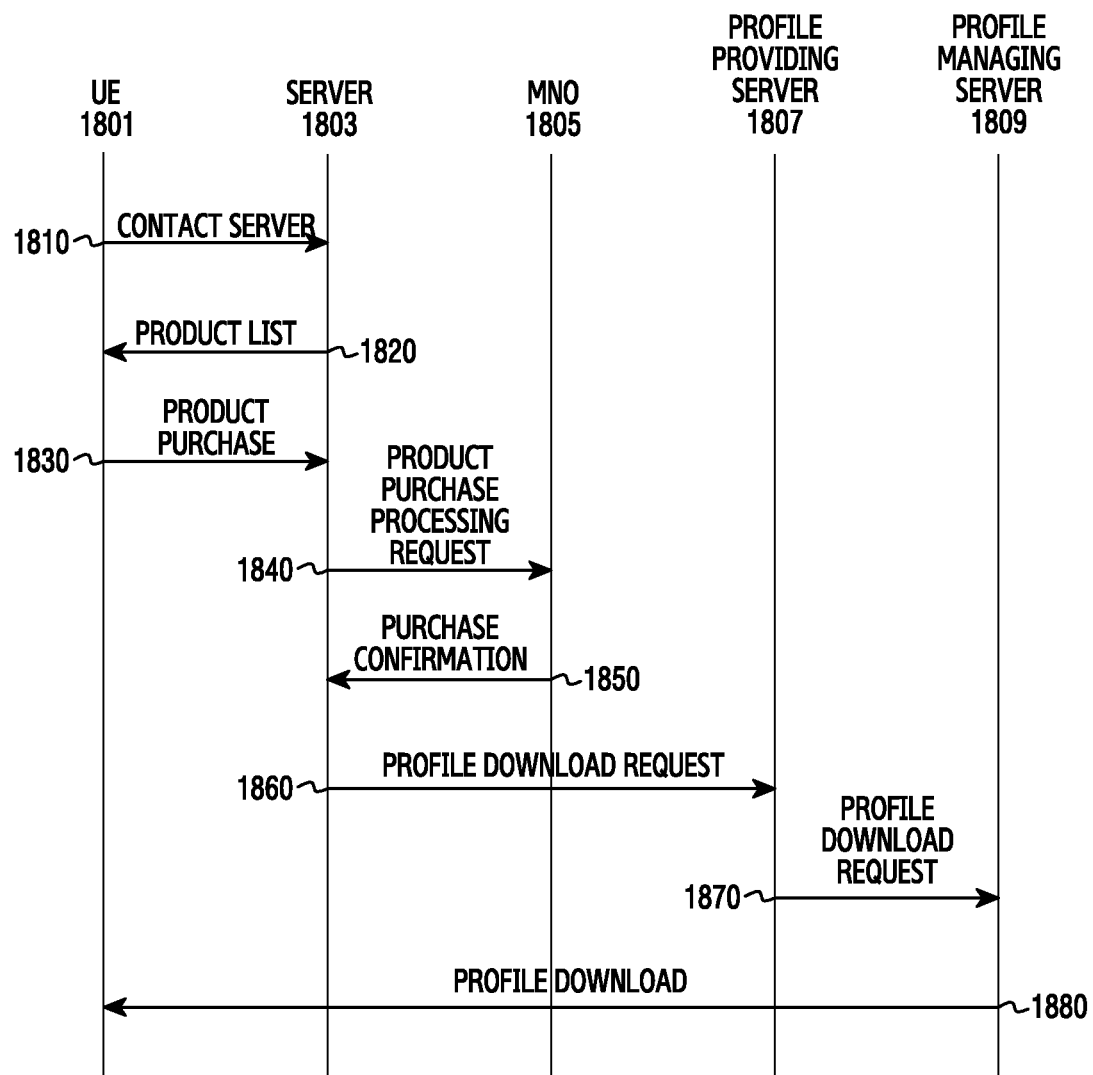
FIG. 18 illustrates an example of a communication service opening process of a UE using an eUICC according to various embodiments of the present disclosure.

FIG. 18 illustrates an example of a communication service opening process of a UE using an eUICC according to various embodiments of the present disclosure.

Referring to FIG. 18, the communication service opening process of a UE using an eUICC is performed through communication among a UE 1801, an intermediary server 1803, a mobile communication service provider 1805, a profile providing server 1807, and a profile managing server 1809.

In operation 1810, the UE 1801 accesses the intermediary server 1803 that plays an intermediary role in the trade of profiles between the mobile communication service provider 1805 and the UE 1801 of a user. Although only one intermediary server 1803 is illustrated in the drawing, a plurality of intermediary servers is provided, in which case the UE 1801 accesses a specific intermediary server among the plurality of intermediary servers. In cases where the plurality of intermediary servers are provided, the UE 1801 accesses an intermediary server set as a default or accesses other intermediary servers according to sites. The access to the intermediary server 1803 is made manually by a user selection or automatically by the UE. The user accesses the intermediary server 1803 by executing a specific application of the UE 1801 or manually accesses the intermediary server 1803 through a selection on a specific screen of a specific application. In addition, the UE 1801 automatically accesses the intermediary server 1703 in cases where a profile through which a communication service is available at present does not exist, or in cases where a communication service is available only through roaming and there is no profile of a local network user. The UE 1801 accesses the intermediary server 1803 by providing the user's identification (ID) and password, or by providing the user's telephone number, and transmits identifier information for distinguishing the eUICC included in the UE to the intermediary server 1803.

In operation 1820, the intermediary server 1803 provides product information to the UE 1801. When the UE 1801 accesses the intermediary server 1803, the intermediary server 1803 transmits information for subscribing to or purchasing a communication product to the UE 1801. The information is displayed as text or an image. The information includes information on the mobile communication service provider 1805, a payment system, provided service contents, and the like, and the location and the sequence in which the information is displayed is determined by a service provider of the intermediary server 1803. The UE 1801 displays the information received from the intermediary server 1803. The UE 1801 displays the information as illustrated in FIG. 2 or displays the symbol or the communication company name of the mobile communication service provider 1805. When the user selects the symbol or the name of the corresponding mobile communication service provider, the UE 1801 also displays available payment systems. In addition, the UE 1801 displays the fact that the network access information of the mobile communication service provider 1805 is downloaded through a network. The UE 1801 displays a screen through which the user determines a selection of a communication product of a specific mobile communication service provider. For example, the UE 1801 displays a screen for selecting a communication product payment method and displays a screen for inputting credit card or bank account information as the payment method. In certain embodiments, the UE 1801 also omits the payment method selecting process without providing a separate screen.

In operation 1830, the UE 1801 transmits product purchase information to the intermediary server 1803. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server 1803.

In operation 1840, the intermediary server 1803, after receiving the product purchase request information from the UE 1801, transmits product purchase processing request information to the mobile communication service provider 1805 according to the product identifier. For example, if information on a specific mobile communication service provider is included in the product identifier, the intermediary server 1803 transmits the product purchase processing request information to the corresponding specific mobile communication service provider 1805. In addition, the product identifier includes information on a payment system product, profile distinction information, and arbitrary information supported by the mobile communication service provider 1805. If the product identifier includes the profile distinction information, the profile identifier is an Integrated Circuit Card Identifier (ICCID) value. When the intermediary server 1803 transmits the eUICC identifier information, received from the UE 1801, to the mobile communication service provider 1805, the mobile communication service provider 1805 identifies an eUICC where a communication profile is to be installed.

In operation 1850, the mobile communication service provider 1805 performs approval for the product purchase processing request information received from the intermediary server 1803. After receiving the product purchase processing request from the intermediary server 1803, the mobile communication service provider 1805 updates information for providing a communication service to the UE 1801. For example, the mobile communication service provider 1805 updates an activation field corresponding to Integrated Mobile Subscription Identifier (IMSI) information mapped with the profile identifier to an authentication server. In addition, the mobile communication service provider 1805 performs mapping onto the profile identifier using the product identifier received from the intermediary server 1803. If a profile identifier is included in the product identifier, the included profile identifier is also used.

In operation 1860, the intermediary server 1803 transmits a profile download request message to the profile providing server 1807. The profile download request message includes the profile identifier and the eUICC identifier received from the intermediary server 1803.

In operation 1870, the profile providing server 1807 requests the profile managing server 1809 to download a profile. The profile providing server 1807 preserves profile information including subscriber information installed in the eUICC and creates a profile in the form that can be installed in the eUICC. When receiving the profile download request from the intermediary server 1803, the profile providing server 1807 creates a profile to allow the eUICC corresponding to the eUICC identifier to download the profile, using the received eUICC identifier and the profile identifier. The profile providing server 1807 transmits a download request message to the profile managing server 1809 to allow the UE 1801 to download the created profile. The profile is transmitted through the download request message or another form of message. The transmission is performed by transmitting a message once or by exchanging messages several times.

In operation 1880, the profile managing server 1809 transmits the profile to the UE 1801. The profile managing server 1809 remotely transmits the profile to the UE corresponding to the eUICC, using the eUICC identifier included in the profile download request message received from the profile providing server 1807. The transmission is performed through message transmission or reception using a Short Message Service (SMS), message transmission or reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 1809 transmits the profile or the profile data received from the profile providing server 1807 to the UE 1801, and transmits a processing result received from the UE 1801 to the profile providing server 1807. If the profile managing server 1809 fails to receive the processing result from the UE 1801, the profile managing server 1809 transmits the corresponding profile or profile data again. The profile managing server 1809 stores all or some data of the profile download request message received from the profile providing server 1807 without transmitting the same, and when receiving a download request from the UE 1801, transmits the profile or profile data to the UE 1801.

The UE 1801 downloads the profile from the profile managing server 1809, activates the downloaded profile, and accesses the corresponding mobile communication company to use a communication service. The activation of the profile is selected by the user or is automatically selected using information included in a message received from the profile managing server 1809. When the profile is completely downloaded, the UE 1801 accesses the profile managing server 1809 or the intermediary server 1803 to transmit information as to whether the download is completed. The information as to whether the download is completed includes the eUICC identifier and the profile ID.

Figure 19:
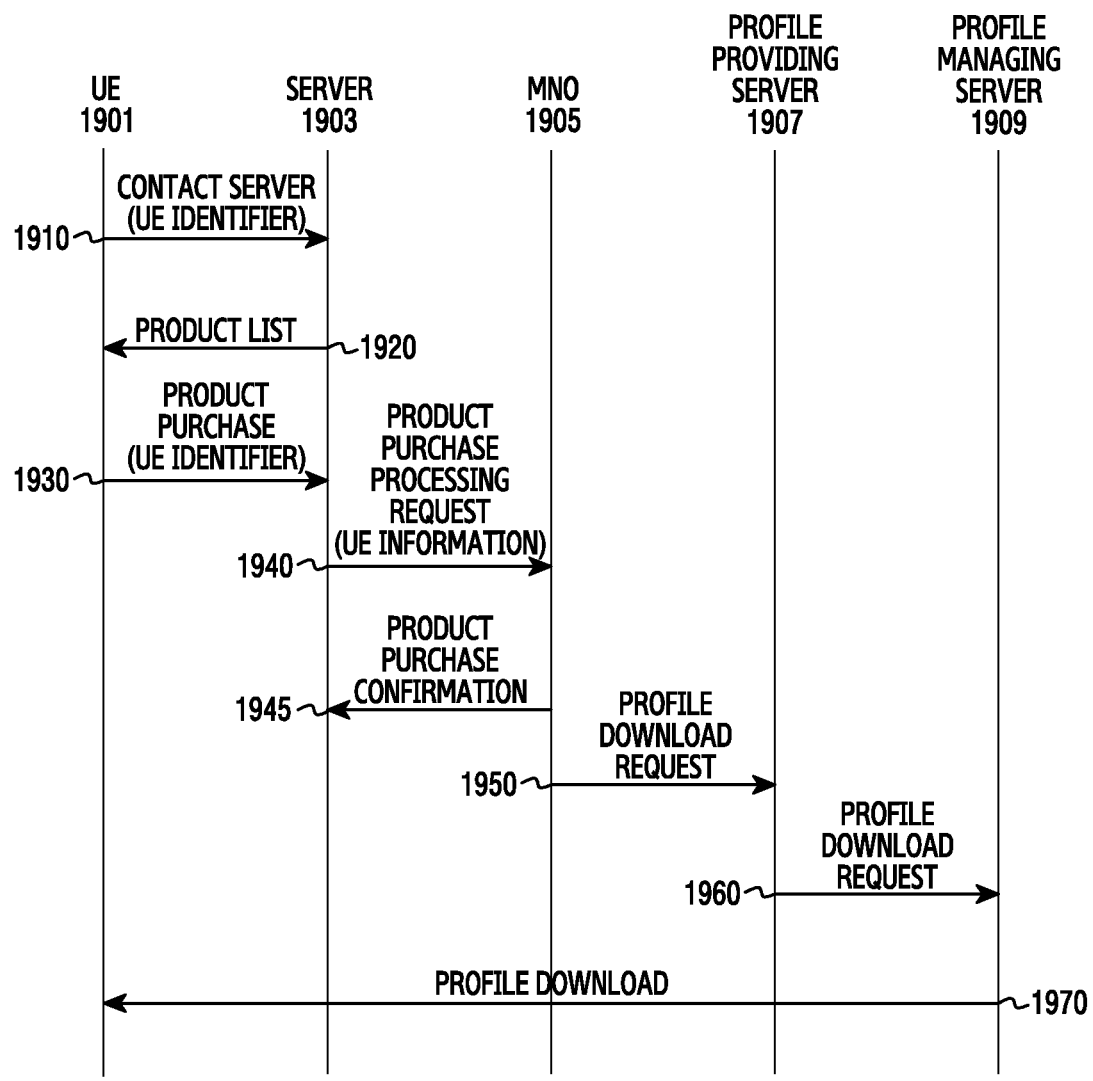
FIG. 19 illustrates an example of a communication service opening process of a UE using an eUICC depending on the capability of the UE, according to various embodiments of the present disclosure.

FIG. 19 illustrates an example of a communication service opening process of a UE using an eUICC depending on the capability of the UE, according to various embodiments of the present disclosure.

Referring to FIG. 19, the communication service opening process of a UE using an eUICC is performed through communication among a UE 1901, an intermediary server 1903, a mobile communication service provider 1905, a profile providing server 1907, and a profile managing server 1909.

In operation 1910, the UE 1901 accesses the intermediary server 1903 that plays an intermediary role in the trade of profiles between the mobile communication service provider 1905 and the UE 1901 of a user. Although only one intermediary server 1903 is illustrated in the drawing, a plurality of intermediary servers is provided, in which case the UE 1901 accesses a specific intermediary server among the plurality of intermediary servers. In cases where the plurality of intermediary servers are provided, the UE 1901 access an intermediary server set as a default, or access other intermediary servers according to sites. The access to the intermediary server 1903 is made manually by a user selection or automatically by the UE. The user accesses the intermediary server 1903 by executing a specific application of the UE 1901 or manually accesses the intermediary server 1903 through a selection on a specific screen of a specific application. In addition, the UE 1901 automatically accesses the intermediary server 1903 in cases where a profile through which a communication service is available at present does not exist, or in cases where a communication service is available only through roaming and there is no profile of a local network user. The UE 1901 accesses the intermediary server 1903 by providing the user's Identification (ID) and password, or by providing the user's telephone number, and transmits, to the intermediary server 1903, eUICC identifier information for distinguishing the eUICC included in the UE and a UE identifier for identifying the UE 1901. The UE identifier includes the capability information of the UE 1901. According to the embodiment of the present disclosure, the UE identifier is a value by which the intermediary server 1903 distinguishes the UE, and an International Mobile Equipment Identity (IMEI) value is included as an example of the UE identifier.

In operation 1920, the intermediary server 1903 provides product information to the UE 1901. The intermediary server 1930 displays only communication companies that can provide a service to the UE and product information thereof, using the UE identifier received from the UE 1901. The communication companies that can provide a service and the product information thereof vary depending on whether the UE 1901 supports a service, such as Long Term Evolution (LTE) or 3Generation (3G), in a specific frequency range of a communication service. When the UE 1901 accesses the intermediary server 1903, the intermediary server 1903 transmits information for subscribing to or purchasing a communication product to the UE 1901. The information is displayed as text or an image. The information includes information on the mobile communication service provider 1905, a payment system, provided service contents, and the like, and the location and the sequence in which the information is displayed is determined by a service provider of the intermediary server 1903. The UE 1901 displays the information received from the intermediary server 1903. The UE 1901 displays the information as illustrated in FIG. 2, or displays the symbol or the communication company name of the mobile communication service provider 1905. When the user selects the symbol or the name of the corresponding mobile communication service provider, the UE 1901 also displays available payment systems. In addition, the UE 1901 displays the fact that the network access information of the mobile communication service provider 1905 is downloaded through a network. The UE 1901 displays a screen through which the user determines a selection of a communication product of a specific mobile communication service provider. For example, the UE 1901 displays a screen for selecting a communication product payment method, and displays a screen for inputting credit card or bank account information as the payment method. In certain embodiments, the UE 1901 also omits the payment method selecting process without providing a separate screen.

In operation 1930, the UE 1901 transmits product purchase information to the intermediary server 1903. The product purchase information includes a product identifier, an eUICC identifier, the UE identifier, and payment information. The product identifier includes information for distinguishing the selection of a specific mobile communication company and a specific payment system. The payment information includes credit card information or bank account information, or includes information for notifying of the use of credit card or bank account information stored in the intermediary server 1903.

In operation 1940, the intermediary server 1903, after receiving the product purchase request information from the UE 1901, transmits product purchase processing request information to the mobile communication service provider 1905 according to the product identifier. For example, if information on a specific mobile communication service provider is included in the product identifier, the intermediary server 1903 transmits the product purchase processing request information to the corresponding specific mobile communication service provider 1905. In addition, the product identifier includes information on a payment system product, profile distinction information, and arbitrary information supported by the mobile communication service provider 1905. If the product identifier includes the profile distinction information, the profile identifier is an Integrated Circuit Card Identifier (ICCID) value. When the intermediary server 1903 transmits the eUICC identifier information, received from the UE 1901, to the mobile communication service provider 1905, the mobile communication service provider 1905 identifies an eUICC where a communication profile is to be installed.

In operation 1945, the mobile communication service provider 1905 performs approval for the product purchase processing request information received from the intermediary server 1903. After receiving the product purchase processing request from the intermediary server 1903, the mobile communication service provider 1905 updates information for providing a communication service to the UE 1901. For example, the mobile communication service provider 1905 updates an activation field corresponding to Integrated Mobile Subscription Identifier (IMSI) information mapped with the profile identifier to an authentication server. In addition, the mobile communication service provider 1905 performs mapping onto the profile identifier using the product identifier received from the intermediary server 1903. If a profile identifier is included in the product identifier, the included profile identifier is also used.

In operation 1950, the mobile communication service provider 1905 transmits a profile download request message to the profile providing server 1907. The profile download request message includes the profile identifier and the eUICC identifier received from the intermediary server 1903.

In operation 1960, the profile providing server 1907 requests the profile managing server 1909 to download a profile. Although the term 'profile providing server' is used in the embodiment of the present disclosure, the profile providing server 1907 is Subscription Management Data Preparation (SM-DP), a profile provider, a profile provisioner, a profile provisioning credentials holder, or the like. The profile providing server 1907 preserves profile information including subscriber information installed in the eUICC and creates a profile in the form that can be installed in the eUICC. When receiving the profile download request from the mobile communication service provider 1905, the profile providing server 1907 creates a profile to allow the eUICC corresponding to the eUICC identifier to download the profile, using the received eUICC identifier and the profile identifier. The profile providing server 1907 transmits a download request message to the profile managing server 1909 to allow the UE 1901 to download the created profile. The profile is transmitted through the download request message or another form of message. The transmission is performed by transmitting a message once or by exchanging messages several times.

In operation 1970, the profile managing server 1909 transmits the profile to the UE 1901. Although the term 'profile managing server' is used in the embodiment of the present disclosure, the profile managing server 1909 is Subscription Manager Secure Routing (SM-SR), a profile manager, a profile management credentials holder, or the like. The profile managing server 1909 remotely transmits the profile to the UE corresponding to the eUICC, using the eUICC identifier included in the profile download request message received from the profile providing server 1907. The transmission is performed through message transmission/reception using a Short Message Service (SMS), message transmission/reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 1909 transmits the profile or the profile data received from the profile providing server 1907 to the UE 1901 and transmits a processing result received from the UE 1901 to the profile providing server 1907. If the profile managing server 1909 fails to receive the processing result from the UE 1901, the profile managing server 1909 transmits the corresponding profile or profile data again. The profile managing server 1909 stores all or some data of the profile download request message received from the profile providing server 1907 without transmitting the same, and when receiving a download request from the UE 1901, transmits the profile or profile data to the UE 1901.

The UE 1901 downloads the profile from the profile managing server 1909, activate the downloaded profile, and access the corresponding mobile communication company to use a communication service. The activation of the profile is selected by the user or is automatically selected using information included in a message received from the profile managing server 1909. When the profile is completely downloaded, the UE 1901 accesses the profile managing server 1909 or the intermediary server 1903 to transmit information as to whether the download is completed. The information as to whether the download is completed includes the eUICC identifier and the profile ID.

Figure 20:
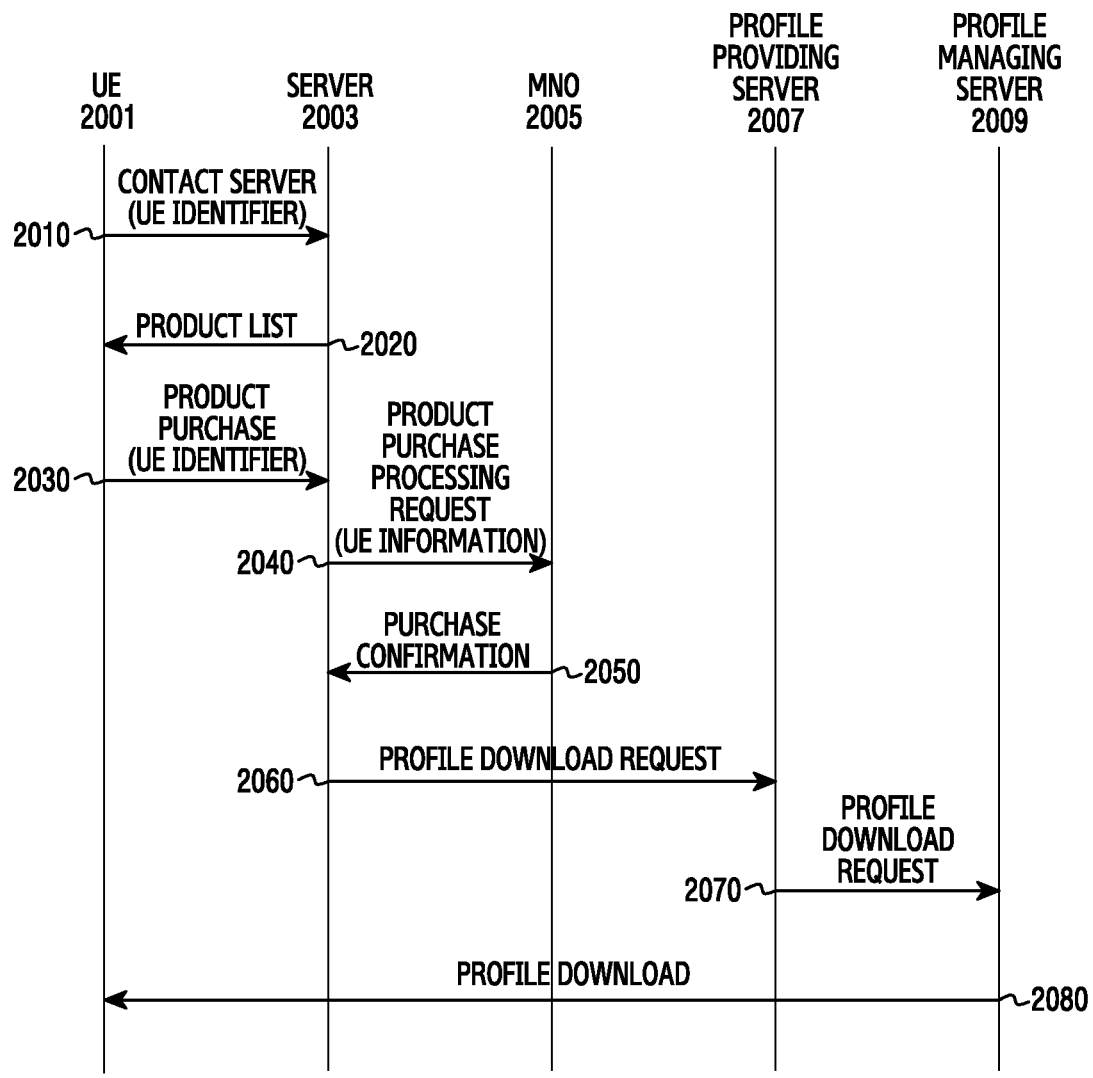
FIG. 20 illustrates an example of a communication service opening process of a UE using an eUICC depending on the capability of the UE, according to various embodiments of the present disclosure.

FIG. 20 illustrates an example of a communication service opening process of a UE using an eUICC depending on the capability of the UE, according various embodiments of the present disclosure.

Referring to FIG. 20, the communication service opening process of a UE using an eUICC is performed through communication among a UE 2001, an intermediary server 2003, a mobile communication service provider 2005, a profile providing server 2007, and a profile managing server 2009.

In operation 2010, the UE 2001 accesses the intermediary server 2003 that plays an intermediary role in the trade of profiles between the mobile communication service provider 2005 and the UE 2001 of a user. Although only one intermediary server 2003 is illustrated in the drawing, a plurality of intermediary servers is provided, in which case the UE 2001 accesses a specific intermediary server among the plurality of intermediary servers. In cases where the plurality of intermediary servers are provided, the UE 2001 accesses an intermediary server set as a default or accesses other intermediary servers according to sites. The access to the intermediary server 2003 is made manually by a user selection or automatically by the UE. The user accesses the intermediary server 2003 by executing a specific application of the UE 2001 or manually accesses the intermediary server 2003 through a selection on a specific screen of a specific application. In addition, the UE 2001 automatically accesses the intermediary server 2003 in cases where a profile through which a communication service is available at present does not exist, or in cases where a communication service is available only through roaming and there is no profile of a local network user. The UE 2001 accesses the intermediary server 2003 by providing the user's Identification (ID) and password, or by providing the user's telephone number, and transmits a UE identifier for distinguishing the eUICC included in the UE to the intermediary server 2003. The UE identifier includes the capability information of the UE 2001. According to the embodiment of the present disclosure, the UE identifier is a value by which the intermediary server 2003 distinguishes the UE, and an International Mobile Equipment Identity (IMEI) value is included as an example of the UE identifier.

In operation 2020, the intermediary server 2003 provides product information to the UE 2001. The intermediary server 2003 displays only communication companies that can provide a service to the UE and product information thereof, using the UE identifier received from the UE 2001. The communication companies that can provide a service and the product information thereof varies depending on whether the UE 2001 supports a service, such as Long Term Evolution (LTE) or 3Generation (3G), in a specific frequency range of a communication service. When the UE 2001 accesses the intermediary server 2003, the intermediary server 2003 transmits information for subscribing to or purchasing a communication product to the UE 2001. The information is displayed as text or an image. The information includes information on the mobile communication service provider 2005, a payment system, provided service contents, and the like, and the location and the sequence in which the information is displayed is determined by a service provider of the intermediary server 2003. The UE 2001 displays the information received from the intermediary server 2003. The UE 2001 displays the information as illustrated in FIG. 2, or displays the symbol or the communication company name of the mobile communication service provider 2005. When the user selects the symbol or the name of the corresponding mobile communication service provider, the UE 2001 also displays available payment systems. In addition, the UE 2001 displays the fact that the network access information of the mobile communication service provider 2005 is downloaded through a network. The UE 2001 displays a screen through which the user determines a selection of a communication product of a specific mobile communication service provider. For example, the UE 2001 displays a screen for selecting a communication product payment method and displays a screen for inputting credit card or bank account information as the payment method. In certain embodiments, the UE 2001 also omits the payment method selecting process without providing a separate screen.

In operation 2030, the UE 2001 transmits product purchase information to the intermediary server 2003. The product purchase information includes a product identifier, an eUICC identifier, the UE identifier, and payment information. The product identifier includes information for distinguishing the selection of a specific mobile communication company and a specific payment system. The payment information includes credit card information or bank account information or includes information for notifying of the use of credit card or bank account information stored in the intermediary server 2003.

In operation 2040, the intermediary server 2003, after receiving the product purchase request information from the UE 2001, transmits product purchase processing request information to the mobile communication service provider 2005 according to the product identifier. For example, if information on a specific mobile communication service provider is included in the product identifier, the intermediary server 2003 transmits the product purchase processing request information to the corresponding specific mobile communication service provider 2005. In addition, the product identifier includes information on a payment system product, profile distinction information, and arbitrary information supported by the mobile communication service provider 2005. If the product identifier includes the profile distinction information, the profile identifier is an Integrated Circuit Card Identifier (ICCID) value. When the intermediary server 2003 transmits the eUICC identifier information, received from the UE 2001, to the mobile communication service provider 2005, the mobile communication service provider 2005 identifies an eUICC where a communication profile is to be installed.

In operation 2050, the mobile communication service provider 2005 performs approval for the product purchase processing request information received from the intermediary server 2003. After receiving the product purchase processing request from the intermediary server 2003, the mobile communication service provider 2005 updates information for providing a communication service to the UE 2001. For example, the mobile communication service provider 2005 updates an activation field corresponding to Integrated Mobile Subscription Identifier (IMSI) information mapped with the profile identifier to an authentication server. In addition, the mobile communication service provider 2005 performs mapping onto the profile identifier using the product identifier received from the intermediary server 2003. If a profile identifier is included in the product identifier, the included profile identifier is also used.

In operation 2060, the intermediary server 2003 transmits a profile download request message to the profile providing server 2007. The profile download request message includes the profile identifier and the eUICC identifier received from the intermediary server 2003.

In operation 2070, the profile providing server 2007 requests the profile managing server 2009 to download a profile. The profile providing server 2007 preserves profile information including subscriber information installed in the eUICC and creates a profile in the form that can be installed in the eUICC. When receiving the profile download request from the intermediary server 2003, the profile providing server 2007 creates a profile to allow the eUICC corresponding to the eUICC identifier to download the profile using the received eUICC identifier and the profile identifier. The profile providing server 2007 transmits a download request message to the profile managing server 2009 to allow the UE 2001 to download the created profile. The profile is transmitted through the download request message or another form of message. The transmission is performed by transmitting a message once or by exchanging messages several times.

In operation 2080, the profile managing server 2009 transmits the profile to the UE 2001. The profile managing server 2009 remotely transmits the profile to the UE corresponding to the eUICC, using the eUICC identifier included in the profile download request message received from the profile providing server 2007. The transmission is performed through message transmission or reception using a Short Message Service (SMS), message transmission or reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2009 transmits the profile or the profile data received from the profile providing server 2007 to the UE 2001 and transmits a processing result received from the UE 2001 to the profile providing server 2007. If the profile managing server 2009 fails to receive the processing result from the UE 2001, the profile managing server 2009 transmits the corresponding profile or profile data again. The profile managing server 2009 stores all or some data of the profile download request message received from the profile providing server 2007 without transmitting the same, and when receiving a download request from the UE 2001, transmits the profile or profile data to the UE 2001.

The UE 2001 downloads the profile from the profile managing server 2009, activates the downloaded profile, and accesses the corresponding mobile communication company to use a communication service. The activation of the profile is selected by the user or is automatically selected using information included in a message received from the profile managing server 2009. When the profile is completely downloaded, the UE 2001 accesses the profile managing server 2009 or the intermediary server 2003 to transmit information as to whether the download is completed. The information as to whether the download is completed includes the eUICC identifier and the profile ID.

Figure 21:
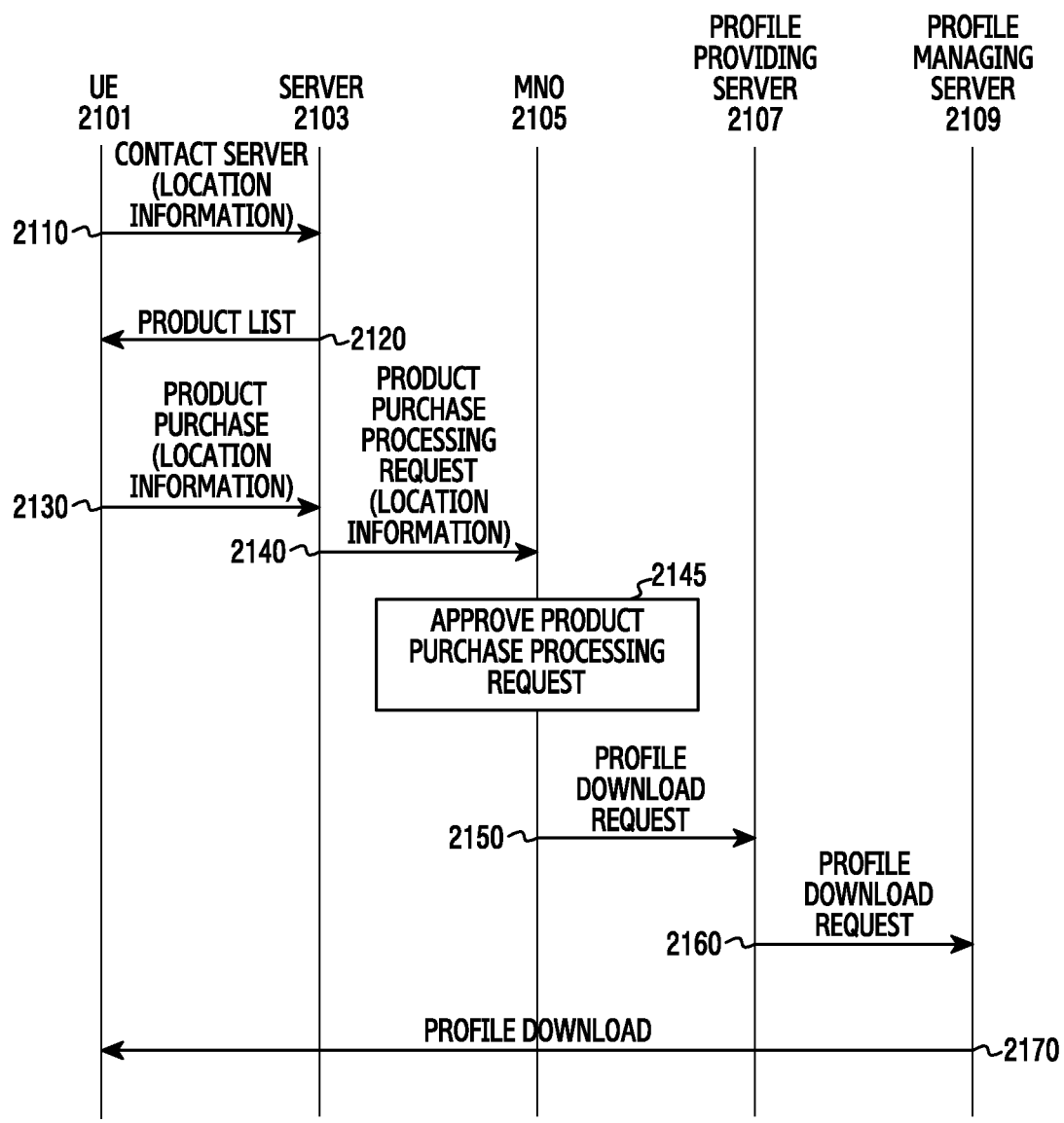
FIG. 21 illustrates an example of a communication service opening process of a UE using an eUICC depending on location information according to various embodiments of the present disclosure.

FIG. 21 illustrates an example of a communication service opening process of a UE using an eUICC depending on location information according to various embodiments of the present disclosure.

Referring to FIG. 21, the communication service opening process of a UE using an eUICC is performed through communication among a UE 2101, an intermediary server 2103, a mobile communication service provider 2105, a profile providing server 2107, and a profile managing server 2109.

In operation 2110, the UE 2101 accesses the intermediary server 2103 that plays an intermediary role in the trade of profiles between the mobile communication service provider 2105 and the UE 2101 of a user. Although only one intermediary server 2103 is illustrated in the drawing, a plurality of intermediary servers is provided, in which case the UE 2101 accesses a specific intermediary server among the plurality of intermediary servers. In cases where the plurality of intermediary servers are provided, the UE 2101 accesses an intermediary server set as a default or accesses other intermediary servers according to sites. The access to the intermediary server 2103 is made manually by a user selection or automatically by the UE. The user accesses the intermediary server 2103 by executing a specific application of the UE 2101 or manually accesses the intermediary server 2103 through a selection on a specific screen of a specific application. In addition, the UE 2101 automatically accesses the intermediary server 2103 in cases where a profile through which a communication service is available at present does not exist, or in cases where a communication service is available only through roaming and in cases where there is no profile of a local network user. The UE 2101 accesses the intermediary server 2103 by providing the user's Identification (ID) and password, or by providing the user's telephone number, and transmits, to the intermediary server 2103, eUICC identifier information for distinguishing the eUICC included in the UE, a UE identifier for identifying the UE 2101, and location information. The UE identifier includes the capability information of the UE 2101. According to the various embodiments of the present disclosure, the UE identifier is a value by which the intermediary server 2103 distinguishes the UE, and an International Mobile Equipment Identity (IMEI) value is included as an example of the UE identifier. The location information includes the location of the corresponding UE, for example, national information. The location information includes a Public Land Mobile Network (PLMN) ID scanned by the UE, the IP of the UE used by the UE, a Network Address Translation (NAT) IP of a wireless router used by the UE, a Global Positioning System (GPS) information measured by the UE, the name of a country selected by the user, ID information used by the user, the entirety or a portion of a corresponding telephone number in cases where the UE accesses with an eUICC profile that is open in advance, and information on a communication company to which the corresponding telephone number is registered in cases where the UE accesses with the eUICC profile that is open in advance. If the location information includes a plurality pieces of information, for example, if the name of a country selected by the user is the USA and the PLMN ID value scanned by the UE is 450 (Korea), the intermediary server 2103 provides an American communication company profile and transmits the location of the UE to the American communication company so that the location of the UE is utilized in services of the corresponding communication company. For example, a user who uses a communication service in Korea opens an American communication service in advance in Korea before going to the USA.

In operation 2120, the intermediary server 2103 provides product information to the UE 2101. The intermediary server 2103 displays only communication companies that can provide a service to the UE and product information thereof, using the UE identifier received from the UE 2101. The communication companies that can provide a service and the product information thereof vary depending on whether the UE 2101 supports a service, such as Long Term Evolution (LTE) or 3Generation (3G), in a specific frequency range of a communication service. In addition, the intermediary server 2103 provides only the communication companies that can provide a service and the product information thereof to the UE using the location information. For example, when the location information received from the UE is a PLMN ID, and the Mobile Operator Code (MOC) value of the PLMN ID is 450, the intermediary server 2103 provides a communication company profile that can be used in Korea. When the UE 2101 accesses the intermediary server 2103, the intermediary server 2103 transmits information for subscribing to or purchasing a communication product to the UE 2101. The information is displayed as text or an image. The information includes information on the mobile communication service provider 2105, a payment system, provided service contents, and the like, and the location and the sequence in which the information is displayed is determined by a service provider of the intermediary server 2103. The UE 2101 displays the information received from the intermediary server 2103. The UE 2101 displays the information as illustrated in FIG. 2 or displays the symbol or the communication company name of the mobile communication service provider 2105. When the user selects the symbol or the name of the corresponding mobile communication service provider, the UE 2101 also displays available payment systems. In addition, the UE 2101 displays the fact that the network access information of the mobile communication service provider 2105 is downloaded through a network. The UE 2101 displays a screen through which the user determines a selection of a communication product of a specific mobile communication service provider. For example, the UE 2101 displays a screen for selecting a communication product payment method and displays a screen for inputting credit card or bank account information as the payment method. In certain embodiments, the UE 2101 also omits the payment method selecting process without providing a separate screen.

In operation 2130, the UE 2101 transmits product purchase information to the intermediary server 2103. The product purchase information includes a product identifier, an eUICC identifier, the UE identifier, the location information, and payment information. The product identifier includes information for distinguishing the selection of a specific mobile communication company and a specific payment system. The payment information includes credit card information or bank account information or includes information for notifying of the use of credit card or bank account information stored in the intermediary server 2103.

In operation 2140, the intermediary server 2103, after receiving the product purchase request information from the UE 2101, transmits product purchase processing request information to the mobile communication service provider 2105 according to the product identifier. For example, if information on a specific mobile communication service provider is included in the product identifier, the intermediary server 2103 transmits the product purchase processing request information to the corresponding specific mobile communication service provider 2105. In addition, the product identifier includes information on a payment system product, profile distinction information, and arbitrary information supported by the mobile communication service provider 2105. If the product identifier includes the profile distinction information, the profile identifier is an Integrated Circuit Card Identifier (ICCID) value. When the intermediary server 2103 transmits the eUICC identifier information, received from the UE 2101, to the mobile communication service provider 2105, the mobile communication service provider 2105 identifies an eUICC where a communication profile is to be installed.

In operation 2145, the mobile communication service provider 2105 performs approval for the product purchase processing request information received from the intermediary server 2103. After receiving the product purchase processing request from the intermediary server 2103, the mobile communication service provider 2105 updates information for providing a communication service to the UE 2101. For example, the mobile communication service provider 2105 updates an activation field corresponding to Integrated Mobile Subscription Identifier (IMSI) information mapped with the profile identifier to an authentication server. In addition, the mobile communication service provider 2105 performs mapping onto the profile identifier using the product identifier received from the intermediary server 2103. If a profile identifier is included in the product identifier, the included profile identifier is also used.

In operation 2150, the mobile communication service provider 2105 transmits a profile download request message to the profile providing server 2107. The profile download request message includes the profile identifier and the eUICC identifier received from the intermediary server 2103.

In operation 2160, the profile providing server 2107 requests the profile managing server 2109 to download a profile. Although the term 'profile providing server' is used in the various embodiments of the present disclosure, the profile providing server 2107 is Subscription Management Data Preparation (SM-DP), a profile provider, a profile provisioner, a profile provisioning credentials holder, or the like. The profile providing server 2107 preserves profile information including subscriber information installed in the eUICC and creates a profile in the form that can be installed in the eUICC. When receiving the profile download request from the mobile communication service provider 2105, the profile providing server 2107 creates a profile to allow the eUICC corresponding to the eUICC identifier to download the profile, using the received eUICC identifier and the profile identifier. The profile providing server 2107 transmits a download request message to the profile managing server 2109 to allow the UE 2101 to download the created profile. The profile is transmitted through the download request message or another form of message. The transmission is performed by transmitting a message once or by exchanging messages several times.

In operation 2170, the profile managing server 2109 transmits the profile to the UE 2101. Although the term 'profile managing server' is used in the embodiment of the present disclosure, the profile managing server 2109 is Subscription Manager Secure Routing (SM-SR), a profile manager, a profile management credentials holder, or the like. The profile managing server 2109 remotely transmits the profile to the UE corresponding to the eUICC, using the eUICC identifier included in the profile download request message received from the profile providing server 2107. The transmission is performed through message transmission or reception using a Short Message Service (SMS), message transmission or reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2109 transmits the profile or the profile data received from the profile providing server 2107 to the UE 2101 and transmits a processing result received from the UE 2101 to the profile providing server 2107. If the profile managing server 2109 fails to receive the processing result from the UE 2101, the profile managing server 2109 transmits the corresponding profile or profile data again. The profile managing server 2109 stores all or some data of the profile download request message received from the profile providing server 2107 without transmitting the same, and when receiving a download request from the UE 2101, transmits the profile or profile data to the UE 2101.

The UE 2101 downloads the profile from the profile managing server 2109, activates the downloaded profile, and accesses the corresponding mobile communication company to use a communication service. The activation of the profile is selected by the user or is automatically selected using information included in a message received from the profile managing server 2109. When the profile is completely downloaded, the UE 2101 accesses the profile managing server 2109 or the intermediary server 2103 to transmit information as to whether the download is completed. The information as to whether the download is completed includes the eUICC identifier and the profile ID.

Figure 22:
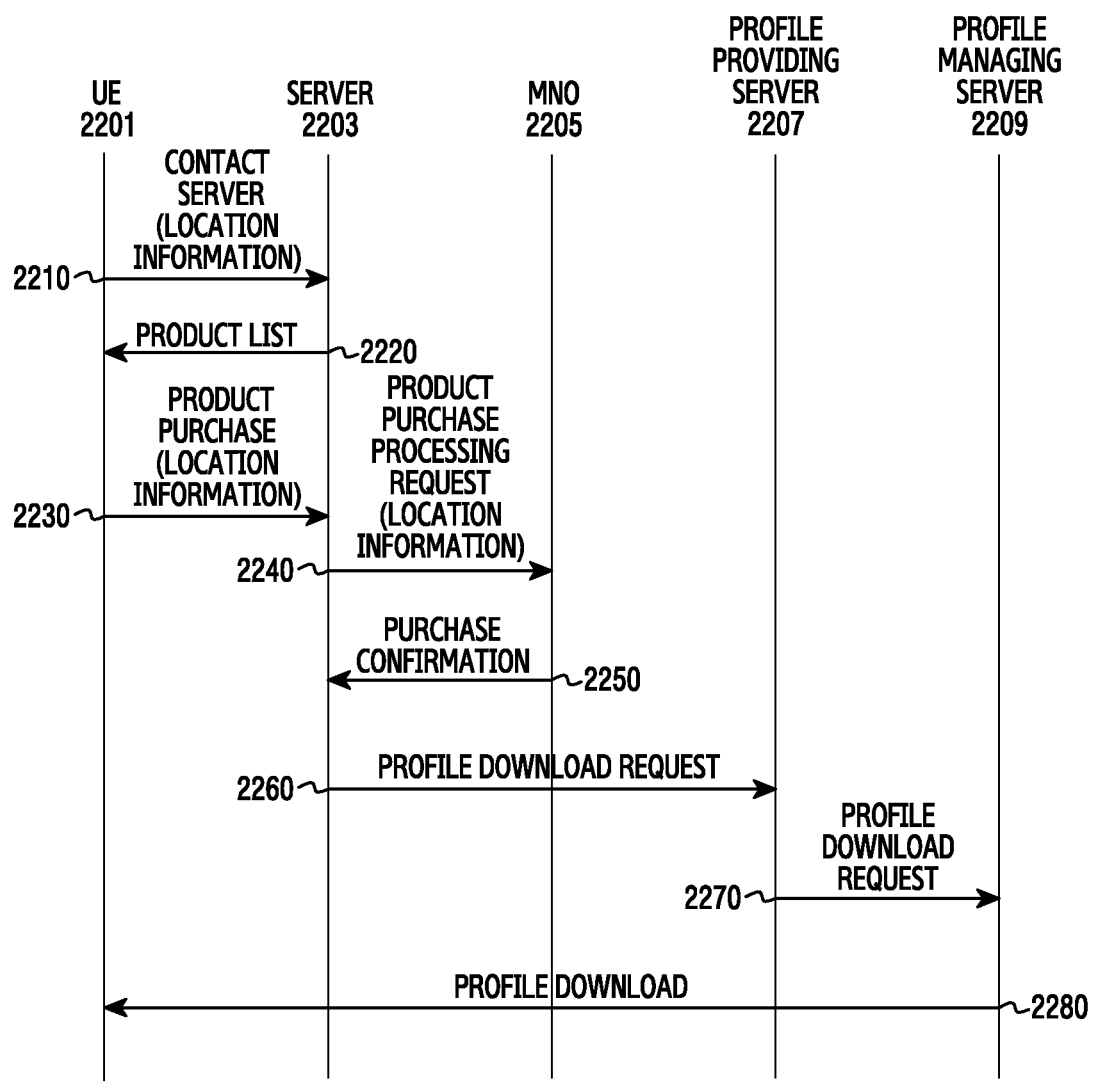
FIG. 22 illustrates an example of a communication service opening process of a UE using an eUICC depending on location information according to various embodiments of the present disclosure.

FIG. 22 illustrates an example of a communication service opening process of a UE using an eUICC depending on location information according to various embodiments of the present disclosure.

Referring to FIG. 22, the communication service opening process of a UE using an eUICC is performed through communication among a UE 2201, an intermediary server 2203, a mobile communication service provider 2205, a profile providing server 2207, and a profile managing server 2209.

In operation 2210, the UE 2201 accesses the intermediary server 2203 that plays an intermediary role in the trade of profiles between the mobile communication service provider 2205 and the user UE 2201. Although only one intermediary server 2203 is illustrated in the drawing, a plurality of intermediary servers is provided, in which case the UE 2201 accesses a specific intermediary server among the plurality of intermediary servers. In cases where the plurality of intermediary servers are provided, the UE 2201 accesses an intermediary server set as a default or accesses other intermediary servers according to sites. The access to the intermediary server 2203 is made manually by a user selection or automatically by the UE. The user accesses the intermediary server 2203 by executing a specific application of the UE 2201 or manually accesses the intermediary server 2203 through a selection on a specific screen of a specific application. In addition, the UE 2201 automatically accesses the intermediary server 2203 in cases where a profile through which a communication service is available at present does not exist, or in cases where a communication service is available only through roaming and there is no profile of a local network user. The UE 2201 accesses the intermediary server 2203 by providing the user's Identification (ID) and password, or by providing the user's telephone number, and transmits a UE identifier for distinguishing the eUICC included in the UE to the intermediary server 2203. The UE identifier includes the capability information of the UE 2201. According to the various embodiments of the present disclosure, the UE identifier is a value by which the intermediary server 2203 distinguishes the UE, and an International Mobile Equipment Identity (IMEI) value is included as an example of the UE identifier. The location information includes the location of the corresponding UE, for example, national information. The location information includes a Public Land Mobile Network (PLMN) ID scanned by the UE, the IP of the UE used by the UE, a Network Address Translation (NAT) IP of a wireless router used by the UE, a Global Positioning System (GPS) information measured by the UE, the name of a country selected by the user, ID information used by the user, the entirety or a portion of a corresponding telephone number in cases where the UE accesses with an eUICC profile that is open in advance, and information on a communication company to which the corresponding telephone number is registered in cases where the UE accesses with the eUICC profile that is open in advance. If the location information includes a plurality pieces of information, for example, if the name of a country selected by the user is the USA and the PLMN ID value scanned by the UE is 450 (Korea), the intermediary server 2203 provides an American communication company profile and transmits the location of the UE to the American communication company so that the location of the UE is utilized in services of the corresponding communication company. For example, a user who uses a communication service in Korea opens an American communication service in advance in Korea before going to the USA.

In operation 2220, the intermediary server 2203 provides product information to the UE 2201. The intermediary server 2203 displays only communication companies that can provide a service to the UE and product information thereof, using the UE identifier received from the UE 2201. The communication companies that can provide a service and the product information thereof vary depending on whether the UE 2201 supports a service, such as Long Term Evolution (LTE) or 3Generation (3G), in a specific frequency range of a communication service. In addition, the intermediary server 2203 provides only the communication companies that can provide a service and the product information thereof to the UE using the location information. For example, when the location information received from the UE is a PLMN ID, and the Mobile Operator Code (MOC) value of the PLMN ID is 450, the intermediary server 2203 provides a communication company profile that can be used in Korea. When the UE 2201 accesses the intermediary server 2203, the intermediary server 2203 transmits information for subscribing to or purchasing a communication product to the UE 2101. The information is displayed as text or an image. The information includes information on the mobile communication service provider 2205, a payment system, provided service contents, and the like, and the location and the sequence in which the information is displayed is determined by a service provider of the intermediary server 2203. The UE 2201 displays the information received from the intermediary server 2203. The UE 2201 displays the information as illustrated in FIG. 2 or displays the symbol or the communication company name of the mobile communication service provider 2205. When the user selects the symbol or the name of the corresponding mobile communication service provider, the UE 2101 also display available payment systems. In addition, the UE 2201 displays the fact that the network access information of the mobile communication service provider 2205 is downloaded through a network. The UE 2201 displays a screen through which the user determines a selection of a communication product of a specific mobile communication service provider. For example, the UE 2201 displays a screen for selecting a communication product payment method and displays a screen for inputting credit card or bank account information as the payment method. In certain embodiments, the UE 2201 may also omit the payment method selecting process without providing a separate screen.

In operation 2230, the UE 2201 transmits product purchase information to the intermediary server 2203. The product purchase information includes a product identifier, an eUICC identifier, the UE identifier, the location information, and payment information. The product identifier includes information for distinguishing the selection of a specific mobile communication company and a specific payment system. The payment information includes credit card information or bank account information or includes information for notifying of the use of credit card or bank account information stored in the intermediary server 2203.

In operation 2240, the intermediary server 2203, after receiving the product purchase request information from the UE 2201, transmits product purchase processing request information to the mobile communication service provider 2205 according to the product identifier. For example, if information on a specific mobile communication service provider is included in the product identifier, the intermediary server 2203 transmits the product purchase processing request information to the corresponding specific mobile communication service provider 2205. In addition, the product identifier includes information on a payment system product, profile distinction information and arbitrary information supported by the mobile communication service provider 2205. If the product identifier includes the profile distinction information, the profile identifier is an Integrated Circuit Card Identifier (ICCID) value. When the intermediary server 2203 transmits the eUICC identifier information, received from the UE 2201, to the mobile communication service provider 2205, the mobile communication service provider 2205 identifies an eUICC where a communication profile is to be installed.

In operation 2250, the mobile communication service provider 2205 performs approval for the product purchase processing request information received from the intermediary server 2203. After receiving the product purchase processing request from the intermediary server 2203, the mobile communication service provider 2205 updates information for providing a communication service to the UE 2201. For example, the mobile communication service provider 2205 updates an activation field corresponding to Integrated Mobile Subscription Identifier (IMSI) information mapped with the profile identifier to an authentication server. In addition, the mobile communication service provider 2205 performs mapping onto the profile identifier using the product identifier received from the intermediary server 2203. If a profile identifier is included in the product identifier, the included profile identifier is also used.

In operation 2260, the intermediary server 2203 transmits a profile download request message to the profile providing server 2207. The profile download request message includes the profile identifier and the eUICC identifier received from the intermediary server 2203.

In operation 2270, the profile providing server 2207 requests the profile managing server 2209 to download a profile. The profile providing server 2207 preserves profile information including subscriber information installed in the eUICC and creates a profile in the form that can be installed in the eUICC. When receiving the profile download request from the intermediary server 2203, the profile providing server 2207 creates a profile to allow the eUICC corresponding to the eUICC identifier to download the profile, using the received eUICC identifier and the profile identifier. The profile providing server 2207 transmits a download request message to the profile managing server 2209 to allow the UE 2201 to download the created profile. The profile is transmitted through the download request message or another form of message. The transmission is performed by transmitting a message once or by exchanging messages several times.

In operation 2280, the profile managing server 2209 transmits the profile to the UE 2201. The profile managing server 2209 remotely transmits the profile to the UE corresponding to the eUICC, using the eUICC identifier included in the profile download request message received from the profile providing server 2207. The transmission is performed through message transmission or reception using a Short Message Service (SMS), message transmission or reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2209 transmits the profile or the profile data received from the profile providing server 2207 to the UE 2201, and transmits a processing result received from the UE 2201 to the profile providing server 2207. If the profile managing server 2209 fails to receive the processing result from the UE 2201, the profile managing server 2209 transmits the corresponding profile or profile data again. The profile managing server 2209 stores all or some data of the profile download request message received from the profile providing server 2207 without transmitting the same, and when receiving a download request from the UE 2201, transmits the profile or profile data to the UE 2201.

The UE 2201 downloads the profile from the profile managing server 2209, activates the downloaded profile, and accesses the corresponding mobile communication company to use a communication service. The activation of the profile is selected by the user or is automatically selected using information included in a message received from the profile managing server 2209. When the profile is completely downloaded, the UE 2201 accesses the profile managing server 2209 or the intermediary server 2203 to transmit information as to whether the download is completed. The information as to whether the download is completed includes the eUICC identifier and the profile ID.

Figure 23:
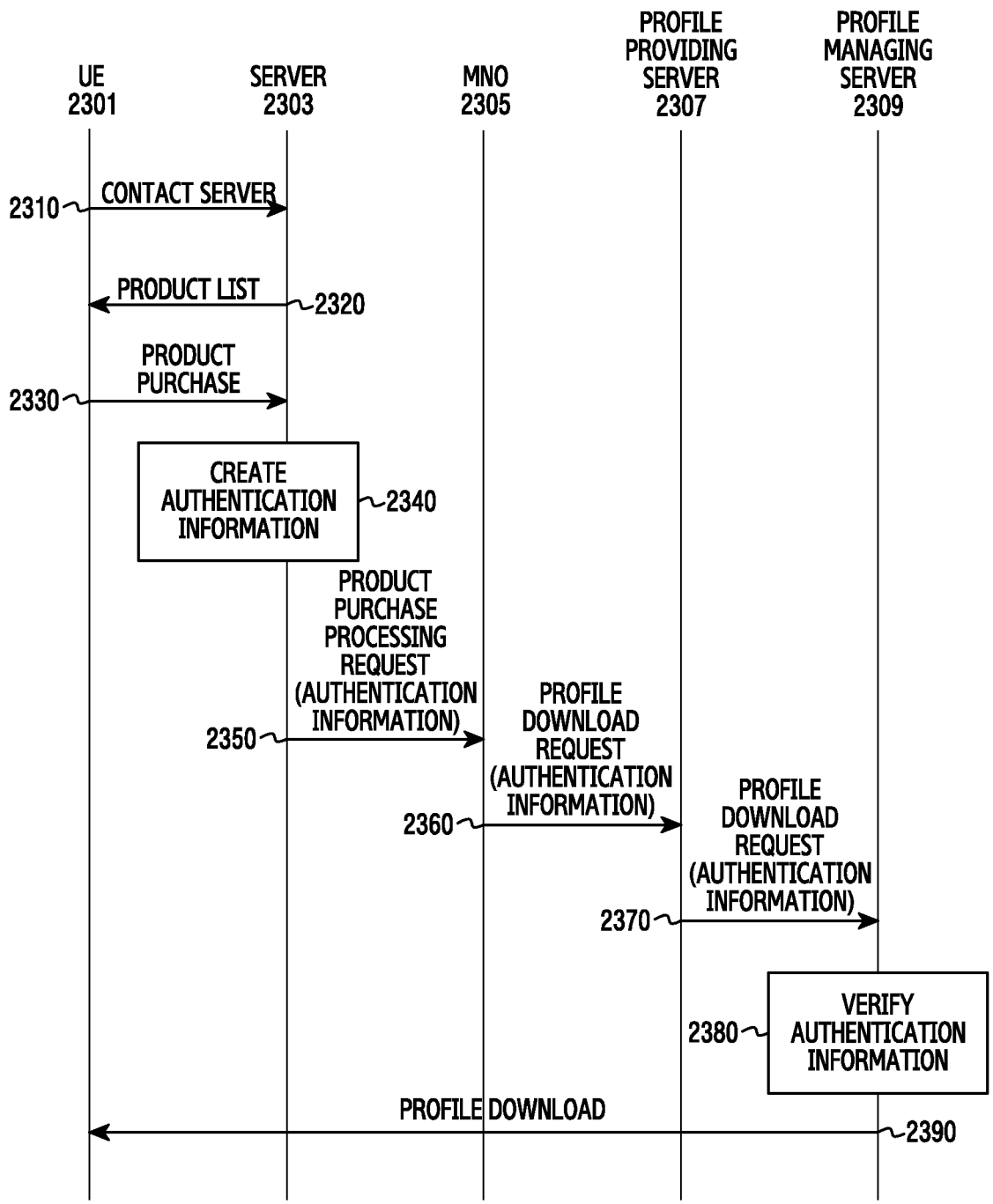
FIG. 23 illustrates an example of a communication service opening process of a UE using an eUICC through authentication information according to various embodiments of the present disclosure.

FIG. 23 illustrates an example of a communication service opening process of a UE using an eUICC through authentication information according to various embodiments of the present disclosure.

Referring to FIG. 23, the communication service opening process of a UE using an eUICC through authentication information is performed through communication among a UE 2301, an intermediary server 2303, a mobile communication service provider 2305, a profile providing server 2307, and a profile managing server 2309.

In operation 2310, the UE 2301 accesses the intermediary server 2303 that plays an intermediary role in the trade of profiles between the mobile communication service provider 2305 and the user UE 2301. Although only one intermediary server 2303 is illustrated in the drawing, a plurality of intermediary servers is provided, in which case the UE 2301 accesses a specific intermediary server among the plurality of intermediary servers. In cases where the plurality of intermediary servers are provided, the UE 2301 accesses an intermediary server set as a default, or accesses other intermediary servers according to sites. The access to the intermediary server 2303 is made manually by a user selection or automatically by the UE. The user accesses the intermediary server 2303 by executing a specific application of the UE 2301 or manually accesses the intermediary server 2303 through a selection on a specific screen of a specific application. In addition, the UE 2301 automatically accesses the intermediary server 2303 in cases where a profile through which a communication service is available at present does not exist or in cases where a communication service is available only through roaming and there is no profile of a local network user. The UE 2301 accesses the intermediary server 2303 by providing the user's Identification (ID) and password, or by providing the user's telephone number, and transmits eUICC identifier information for distinguishing the eUICC included in the UE to the intermediary server 2303.

In operation 2320, the intermediary server 2303 provides product information to the UE 2301. When the UE 2301 accesses the intermediary server 2303, the intermediary server 2303 transmits information for subscribing to or purchasing a communication product to the UE 2101. The information is displayed as text or an image. The information includes information on the mobile communication service provider 2305, a payment system, provided service contents, and the like, and the location and the sequence in which the information is displayed is determined by a service provider of the intermediary server 2303. The UE 2301 displays the information received from the intermediary server 2303. The UE 2301 displays the information as illustrated in FIG. 2 or displays the symbol or the communication company name of the mobile communication service provider 2305. When the user selects the symbol or the name of the corresponding mobile communication service provider, the UE 2101 also displays available payment systems. In addition, the UE 2301 displays the fact that the network access information of the mobile communication service provider 2305 is downloaded through a network. The UE 2301 displays a screen through which the user determines a selection of a communication product of a specific mobile communication service provider. For example, the UE 2301 displays a screen for selecting a communication product payment method and displays a screen for inputting credit card or bank account information as the payment method. In certain embodiments, the UE 2301 also omits the payment method selecting process without providing a separate screen.

In operation 2330, the UE 2301 transmits product purchase information to the intermediary server 2303. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server 2303.

In operation 2340, the intermediary server 2303, after receiving the product purchase request information from the UE 2301, transmits product purchase processing request information to the mobile communication service provider 2305 according to the product identifier. For example, if information on a specific mobile communication service provider is included in the product identifier, the intermediary server 2303 transmits the product purchase processing request information to the corresponding specific mobile communication service provider 2305. In addition, the product identifier includes information on a payment system product, profile distinction information, and arbitrary information supported by the mobile communication service provider 2305. If the product identifier includes the profile distinction information, the profile identifier is an Integrated Circuit Card Identifier (ICCID) value. When the intermediary server 2303 transmits the eUICC identifier information, received from the UE 2301, to the mobile communication service provider 2305, the mobile communication service provider 2305 identifies an eUICC where a communication profile is to be installed. The intermediary server 2303 transmits the purchase processing request information including authentication information to the mobile communication service provider 2305. The authentication information means information for distinguishing the intermediary server 2303.

In operation 2350, the mobile communication service provider 2305 performs approval for the product purchase processing request information received from the intermediary server 2303. After receiving the product purchase processing request from the intermediary server 2303, the mobile communication service provider 2305 updates information for providing a communication service to the UE 2301. For example, the mobile communication service provider 2305 updates an activation field corresponding to Integrated Mobile Subscription Identifier (IMSI) information mapped with the profile identifier to an authentication server. In addition, the mobile communication service provider 2305 performs mapping onto the profile identifier using the product identifier received from the intermediary server 2303. If a profile identifier is included in the product identifier, the included profile identifier is also used.

In operation 2360, the mobile communication service provider 2305 transmits a profile download request message to the profile providing server 2307. The profile download request message includes the profile identifier and the eUICC identifier received from the intermediary server 2303.

In operation 2370, the profile providing server 2307 requests the profile managing server 2309 to download a profile. Although the term 'profile providing server' is used in the embodiment of the present disclosure, the profile providing server 2307 is Subscription Management Data Preparation (SM-DP), a profile provider, a profile provisioner, a profile provisioning credentials holder, or the like. The profile providing server 2307 preserves profile information including subscriber information installed in the eUICC and creates a profile in the form that can be installed in the eUICC. When receiving the profile download request from the mobile communication service provider 2305, the profile providing server 2307 creates a profile to allow the eUICC corresponding to the eUICC identifier to download the profile, using the received eUICC identifier and the profile identifier. The profile providing server 2307 transmits a download request message to the profile managing server 2309 to allow the UE 2301 to download the created profile. The profile is transmitted through the download request message or another form of message. The transmission is performed by transmitting a message once or by exchanging messages several times.

In operation 2390, the profile managing server 2309 transmits the profile to the UE 2301. Although the term 'profile managing server' is used in the embodiment of the present disclosure, the profile managing server 2309 is Subscription Manager Secure Routing (SM-SR), a profile manager, a profile management credentials holder, or the like. At this time, the profile managing server 2309 determines whether to perform the corresponding profile download request, using the authentication information. For example, the profile managing server 2309 identifies whether to verify authentication information according to eUICC identifiers (eIDs). In operation 2380, the profile managing server 2309 verifies the authentication information when the values of the eUICC identifiers represent, for example, 'Yes', '1', or 'true,' and omits the verification of the authentication information when the values of the eUICC identifiers represent, for example, 'No', '0', or 'false.' In addition, according to the various embodiments of the present disclosure, the profile managing server 2309 stores verification information of the authentication information to be utilized for the authentication information according to the eUICC identifiers. For example, the authentication information is a digital signature value written with a certificate private key of the intermediary server 2303, and in this case, the verification information of the authentication information is a public key for verifying the authentication information. Furthermore, the profile managing server 2309 identifies whether the corresponding profile download request has been transferred through product purchase in the specific intermediary server 2303, using information such as an IP address, and utilizes it in the verification of the authentication information.

The profile managing server 2309 remotely transmits the profile to the UE corresponding to the eUICC, using the eUICC identifier included in the profile download request message received from the profile providing server 2307. The transmission is performed through message transmission or reception using a Short Message Service (SMS), message transmission/reception using IP communication of a mobile communication network, or message transmission/reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2309 transmits the profile or the profile data received from the profile providing server 2307 to the UE 2301, and transmits a processing result received from the UE 2301 to the profile providing server 2307. If the profile managing server 2309 fails to receive the processing result from the UE 2301, the profile managing server 2309 transmits the corresponding profile or profile data again. The profile managing server 2309 stores all or some data of the profile download request message received from the profile providing server 2307 without transmitting the same, and when receiving a download request from the UE 2301, transmits the profile or profile data to the UE 2301.

The UE 2301 downloads the profile from the profile managing server 2309, activate the downloaded profile, and access the corresponding mobile communication company to use a communication service. The activation of the profile is selected by the user or is automatically selected using information included in a message received from the profile managing server 2309. When the profile is completely downloaded, the UE 2301 accesses the profile managing server 2309 or the intermediary server 2303 to transmit information as to whether the download is completed. The information as to whether the download is completed includes the eUICC identifier and the profile ID.

Figure 24:
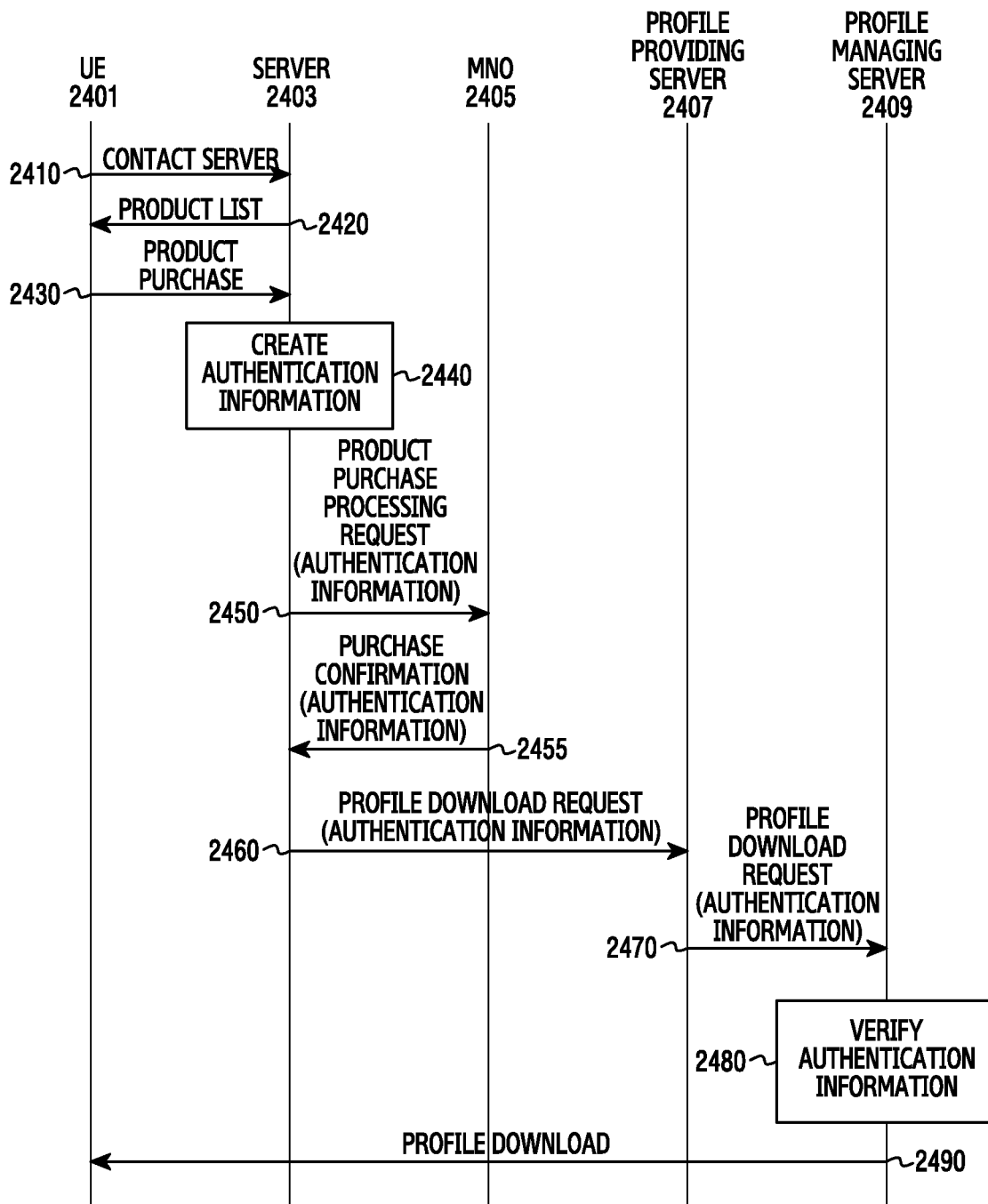
FIG. 24 illustrates an example of a communication service opening process of a UE using an eUICC through authentication information according to various embodiments of the present disclosure.

FIG. 24 illustrates an example of a communication service opening process of a UE using an eUICC through authentication information according to another embodiment of the present disclosure.

Referring to FIG. 24, the communication service opening process of a UE using an eUICC through authentication information is performed through communication among a UE 2401, an intermediary server 2403, a mobile communication service provider 2405, a profile providing server 2407, and a profile managing server 2409.

In operation 2410, the UE 2401 accesses the intermediary server 2403 that plays an intermediary role in the trade of profiles between the mobile communication service provider 2405 and the user UE 2401. Although only one intermediary server 2403 is illustrated in the drawing, a plurality of intermediary servers is provided, in which case the UE 2401 accesses a specific intermediary server among the plurality of intermediary servers. In cases where the plurality of intermediary servers are provided, the UE 2401 accesses an intermediary server set as a default or accesses other intermediary servers according to sites. The access to the intermediary server 2403 is made manually by a user selection or automatically by the UE. The user accesses the intermediary server 2403 by executing a specific application of the UE 2401 or manually accesses the intermediary server 2403 through a selection on a specific screen of a specific application. In addition, the UE 2401 automatically accesses the intermediary server 2403 in cases where a profile through which a communication service is available at present does not exist, or in cases where a communication service is available only through roaming and there is no profile of a local network user. The UE 2401 accesses the intermediary server 2403 by providing the user's Identification (ID) and password, or by providing the user's telephone number, and transmits identifier information for distinguishing the eUICC included in the UE to the intermediary server 2403.

In operation 2420, the intermediary server 2403 provides product information to the UE 2401. When the UE 2401 accesses the intermediary server 2403, the intermediary server 2403 transmits information for subscribing to or purchasing a communication product to the UE 2401. The information is displayed as text or an image. The information includes information on the mobile communication service provider 2405, a payment system, provided service contents, and the like, and the location and the sequence in which the information is displayed is determined by a service provider of the intermediary server 2403. The UE 2401 displays the information received from the intermediary server 2403. The UE 2401 displays the information as illustrated in FIG. 2 or displays the symbol or the communication company name of the mobile communication service provider 2405. When the user selects the symbol or the name of the corresponding mobile communication service provider, the UE 2401 also displays available payment systems. In addition, the UE 2401 displays the fact that the network access information of the mobile communication service provider 2405 is downloaded through a network. The UE 2401 displays a screen through which the user determines a selection of a communication product of a specific mobile communication service provider. For example, the UE 2401 displays a screen for selecting a communication product payment method and displays a screen for inputting credit card or bank account information as the payment method. In certain embodiments, the UE 2401 also omits the payment method selecting process without providing a separate screen.

In operation 2430, the UE 2401 transmits product purchase information to the intermediary server 2403. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server 2403.

In operation 2440, the intermediary server 2403, after receiving the product purchase request information from the UE 2401, creates product purchase processing request information. In operation 2450, the intermediary server 2403 transmits the product purchase processing request information to the mobile communication service provider 2405 according to the product identifier. For example, if information on a specific mobile communication service provider is included in the product identifier, the intermediary server 2403 transmits the product purchase processing request information to the corresponding specific mobile communication service provider 2405. In addition, the product identifier includes information on a payment system product, profile distinction information, and arbitrary information supported by the mobile communication service provider 2405. If the product identifier includes the profile distinction information, the profile identifier is an Integrated Circuit Card Identifier (ICCID) value. When the intermediary server 2403 transmits the eUICC identifier information, received from the UE 2401, to the mobile communication service provider 2405, the mobile communication service provider 2405 identifies an eUICC where a communication profile is to be installed. The intermediary server 2403 transmits the purchase processing request information including authentication information to the mobile communication service provider 2405. The authentication information means information for distinguishing the intermediary server 2403.

In operation 2455, the mobile communication service provider 2405 performs approval for the product purchase processing request information received from the intermediary server 2403. After receiving the product purchase processing request from the intermediary server 2403, the mobile communication service provider 2405 updates information for providing a communication service to the UE 2401. For example, the mobile communication service provider 2405 updates an activation field corresponding to Integrated Mobile Subscription Identifier (IMSI) information mapped with the profile identifier to an authentication server. In addition, the mobile communication service provider 2405 performs mapping onto the profile identifier using the product identifier received from the intermediary server 2403. If a profile identifier is included in the product identifier, the included profile identifier is also used.

In operation 2460, the intermediary server 2403 transmits a profile download request message to the profile providing server 2407. The profile download request message includes the profile identifier and the eUICC identifier received from the intermediary server 2403.

In operation 2470, the profile providing server 2407 requests the profile managing server 2409 to download a profile. The profile providing server 2407 preserves profile information including subscriber information installed in the eUICC and creates a profile in the form that can be installed in the eUICC. When receiving the profile download request from the intermediary server 2403, the profile providing server 2407 creates a profile to allow the eUICC corresponding to the eUICC identifier to download the profile, using the received eUICC identifier and the profile identifier. The profile providing server 2407 transmits a download request message to the profile managing server 2409 to allow the UE 2401 to download the created profile. The profile is transmitted through the download request message or another form of message. The transmission is performed by transmitting a message once or by exchanging messages several times.

In operation 2490, the profile managing server 2409 transmits the profile to the UE 2401. The profile managing server 2409 determines whether to perform the corresponding profile download request, using the authentication information. For example, the profile managing server 2409 identifies whether to verify authentication information according to eUICC identifiers (eIDs). In operation 2480, the profile managing server 2409 verifies the authentication information when the values of the eUICC identifiers represent, for example, 'Yes', '1', or 'true,' and omits the verification of the authentication information when the values of the eUICC identifiers represent, for example, 'No', '0', or 'false.' In addition, according to the embodiment of the present disclosure, the profile managing server 2409 stores verification information of the authentication information to be utilized for the authentication information according to the eUICC identifiers. For example, the authentication information is a digital signature value written with a certificate private key of the intermediary server 2403, and in this case, the verification information of the authentication information is a public key for verifying the authentication information. Furthermore, the profile managing server 2409 identifies whether the corresponding profile download request has been transferred through product purchase in the specific intermediary server 2403, using information such as an IP address, and utilizes it in the verification of the authentication information. The profile managing server 2409 remotely transmits the profile to the UE corresponding to the eUICC, using the eUICC identifier included in the profile download request message received from the profile providing server 2407. The transmission is performed through message transmission or reception using a Short Message Service (SMS), message transmission or reception using IP communication of a mobile communication network, or message transmission/reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2409 transmits the profile or the profile data received from the profile providing server 2407 to the UE 2401 and transmits a processing result received from the UE 2401 to the profile providing server 2407. If the profile managing server 2409 fails to receive the processing result from the UE 2401, the profile managing server 2409 transmits the corresponding profile or profile data again. The profile managing server 2409 stores all or some data of the profile download request message received from the profile providing server 2407 without transmitting the same, and when receiving a download request from the UE 2401, transmits the profile or profile data to the UE 2401.

The UE 2401 downloads the profile from the profile managing server 2409, activate the downloaded profile and accesses the corresponding mobile communication company to use a communication service. The activation of the profile is selected by the user or is automatically selected using information included in a message received from the profile managing server 2409. When the profile is completely downloaded, the UE 2401 accesses the profile managing server 2409 or the intermediary server 2403 to transmit information as to whether the download is completed. The information as to whether the download is completed includes the eUICC identifier and the profile ID.

Figure 25:
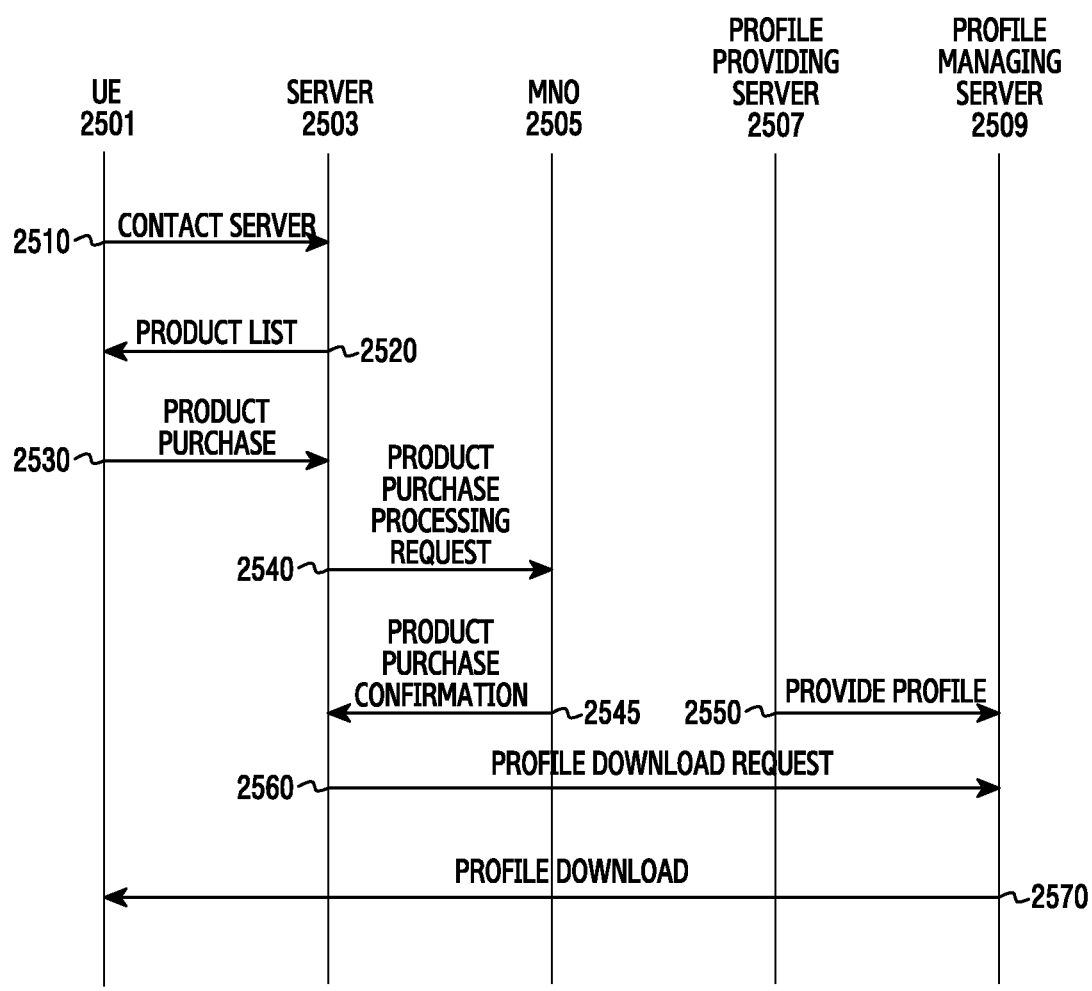
FIG. 25 illustrates an example of a communication service opening process of a UE using an eUICC through storing a profile in advance according to various embodiments of the present disclosure.

FIG. 25 illustrates an example of a communication service opening process of a UE using an eUICC through storing a profile in advance according to various embodiments of the present disclosure.

Referring to FIG. 25, the communication service opening process of a UE using an eUICC through storing a profile in advance is performed through communication among a UE 2501, an intermediary server 2503, a mobile communication service provider 2505, a profile providing server 2507, and a profile managing server 2509.

In operation 2510, the UE 2501 accesses the intermediary server 2503 that plays an intermediary role in the trade of profiles between the mobile communication service provider 2505 and the user UE 2501. Although only one intermediary server 2503 is illustrated in the drawing, a plurality of intermediary servers is provided, in which case the UE 2501 accesses a specific intermediary server among the plurality of intermediary servers. In cases where the plurality of intermediary servers are provided, the UE 2501 accesses an intermediary server set as a default or accesses other intermediary servers according to sites. The access to the intermediary server 2503 is made manually by a user selection or automatically by the UE. The user accesses the intermediary server 2503 by executing a specific application of the UE 2501 or manually accesses the intermediary server 2503 through a selection on a specific screen of a specific application. In addition, the UE 2501 automatically accesses the intermediary server 2503 in cases where a profile through which a communication service is available at present does not exist, or in cases where a communication service is available only through roaming and there is no profile of a local network user. The UE 2501 accesses the intermediary server 2503 by providing the user's Identification (ID) and password, or by providing the user's telephone number, and transmits eUICC identifier information for distinguishing the eUICC included in the UE to the intermediary server 2503.

In operation 2520, the intermediary server 2503 provides product information to the UE 2501. When the UE 2501 accesses the intermediary server 2501, the intermediary server 2503 transmits information for subscribing to or purchasing a communication product to the UE 2501. The information is displayed as text or an image. The information includes information on the mobile communication service provider 2505, a payment system, provided service contents, and the like, and the location and the sequence in which the information is displayed is determined by a service provider of the intermediary server 2503. The UE 2501 display the information received from the intermediary server 2503. The UE 2501 displays the information as illustrated in FIG. 2 or displays the symbol or the communication company name of the mobile communication service provider 2505. When the user selects the symbol or the name of the corresponding mobile communication service provider, the UE 2501 also displays available payment systems. In addition, the UE 2501 displays the fact that the network access information of the mobile communication service provider 2505 is downloaded through a network. The UE 2501 displays a screen through which the user determines a selection of a communication product of a specific mobile communication service provider. For example, the UE 2501 displays a screen for selecting a communication product payment method and displays a screen for inputting credit card or bank account information as the payment method. In certain embodiments, the UE 2501 also omits the payment method selecting process without providing a separate screen.

In operation 2530, the UE 2501 transmits product purchase information to the intermediary server 2503. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server 2503.

In operation 2540, the intermediary server 2503, after receiving the product purchase request information from the UE 2501, transmits product purchase processing request information to the mobile communication service provider 2505 according to the product identifier. For example, if information on a specific mobile communication service provider is included in the product identifier, the intermediary server 2503 transmits the product purchase processing request information to the corresponding specific mobile communication service provider 2505. In addition, the product identifier includes information on a payment system product, profile distinction information, and arbitrary information supported by the mobile communication service provider 2505. If the product identifier includes the profile distinction information, the profile identifier is an Integrated Circuit Card Identifier (ICCID) value. When the intermediary server 2503 transmits the eUICC identifier information, received from the UE 2501, to the mobile communication service provider 2505, the mobile communication service provider 2505 identifies an eUICC where a communication profile is to be installed.

In operation 2545, the mobile communication service provider 2505 performs approval for the product purchase processing request information received from the intermediary server 2503. After receiving the product purchase processing request from the intermediary server 2503, the mobile communication service provider 2505 updates information for providing a communication service to the UE 2501. For example, the mobile communication service provider 2505 updates an activation field corresponding to Integrated Mobile Subscription Identifier (IMSI) information mapped with the profile identifier to an authentication server. In addition, the mobile communication service provider 2505 performs mapping onto the profile identifier using the product identifier received from the intermediary server 2503. If a profile identifier is included in the product identifier, the included profile identifier is also used.

In operation 2550, the profile providing server 2507 provides a profile to the profile managing server 2509. The profile providing server 2507 stores a plurality of profiles in advance in the profile managing server 2509. The storing of the profiles is performed by manually controlling the profile providing server 2507 or automatically under a specific condition. The profile providing server 2507 provides an encrypted profile. In cases where a profile is encrypted such that it is decoded only in a predetermined eUICC and transferred to the profile providing server, the corresponding profile is installed only in the corresponding eUICC. Furthermore, in cases where the corresponding encryption is performed with an arbitrary encryption key without being specified such that the encrypted profile is decoded only in a specific eUICC, the encrypted profile is specified such that it is decoded only in the specific eUICC of the profile managing server 2509. The process of decoding the encrypted profile only in the specific eUICC includes a process of decoding and re-encrypting the whole profile in the profile managing server 2509.

In operation 2560, the intermediary server 2503 requests the profile managing server 2509 to download a profile. The profile providing server 2507 preserves profile information including subscriber information installed in the eUICC and creates a profile in the form that can be installed in the eUICC. The profile managing server 2509 stores a plurality of profiles in advance, and when receiving the profile download request from the intermediary server 2503, the profile managing server 2509 immediately transfers a profile to the UE if the profile corresponding to the profile identifier included in the corresponding profile download request message has been stored in advance therein.

In operation 2570, the profile managing server 2509 transmits the profile to the UE 2501. The transmission is performed through message transmission or reception using a Short Message Service (SMS), message transmission or reception using IP communication of a mobile communication network, or message transmission or reception using IP communication through short-range communication technology, such as Wireless Fidelity (WiFi), BLUETOOTH, Near Field Communication (NFC), or the like, or Universal Serial Bus (USB) connection with a UE having a communication function. In the process of transmitting the profile, the profile managing server 2509 transmits the profile or the profile data received from the profile providing server 2507 to the UE 2501, and transmits a processing result received from the UE 2501 to the profile providing server 2507. If the profile managing server 2509 fails to receive the processing result from the UE 2501, the profile managing server 2509 transmits the corresponding profile or profile data again. The profile managing server 2509 stores all or some data of the profile download request message received from the profile providing server 2507 without transmitting the same, and when receiving a download request from the UE 2501, transmits the profile or profile data to the UE 2501.

The UE 2501 downloads the profile from the profile managing server 2509, activate the downloaded profile, and access the corresponding mobile communication company to use a communication service. The activation of the profile is selected by the user or is automatically selected using information included in a message received from the profile managing server 2509. When the profile is completely downloaded, the UE 2501 accesses the profile managing server 2509 or the intermediary server 2503 to transmit information as to whether the download is completed. The information as to whether the download is completed includes the eUICC identifier and the profile ID.

Figure 26:
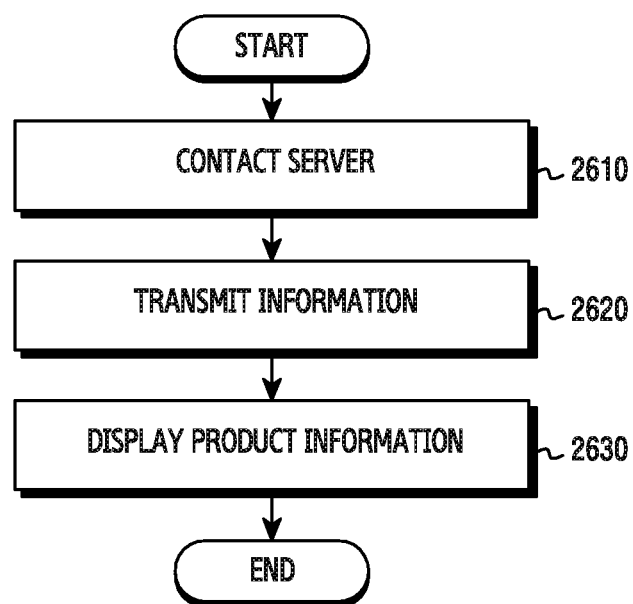
FIG. 26 illustrates an example of a communication service opening process of a UE using an eUICC according to various embodiments of the present disclosure.

FIG. 26 illustrates an example of a communication service opening process of a UE using an eUICC according to various embodiments of the present disclosure.

In operation 2610, the UE accesses a server.

The UE accesses an intermediary server that plays an intermediary role in the trade of profiles between a mobile communication service provider and a user's UE. The user accesses the intermediary server by executing a specific application of the UE.

In operation 2620, the UE transmits information.

The UE accesses the intermediary server by providing the user's Identification (ID) and password, or by providing the user's telephone number, and transmits eUICC identifier information for distinguishing the eUICC included in the UE to the intermediary server.

In operation 2630, the UE displays product information.

The UE receives information from the intermediary server and display product information. The UE receives, from the intermediary server, information for subscribing to or purchasing a communication product and display the information in the form of text or an image. The information includes information on the mobile communication service provider, a payment system, provided service contents, and the like, and the location and the sequence in which the information is displayed is determined by a service provider of the intermediary server. The UE displays the information received from the intermediary server. The UE displays the information as illustrated in FIG. 2 or displays the symbol or the communication company name of the mobile communication service provider. When the user selects the symbol or the name of the corresponding mobile communication service provider, the UE also displays available payment systems. In addition, the UE displays the fact that the network access information of the mobile communication service provider is downloaded through a network. The UE displays a screen through which the user determines a selection of a communication product of a specific mobile communication service provider. For example, the UE displays a screen for selecting a communication product payment method and displays a screen for inputting credit card or bank account information as the payment method. In certain embodiments, the UE also omits the payment method selecting process without providing a separate screen.

Figure 27:
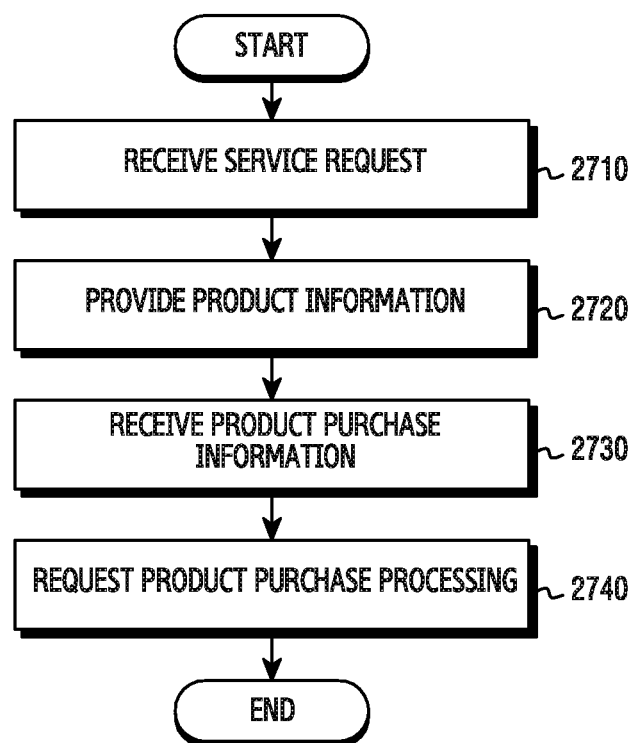
FIG. 27 illustrates an example of an operation flow of an intermediary server for opening a communication service of a UE using an eUICC according to various embodiments of the present disclosure.

FIG. 27 illustrates an example of an operation flow of an intermediary server for opening a communication service of a UE using an eUICC according to various embodiments of the present disclosure.

In operation 2710, the intermediary server receives a service request from the UE. The service request is performed by the UE's access to the intermediary server through a specific application.

In operation 2720, the intermediary server provides product information. When the UE accesses the intermediary server, the intermediary server transmits information for subscribing to or purchasing a communication product to the UE. The information is displayed as text or an image. The information includes information on a mobile communication service provider, a payment system, provided service contents, and the like, and the location and the sequence in which the information is displayed is determined by a service provider of the intermediary server.

In operation 2730, the intermediary server receives product purchase information. The intermediary server receives purchase information on a communication product from the UE. The product purchase information includes a product identifier, an eUICC identifier, and payment information. The product identifier includes information for distinguishing the selection of a specific mobile communication company and a specific payment system. The payment information includes credit card information or bank account information or includes information for notifying of the use of credit card or bank account information stored in the intermediary server.

In operation 2740, the intermediary server performs a product purchase processing request.

The intermediary server receives product purchase request information from the UE and then transmits product purchase processing request information to a mobile communication service provider according to the product identifier. For example, if information on a specific mobile communication service provider is included in the product identifier, the intermediary server transmits the product purchase processing request information to the corresponding specific mobile communication service provider. In addition, the product identifier includes information on a payment system product, profile distinction information, and arbitrary information supported by the mobile communication service provider. If the product identifier includes the profile distinction information, the profile identifier is an ICCID value. When the intermediary server transmits eUICC identifier information received from the UE to the mobile communication service provider, the mobile communication service provider identifies an eUICC where a communication profile is to be installed.

Figure 28:
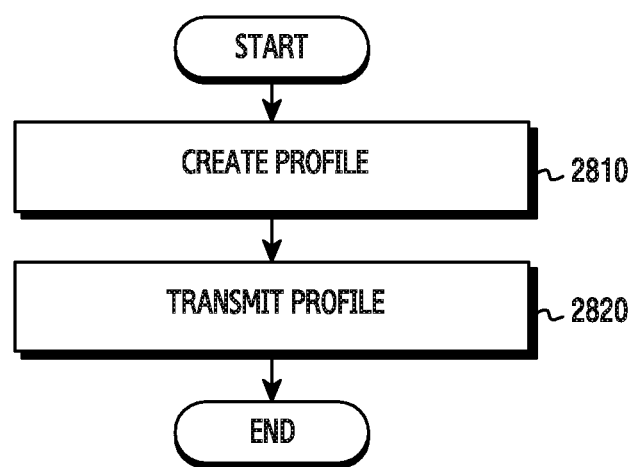
FIG. 28 illustrates an example of an operation flow of a profile providing server for opening a communication service of a UE using an eUICC according to various embodiments of the present disclosure.

FIG. 28 illustrates an example of an operation flow of a profile providing server for opening a communication service of a UE using an eUICC according to various embodiments of the present disclosure.

In operation 2810, the profile providing server creates a profile. The profile providing server creates a profile for an eUICC when receiving a profile download request or in cases where a determination is made in advance.

In operation 2820, the profile providing server transmits the profile. The profile providing server transmits the created profile for the eUICC to a profile managing server when receiving a profile download request from a mobile communication service provider or an intermediary server, or in cases where a determination is made in advance.

Figure 29:
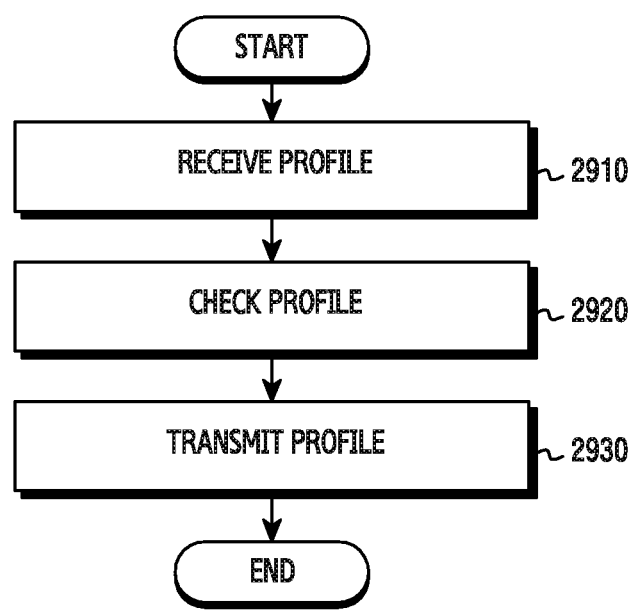
FIG. 29 illustrates an example of an operation flow of a profile managing server for opening a communication service of a UE using an eUICC according to various embodiments of the present disclosure.

FIG. 29 illustrates an example of an operation flow of a profile managing server for opening a communication service of a UE using an eUICC according to various embodiments of the present disclosure.

In operation 2910, the profile managing server receives a profile. The profile managing server receives a created profile for an eUICC when receiving a profile download request from a mobile communication service provider or an intermediary server, or in cases where a determination is made in advance.

In operation 2920, the profile managing server checks the profile. The profile managing server checks whether information including an eUICC identifier of the profile received from the profile providing server and the profile are encrypted and tests the authentication information of the intermediary server.

In operation 2930, the profile managing server transmits the profile. The profile managing server performs the profile check and the authentication test in operation 2920 and then transmits the profile having passed through the profile check and the authentication test to the UE.

In the processes of FIGS. 17 to 25 according to the embodiments of the present disclosure, as the mobile communication company transmits a profile to the profile providing server, the profile providing server transmits the profile to the profile managing server. However, in cases where the profile providing server provides a profile to the profile managing server in advance as illustrated in FIG. 25, the intermediary server can directly request the profile managing server to download the profile since the profile is stored in the profile managing server in advance, which make it possible to reduce the time required for the transmission process of the profile.

Figure 30:
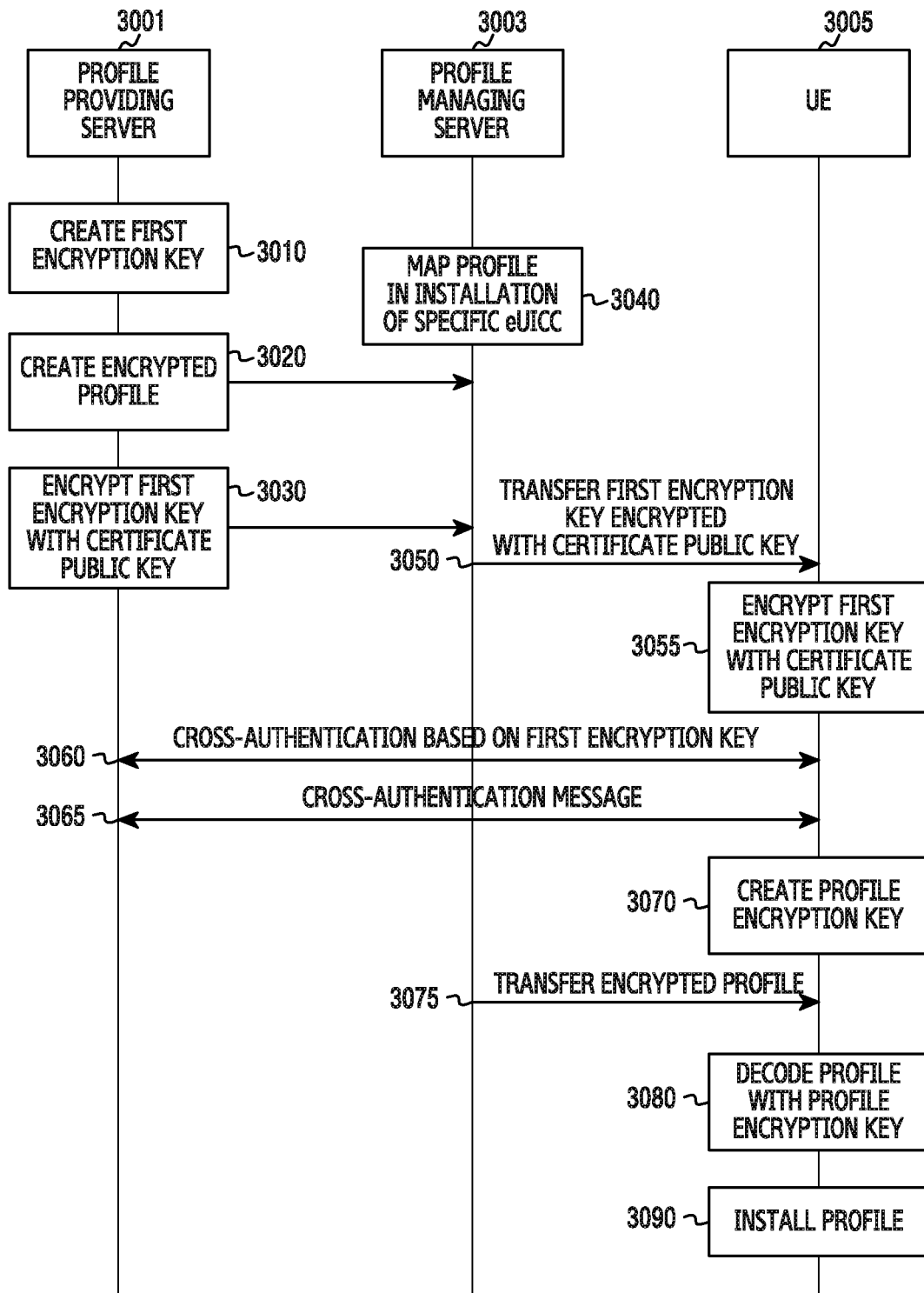
FIG. 30 illustrates an example of an eUICC profile installation process using encryption according to various embodiments of the present disclosure.

FIG. 30 illustrates an example of an eUICC profile installation process using encryption according to various embodiments of the present disclosure.

The process of FIG. 30 includes a communication process between a profile providing server 3001, a profile managing server 3003, and a UE 3005.

In operation 3010, the profile providing server 3001 creates a first encryption key. The first encryption key is created to be independent of an eUICC, and when a profile encrypted in the profile managing server 3003 is provided to the eUICC without being decoded, the first encryption key functions to decipher the encryption of the encrypted profile.

In operation 3020, the profile providing server 3001 creates an encrypted profile. The profile providing server 3001 creates a profile encryption key for the profile using the first encryption key created in operation 3010 and encrypts the profile using the created profile encryption key. The profile providing server 3001 transmits the encrypted profile to the profile managing server 3003.

In operation 3030, the profile providing server 3001 encrypts the first encryption key using a certificate public key. The encryption of the first encryption key using the certificate public key is performed by a request of the profile managing server 3003. The profile providing server 3001 transmits the first encryption key encrypted using the certificate public key to the profile managing server 3003.

In operation 3040, the profile managing server maps the profile in the installation of a specific eUICC.

In operation 3050, the profile managing server 3003 transmits the first encryption key encrypted using the certificate public key, which is received from the profile providing server, to the UE, and in operation 3055, the UE 3005 decodes the first encryption key using the certificate public key which was used for the encryption of the first encryption key.

When the first encryption key is decoded in operation 3055, cross-authentication between the UE 3005 and the profile providing server 3001 is performed on the basis of the first encryption key in operation 3060, and the transmission or reception of a cross-authentication message created by performing the cross-authentication is performed in operation 3065.

When the cross-authentication is completed in operations 3060 and 3065, the UE 3005 creates a profile encryption key based on the cross-authentication in operation 3070.

In operation 3075, the profile managing server 3003 transmits the encrypted profile to the UE 3005. In operation 3080, the UE 3005, when receiving the encrypted profile, decodes the encrypted profile using the profile encryption key created in operation 3020. Thereafter, in operation 3090, the UE 3005 installs the profile decoded in operation 3080 to use a network service of a specific mobile communication company.

Figure 31:
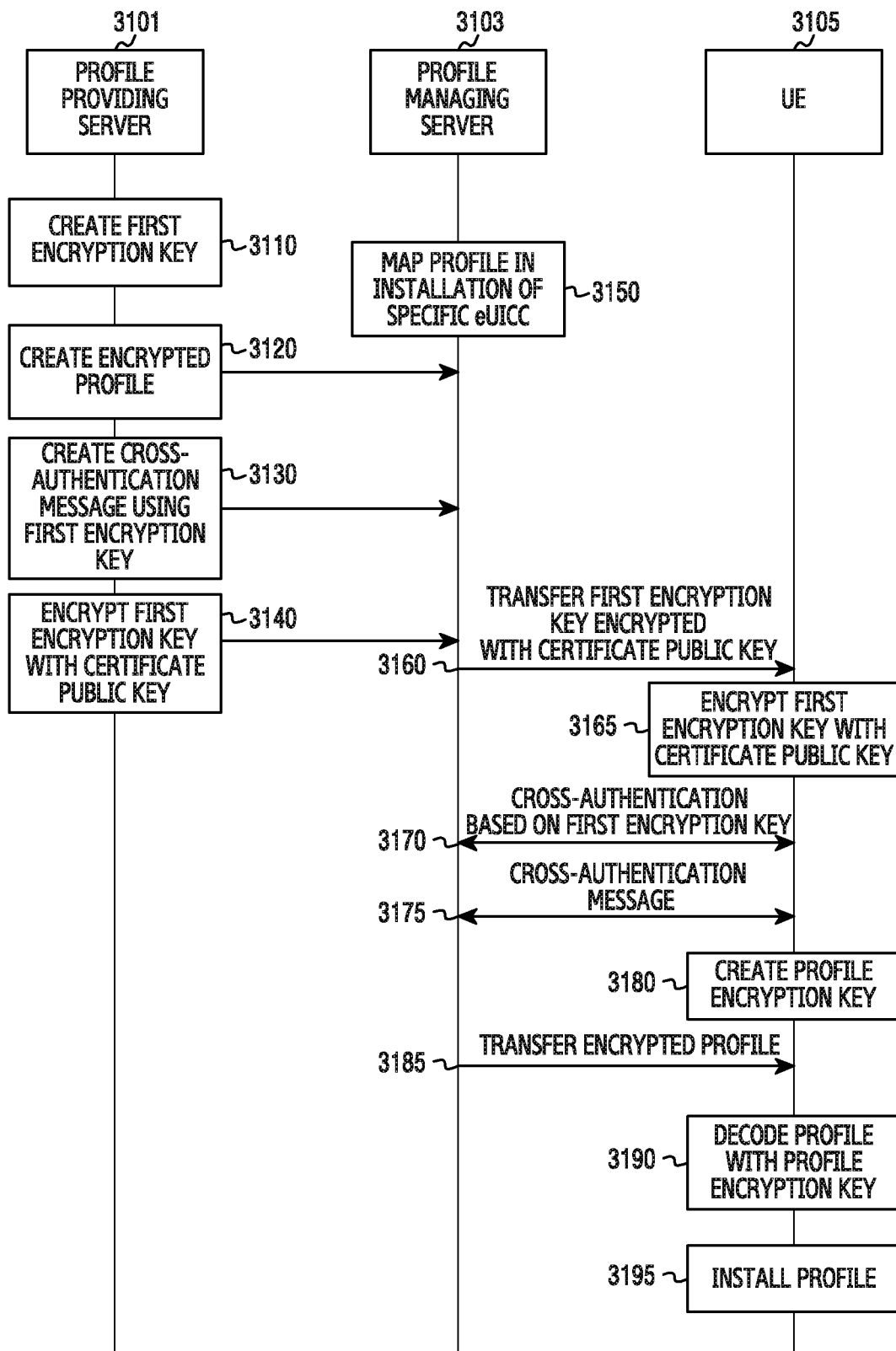
FIG. 31 illustrates an example of an eUICC profile installation process using encryption according to various embodiments of the present disclosure.

FIG. 31 illustrates an example of an eUICC profile installation process using encryption according to another embodiment of the present disclosure.

The process of FIG. 31 includes a communication process between a profile providing server 3101, a profile managing server 3103, and a UE 3105.

In operation 3110, the profile providing server 3101 creates a first encryption key. The first encryption key is created to be independent of an eUICC, and when a profile encrypted in the profile managing server 3103 is provided to the eUICC without being decoded, the first encryption key functions to decipher the encryption of the encrypted profile.

In operation 3120, the profile providing server 3101 creates an encrypted profile. The profile providing server 3101 creates a profile encryption key for the profile using the first encryption key created in operation 3110 and encrypts the profile using the created profile encryption key. The profile providing server 3101 transmits the encrypted profile to the profile managing server 3103.

In operation 3130, the profile providing server 3101 creates a cross-authentication message using the created first encryption key. The profile providing server 3101 use a sequence counter, an AID value, card challenge, host challenge, a card cryptogram, and a host cryptogram in order to create the cross-authentication message.

In operation 3140, the profile providing server 3101 encrypts the first encryption key using a certificate public key. The encryption of the first encryption key using the certificate public key is performed by a request of the profile managing server 3103. The profile providing server 3101 transmits the first encryption key encrypted using the certificate public key to the profile managing server 3103.

In operation 3150, the profile managing server maps the profile in the installation of a specific eUICC.

In operation 3160, the profile managing server 3103 transmits the first encryption key encrypted using the certificate public key, which is received from the profile providing server, to the UE, and in operation 3165, the UE 3105 decodes the first encryption key using the certificate public key which was used for the encryption of the first encryption key.

When the first encryption key is decoded in operation 3165, cross-authentication between the UE 3105 and the profile managing server 3103 is performed on the basis of the first encryption key in operation 3170, and the transmission or reception of a cross-authentication message created by performing the cross-authentication is performed in operation 3175.

When the cross-authentication is completed in operations 3170 and 3175, the UE 3105 creates a profile encryption key based on the cross-authentication in operation 3180.

In operation 3185, the profile managing server 3103 transmits the encrypted profile to the UE 3105. In operation 3190, the UE 3105, when receiving the encrypted profile, decodes the encrypted profile using the profile encryption key created in step 3180. Thereafter, in operation 3195, the UE 3105 installs the profile decoded in operation 3190 to use a network service of a specific mobile communication company.

Figure 32:
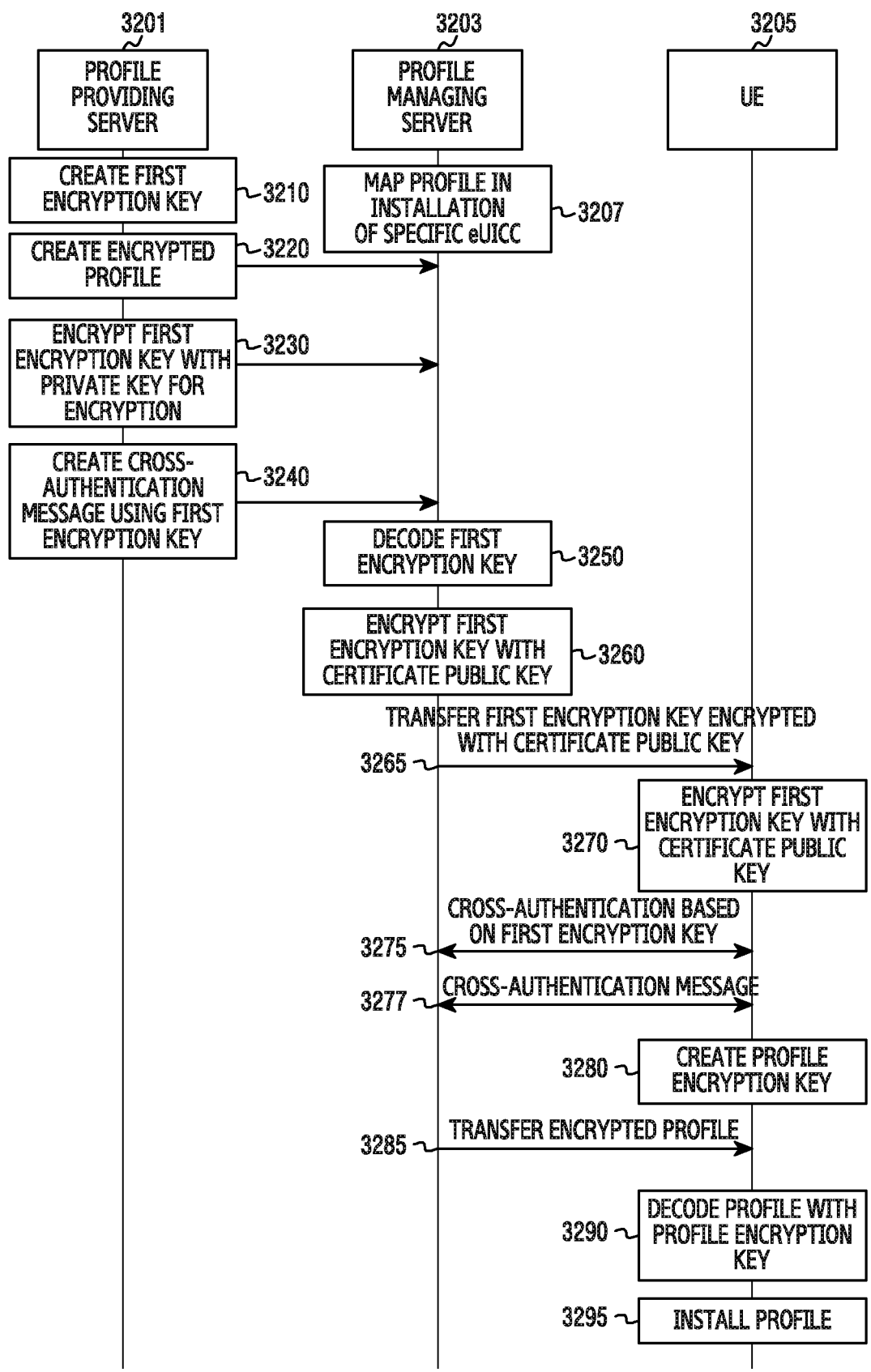
FIG. 32 illustrates an example of an eUICC profile installation process using encryption according to various embodiments of the present disclosure.

FIG. 32 illustrates an example of an eUICC profile installation process using encryption according to still another embodiment of the present disclosure.

The process of FIG. 32 includes a communication process between a profile providing server 3201, a profile managing server 3203, and a UE 3205.

In operation 3210, the profile providing server 3201 creates a first encryption key. The first encryption key is created to be independent of an eUICC, and when a profile encrypted in the profile managing server 3203 is provided to the eUICC without being decoded, the first encryption key functions to decipher the encryption of the encrypted profile.

In operation 3220, the profile providing server 3201 creates an encrypted profile. The profile providing server 3201 creates a profile encryption key for the profile using the first encryption key created in operation 3210 and encrypts the profile using the created profile encryption key. The profile providing server 3201 transmits the encrypted profile to the profile managing server 3203.

In operation 3230, the profile providing server 3201 encrypts the first encryption key using a private key for encryption. The profile providing server 3201 transmits the first encryption key encrypted using the private key for encryption to the profile managing server 3203.

In operation 3240, the profile providing server 3201 creates a cross-authentication message using the created first encryption key. The profile providing server 3201 uses a sequence counter, an AID value, card challenge, host challenge, a card cryptogram, and a host cryptogram in order to create the cross-authentication message.

In operation 3207, the profile managing server 3203 maps the profile in the installation of a specific eUICC.

The profile managing server 3203 decodes the first encryption key encrypted with a personal public key in operation 3250 and encrypts the first encryption key using a certificate public key in operation 3260.

In operation 3265, the profile managing server 3203 transmits the first encryption key encrypted using the certificate public key to the UE, and in operation 3270, the UE 3205 decodes the first encryption key using the certificate public key which was used for the encryption of the first encryption key.

When the first encryption key is decoded in operation 3275, cross-authentication between the UE 3205 and the profile managing server 3203 is performed on the basis of the first encryption key in operation 3275, and the transmission or reception of a cross-authentication message created by performing the cross-authentication is performed in operation 3277.

When the cross-authentication is completed in operations 3275 and 3277, the UE 3205 creates a profile encryption key based on the cross-authentication in operation 3280.

In operation 3285, the profile managing server 3203 transmits the encrypted profile to the UE 3205. In operation 3290, the UE 3205, when receiving the encrypted profile, decodes the encrypted profile using the profile encryption key created in operation 3280. Thereafter, in operation 3295, the UE 3205 installs the profile decoded in operation 3290 to use a network service of a specific mobile communication company.

Figure 33:
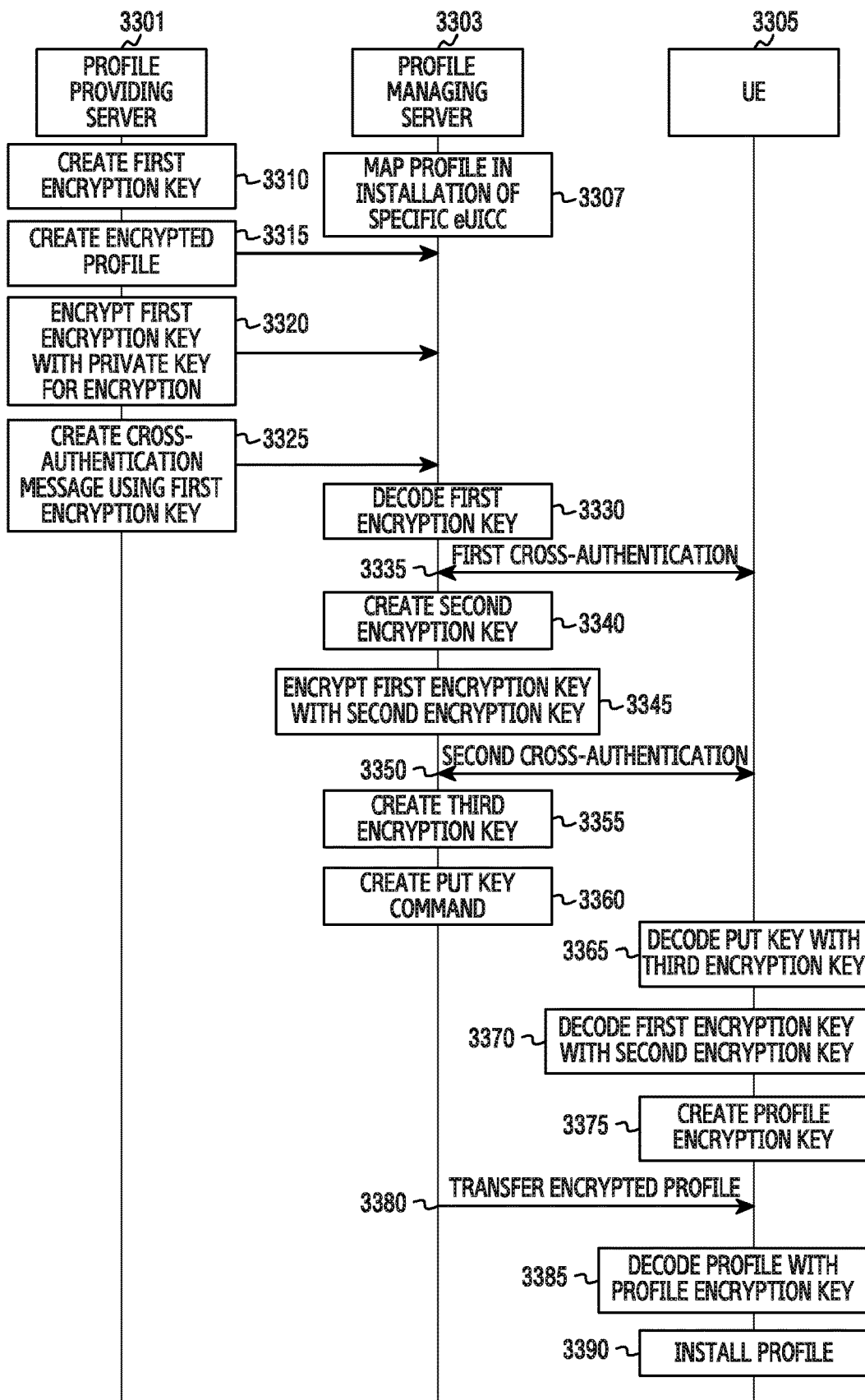
FIG. 33 illustrates an example of an eUICC profile installation process using encryption according to various embodiments of the present disclosure.

FIG. 33 illustrates an example of an eUICC profile installation process using encryption according to various embodiments of the present disclosure.

The process of FIG. 33 includes a communication process between a profile providing server 3301, a profile managing server 3303, and a UE 3305.

In operation 3310, the profile providing server 3301 creates a first encryption key. The first encryption key is created to be independent of an eUICC, and when a profile encrypted in the profile managing server 3303 is provided to the eUICC without being decoded, the first encryption key functions to decipher the encryption of the encrypted profile.

In operation 3315, the profile providing server 3301 creates an encrypted profile. The profile providing server 3301 creates a profile encryption key for the profile using the first encryption key created in operation 3310 and encrypts the profile using the created profile encryption key. The profile providing server 3301 transmits the encrypted profile to the profile managing server 3303.

In operation 3320, the profile providing server 3301 encrypts the first encryption key using a private key for encryption. The profile providing server 3301 transmits the first encryption key encrypted using the private key for encryption to the profile managing server 3303.

In operation 3325, the profile providing server 3301 creates a cross-authentication message using the created first encryption key. The profile providing server 3301 uses a sequence counter, an AID value, card challenge, host challenge, a card cryptogram, and a host cryptogram in order to create the cross-authentication message.

In operation 3307, the profile managing server 3303 maps the profile in the installation of a specific eUICC.

In operation 3330, the profile managing server 3303 decodes the first encryption key encrypted with a personal public key.

In operation 3335, the profile managing server 3303 and the UE 3305 perform first cross-authentication. The profile managing server 3303 and the UE 3305 performs the authentication process using a certificate.

In operation 3340, the profile managing server 3303 creates a second encryption key according to the result of the cross-authentication performed in operation 3335, and in operation 3350, the profile managing server 3303 encrypts the first encryption key using the created second encryption key.

In operation 3350, the profile managing server 3303 and the UE 3305 perform second cross-authentication, and in operation 3355, the profile managing server 3303 creates a third encryption key. The third encryption key is an SCP 03 key.

In operation 3360, the profile managing server 3303 creates a PUT KEY command and transmits the created PUT KEY command to the UE 3305.

In operation 3365, the UE 3305 decodes the PUT KEY using the third encryption key created through operations 3350 and 3355. As a result obtained by decoding the PUT KEY, the UE 3305 identifies the first encryption key encrypted by the second encryption key.

In operation 3370, the UE 3305 decodes the first encryption key using the second encryption key created through operations 3335 and 3340.

In operation 3375, the UE 3305 identifies a profile encryption key as the result of the decoding of the first encryption key and accordingly create the profile encryption key.

In operation 3380, the profile managing server 3303 transmits the encrypted profile to the UE 3305. In operation 3385, the UE 3305, when receiving the encrypted profile, decodes the encrypted profile using the profile encryption key created in operation 3375. Thereafter, in operation 3390, the UE 3305 installs the profile decoded in operation 3385 to use a network service of a specific mobile communication company.

Figure 34:
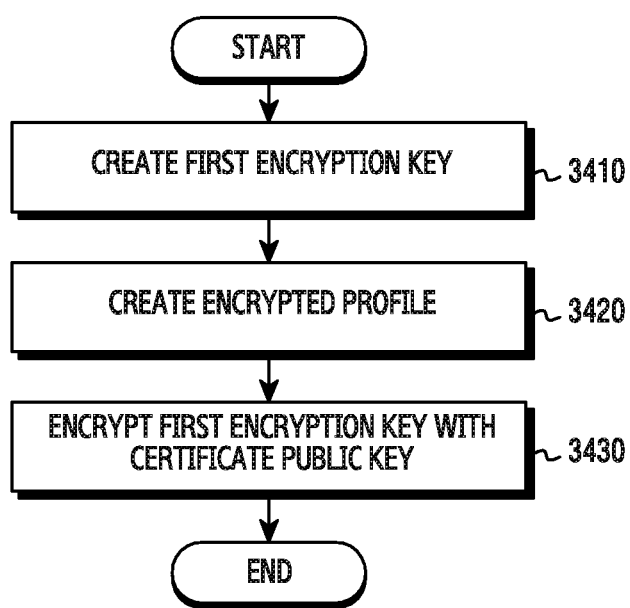
FIG. 34 illustrates an example of an operating process of a profile providing server for profile transmission according to various embodiments of the present disclosure.

FIG. 34 illustrates an example of an operating process of a profile providing server for profile transmission according to various embodiments of the present disclosure.

In operation 3410, the profile providing server creates a first encryption key. The first encryption key is created to be independent of an eUICC, and when a profile encrypted in a profile managing server is provided to the eUICC without being decoded, the first encryption key functions to decipher the encryption of the encrypted profile.

In operation 3420, the profile providing server creates an encrypted profile. The profile providing server creates a profile encryption key for the profile using the created first encryption key and encrypts the profile using the created profile encryption key. The profile providing server transmits the encrypted profile to the profile managing server.

Figure 35:
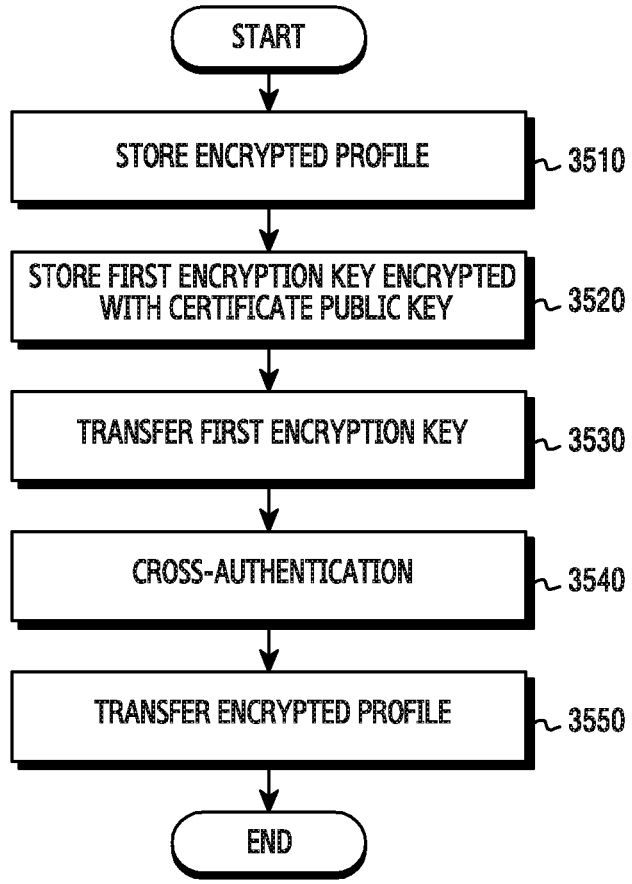
FIG. 35 illustrates an example of an operating process of a profile managing server for profile transmission according to various embodiments of the present disclosure.

FIG. 35 illustrates an example of an operating process of a profile managing server for profile transmission according to various embodiments of the present disclosure.

In operation 3510, the profile managing server stores an encrypted profile. After a profile providing server creates a first encryption key, the encrypted profile is encrypted on the basis of the first encryption key and then transmitted from the profile providing server.

In operation 3520, the profile managing server stores the encrypted first encryption key. The first encryption key is encrypted by a certificate public key or a private key for encryption.

In operation 3530, the profile managing server transmits the first encryption key to a UE. By transferring the first encryption key to the UE, the profile managing server enables the UE to decode the first encryption key using the certificate public key or the private key for encryption.

In operation 3540, the profile managing server and the UE perform cross-authentication. Operation 3540 is omitted in cases where the UE directly performs the cross-authentication with the profile providing server. Alternatively, the cross-authentication is performed many times. Through the cross-authentication, an encryption key for decoding the encryption of the profile is created.

In operation 3550, the profile managing server transmits the encrypted profile to the UE, and the UE decodes the encrypted profile using the created encryption key and then installs the profile.

Figure 36:
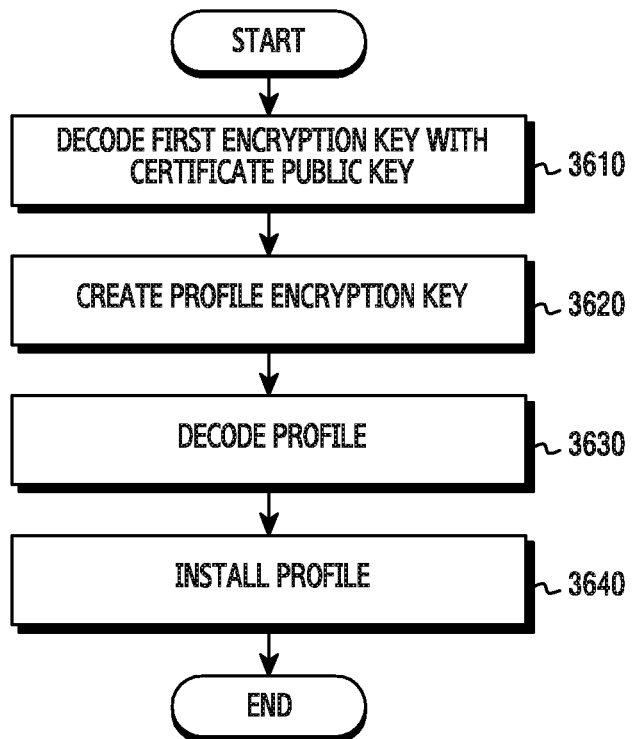
FIG. 36 illustrates an example of an operating process of a UE for profile transmission according to various embodiments of the present disclosure.

FIG. 36 illustrates an example of an operating process of a UE for profile transmission according to various embodiments of the present disclosure.

In operation 3610, the UE decodes a first encryption key. The UE receives the first encryption key, encrypted with a certificate public key or a private key for encryption, from a profile managing server and then decodes the first encryption key.

In operation 3620, the UE performs cross-authentication. The UE performs the cross-authentication with a profile providing server or the profile managing server. The cross-authentication is performed many times and is performed based on the first encryption key. A profile encryption key is created through performing the cross-authentication.

In operation 3630, the UE decodes a profile. The decoding of the profile is performed when the UE receives an encrypted profile from the profile managing server, and the decoding is performed using the profile encryption key created in operation 3620.

In operation 3640, the UE installs the profile. The UE, after installing the decoded profile, access a wireless network using the installed profile information and then receive a service.

Figure 37:
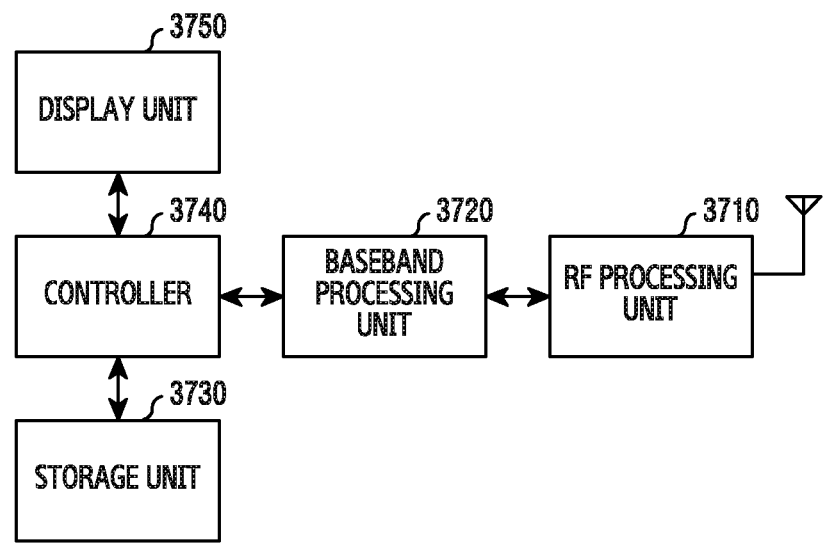
FIG. 37 is a block diagram of a UE in a wireless communication system according to various embodiments of the present disclosure.

FIG. 37 is a block diagram of a UE in a wireless communication system according to various embodiments of the present disclosure.

Referring to FIG. 37, the UE includes a Radio Frequency (RF) processing unit 3710, a baseband processing unit 3720, a storage unit 3730, a controller 3740, and a display unit 3750.

The RF processing unit 3710 performs a function for transmitting and receiving a signal through a wireless channel, such as band conversion and amplification of a signal. That is, the RF processing unit 3710 subjects a baseband signal provided from the baseband processing unit 3720 to up-conversion to an RF band signal and then transmits the converted signal through an antenna, and subjects an RF band signal received through the antenna to down-conversion to a baseband signal. For example, the RF processing unit 3710 includes a transmission filter, a reception filter, an amplifier, a mixer, an oscillator, a Digital-to-Analog Converter (DAC), an Analog-to-Digital Converter (ADC), and the like. Although only one antenna is illustrated in FIG. 37, the UE includes a plurality of antennas. In addition, the RF processing unit 3710 includes a plurality of RF chains. In order to transmit and receive information relating to an eUICC, the RF processing unit 3710 adjusts the phase and magnitude of signals transmitted and received through a plurality of antenna or antenna elements.

The baseband processing unit 3720 performs a conversion between a baseband signal and a bit string according to a physical layer standard of a system. For example, the baseband processing unit 3720, when transmitting data, generates complex symbols by encoding and modulating a transmission bit string. In addition, the baseband processing unit 3720, when receiving data, recovers a reception bit string through the demodulation and decoding of a baseband signal provided from the RF processing unit 3710. For example, in the case of following the OFDM scheme, the baseband processing unit 3720, when transmitting data, generates complex symbols by encoding and modulating a transmission bit string, maps the complex symbols with sub-carriers, and then configures Orthogonal Frequency Division Multiplexing (OFDM) symbols through an Inverse Fast Fourier Transform (IFFT) operation and Cyclic Prefix (CP) insertion. In addition, the baseband processing unit 3720, when receiving data, divides a baseband signal provided from the RF processing unit 3710 in units of OFDM symbols, recovers signals mapped with sub-carriers through an FFT operation, and then recovers a reception bit string through demodulation and decoding. The baseband processing unit 3720 and the RF processing unit 3710 transmit and receive signals as described above. Accordingly, the baseband processing unit 3720 and the RF processing unit 3710 is referred to as a transmitter, a receiver, a transmission/receiver, or a communication unit.

The storage unit 3730 stores data such as a basic program, an application program, and setting information for the operation of the UE. In particular, the storage unit 3730 stores information relating to information transmission for an eUICC in a wireless communication system. In addition, the storage unit 3730 provides data stored therein according to a request of the controller 3740.

The controller 3740 controls overall operations of the UE. For example, the controller 3740 transmits and receives a signal through the baseband processing unit 3720 and the RF processing unit 3710. In addition, the controller 3740 records data in the storage unit 3730 and read the data. According to the various embodiments of the present disclosure, the controller 3740 controls the UE to perform the procedures illustrated in FIGS. 17 to 26, 30 to 33, and 36. The operation of the controller 3740, according to the various embodiments of the present disclosure, is as follows.

The controller 3740 controls information that will be sent to a server playing an intermediary role in the trade of an eUICC. The controller 3740 determines whether to transmit a user's ID and password information, eUICC information and location information of the UE, information for distinguishing the UE, or the like. Furthermore, the controller 3740 receives information from the server playing an intermediary role in the trade of an eUICC and then controls the information to be displayed on the display unit 3750.

According to another embodiment of the present disclosure, the controller 3740 decodes an encrypted profile. The controller 3740, when receiving information relating to a profile from a server for managing the profile, decodes an encryption key received from the server for managing the profile using a set key, decodes the profile using the encryption key of the profile created through the decoding, and then installs the profile.

The display unit 3750 displays the result of the information controlled by the controller 3740. For example, the display unit 3750 displays result values that the controller 3740 obtains by controlling information received from the server playing an intermediary role in the trade of an eUICC. The result values include contents like those illustrated in FIG. 16.

Figure 38:
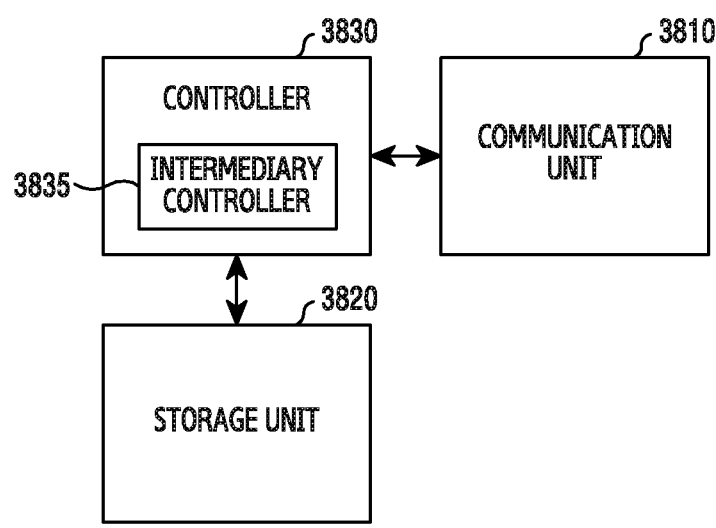
FIG. 38 is a block diagram of a server playing an intermediary role in the trade of an eUICC in a wireless communication system according to various embodiments of the present disclosure.

FIG. 38 is a block diagram of a server playing an intermediary role in the trade of an eUICC in a wireless communication system according to various embodiments of the present disclosure.

Referring to FIG. 38, the server includes a communication unit 3810, a storage unit 3820, a controller 3830, and an intermediary controller 3835.

The communication unit 3810 allows the server to communicate with a UE, a profile providing server, and a profile managing server. The communication unit 3810 transmits and receives a signal and is accordingly referred to as a transmitter, a receiver, a transmission/receiver, or a communication unit.

The storage unit 3820 stores data such as a basic program, an application program, and setting information for the operation of the server. In particular, the storage unit 3820 stores information relating to information transmission for an eUICC in a wireless communication system. In addition, the storage unit 3820 provides data stored therein according to a request of the controller 3830.

The controller 3830 controls overall operations of the server. The controller 3830 performs a control to provide, the UE, information according to the condition of the UE using information received from the UE. Through the control of the controller 3830, the server provides information on a communication product to the UE and request a mobile communication service provider to process product purchase.

Figure 39:
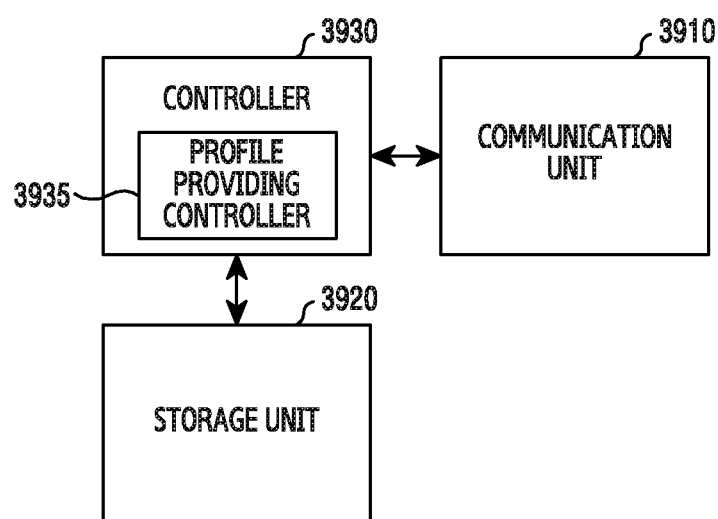
FIG. 39 is a block diagram of a server for providing an eUICC profile in a wireless communication system according to various embodiments of the present disclosure.

FIG. 39 is a block diagram of a server for providing an eUICC profile in a wireless communication system according to various embodiments of the present disclosure.

Referring to FIG. 39, the server includes a communication unit 3910, a storage unit 3920, a controller 3930, and a profile providing controller 3935.

The communication unit 3910 allows the server to communicate with a server playing an intermediary role in the trade of an eUICC profile, a profile managing server, and a mobile communication service provider. The communication unit 3910 transmits and receives a signal and is accordingly referred to as a transmitter, a receiver, a transmission/receiver, or a communication unit.

The storage unit 3920 stores data such as a basic program, an application program, and setting information for the operation of the server. In particular, the storage unit 3920 stores information relating to information transmission for an eUICC in a wireless communication system. In addition, the storage unit 3920 provides data stored therein according to a request of the controller 3930.

The controller 3930 controls overall operations of the server. When the server receives a profile transmission request from the server playing an intermediary role in the trade of an eUICC profile or the mobile communication service provider, the controller 3930 makes a control to transmit a profile to the profile managing server.

The controller 3930, according to various embodiments of the present disclosure, makes a control to create an encryption key, to encrypt a profile using the created encryption key, and to encrypt the encryption key again using a set key.

Figure 40:
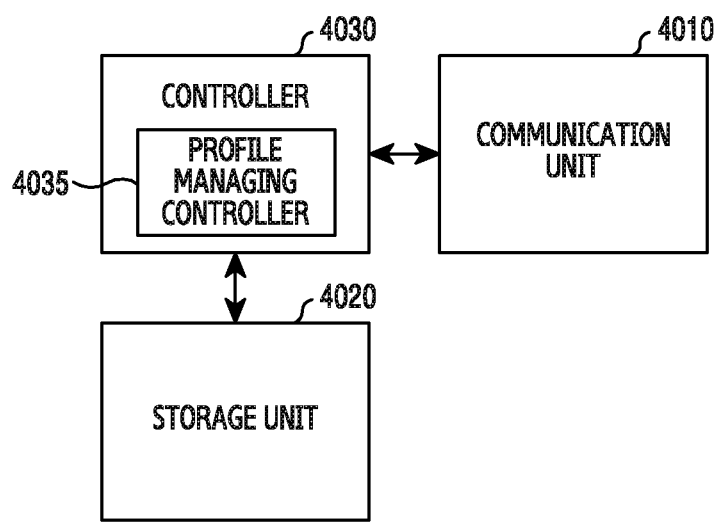
FIG. 40 is a block diagram of a server for managing an eUICC profile in a wireless communication system according to various embodiments of the present disclosure.

FIG. 40 is a block diagram of a server for managing an eUICC profile in a wireless communication system according to various embodiments of the present disclosure.

Referring to FIG. 40, the server includes a communication unit 4010, a storage unit 4020, a controller 4030, and a profile providing controller 4035.

The communication unit 4010 allows the server to communicate with a server playing an intermediary role in the trade of an eUICC profile and a profile managing server. The communication unit 4010 transmits and receives a signal and is accordingly referred to as a transmitter, a receiver, a transmission/receiver, or a communication unit.

The storage unit 4020 stores data such as a basic program, an application program, and setting information for the operation of the server. In particular, the storage unit 4020 stores information relating to information transmission for an eUICC in a wireless communication system. In addition, the storage unit 4020 provides data stored therein according to a request of the controller 4030.

The controller 4030 controls overall operations of the server. When the server receives a profile transmission request from the server playing an intermediary role in the trade of an eUICC, the controller 4030 make a control to transmit a profile to a UE.

The controller 4030, according to various embodiments of the present disclosure, makes a control to decode an encryption key through information received from the profile providing server and creates an encryption key through cross-authentication with the UE.

Methods, according to various embodiments, disclosed in claims and/or the specification are implemented in the form of hardware, software, or a combination thereof.

In the implementation of software, a computer-readable storage medium for storing one or more programs (software modules) is provided. The one or more programs stored in the computer-readable storage medium are configured for execution by one or more processors within the electronic device. The one or more programs include instructions for allowing the electronic device to carry out the methods, according to the various embodiments, disclosed in the claims and/or the specification.

The programs (software modules or software) is stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. In certain embodiments, any combination of some or all of the form a memory in which the program is stored. Further, a plurality of such memories is included in the electronic device.

In addition, the programs are stored in an attachable storage device which accesses the electronic device through communication networks such as the Internet, Intranet, Local Area Network (LAN), Wide LAN (WLAN), and Storage Area Network (SAN) or a combination thereof. Such a storage device accesses the electronic device via an external port. Further, a separate storage device on the communication network accesses a portable electronic device.

In the specific embodiments of the present disclosure described above, the elements included in the present disclosure are expressed in singular or plural forms according to the proposed specific embodiments. However, the singular or plural expressions are selected to be suitable for proposed situations for convenience of description, and the present disclosure is not limited to the singular or plural elements. An element expressed in a plural form is configured in singular, or an element expressed in a singular form is configured in plural.

Although the embodiment has been described in the detailed description of the present disclosure, the present disclosure is modified in various forms without departing from the scope of the present disclosure. Therefore, the scope of the present disclosure should not be defined as being limited to the embodiments, but should be defined by the appended claims and equivalents thereof.

What is claimed is:

1. A server in a wireless communication system, the server comprising:
    a transceiver; and
    a processor operably coupled to the transceiver, and configured to:
        transmit, to a terminal via the transceiver, a first message comprising information on at least one communication service provided by at least one communication service provider;
        receive, from the terminal via the transceiver, a second message comprising information on a communication service identified among the at least one communication service provided by the at least one communication service provider, an identifier of an embedded subscriber identity module (eSIM) or an information associated with an integrated mobile subscription identifier (IMSI) of the terminal; and
        in response to the reception of the second message, transmit via the transceiver, to a profile provider server, a third message comprising the information on the communication service and the information associated with the IMSI of the terminal.

2. The server of claim 1, wherein the identifier of the eSIM and the identifier of the terminal is associated with the IMSI of the terminal.

3. The server of claim 1, wherein the processor is further configured to:
    receive, from the terminal via the transceiver, information regarding a capability of the terminal,
    wherein the at least one communication service is identified based on the information regarding the capability of the terminal.

4. The server of claim 1, wherein the processor is further configured to:
    receive, via the transceiver from the terminal, location information of the terminal, and
    wherein the at least one communication service is determined based on the location information of the terminal.

5. A terminal in a wireless communication system, the terminal comprising:
    a transceiver; and
    a processor operably coupled to the transceiver, and configured to:
        receive, from a server via the transceiver, a first message comprising information on at least one communication service provided by at least one communication service provider; and
        transmit, to the server via the transceiver, a second message comprising information on a communication service identified among the at least one communication service provided by the at least one communication service provider, an identifier of an embedded subscriber identity module (eSIM) or an information associated with an integrated mobile subscription identifier (IMSI) of the terminal; and
        receive, from a profile provider server via the transceiver, a profile corresponding to and the communication service and the information associated with the IMSI of the terminal.

6. The terminal of claim 5, wherein the identifier of the eSIM and the identifier of the terminal is associated with the IMSI of the terminal.

7. The terminal of claim 5, wherein the processor is further configured to:
    transmit, to the server via the transceiver, information regarding a capability of the terminal,
    wherein the at least one communication service is identified based on the information regarding the capability of the terminal.

8. The terminal of claim 5, wherein the processor is further configured to:
    transmit, to the server via the transceiver, location information of the terminal, and
    wherein the at least one communication service is determined based on the location information of the terminal.

9. A method performed by a server in a wireless communication system, the method comprising:
    transmitting, to a terminal, a first message comprising information on at least one communication service provided by at least one communication service provider;
    receiving, from the terminal, a second message comprising information on a communication service identified among the at least one communication service provided by the at least one communication service provider, an identifier of an embedded subscriber identity module (eSIM) or an information associated with an integrated mobile subscription identifier (IMSI) of the terminal; and
    in response to the reception of the second message, transmitting, to a profile provider server, a third message comprising the information on the communication service and the information associated with the IMSI of the terminal.

10. The method of claim 9, wherein the identifier of the eSIM and the identifier of the terminal is associated with the IMSI of the terminal.

11. The method of claim 9, further comprising:
receiving, from the terminal, information regarding a capability of the terminal,
wherein the at least one communication service is identified based on the information regarding the capability of the terminal.

12. The method of claim 9, wherein further comprising:
receiving, from the terminal, location information of the terminal,
wherein the at least one communication service is determined based on the location information of the terminal.

13. A method performed by a terminal in a wireless communication system, the method comprising:
receiving, from a server, a first message comprising information on at least one communication service provided by at least one communication service provider; and
transmitting, to the server, a second message comprising information on a communication service identified among the at least one communication service provided by the at least one communication service provider, an identifier of an embedded subscriber identity module (eSIM) or an information associated with an integrated mobile subscription identifier (IMSI) of the terminal; and
receiving, from a profile provider server, a profile corresponding to and the communication service and the information associated with the IMSI of the terminal.

14. The method of claim 13, wherein the identifier of the eSIM and the identifier of the terminal is associated with the IMSI of the terminal.

15. The method of claim 13, further comprising:
transmitting, to the server, information regarding a capability of the terminal,
wherein the at least one communication service is identified based on the information regarding the capability of the terminal.

16. The method of claim 13, further comprising:
transmitting, to the server, location information of the terminal,
wherein the at least one communication service is determined based on the location information of the terminal.

* * * * *